US012622426B2

(12) United States Patent
McCann et al.

(10) Patent No.: US 12,622,426 B2
(45) Date of Patent: May 12, 2026

(54) SYSTEM AND METHOD FOR FIELD TREATMENT AND MONITORING

(71) Applicant: Precision AI Inc., Montreal (CA)

(72) Inventors: Daniel McCann, Regina (CA); Wessam Gad El-Rab, Regina (CA); Mark Wileniec, Regina (CA); Randy Mortensen, Regina (CA); Anthony J Arkles, Regina (CA)

(73) Assignee: Precision AI Inc., Regina (CA)

( * ) Notice: Subject to any disclaimer, the term of this patent is extended or adjusted under 35 U.S.C. 154(b) by 892 days.

(21) Appl. No.: 17/431,451

(22) PCT Filed: Feb. 28, 2020

(86) PCT No.: PCT/CA2020/050276
§ 371 (c)(1),
(2) Date: Aug. 30, 2021

(87) PCT Pub. No.: WO2020/172756
PCT Pub. Date: Sep. 3, 2020

(65) Prior Publication Data
US 2022/0211026 A1     Jul. 7, 2022

Related U.S. Application Data

(60) Provisional application No. 62/935,362, filed on Nov. 14, 2019.

(30) Foreign Application Priority Data

Feb. 28, 2019     (CA) ................................ CA 3035225

(51) Int. Cl.
*A01M 7/00*          (2006.01)
*A01M 9/00*          (2006.01)
(Continued)

(52) U.S. Cl.
CPC ........ *A01M 7/0089* (2013.01); *A01M 9/0092* (2013.01); *A01M 21/02* (2013.01);
(Continued)

(58) Field of Classification Search
CPC .. A01M 7/0089; A01M 21/02; A01M 21/043; A01M 21/046; B64C 39/024; B64U 2101/00; B64U 2201/104
See application file for complete search history.

(56) References Cited

U.S. PATENT DOCUMENTS 5,646,494 A     7/1997  Han
5,716,032 A     2/1998  McIngvale
(Continued)

FOREIGN PATENT DOCUMENTS

CN          104604833          5/2015
CN          104615059          5/2015
(Continued)

OTHER PUBLICATIONS

International Search Report and Written Opinion for PCT/CA2020/050276 dated May 28, 2020, 9 pp.

*Primary Examiner* — Peter D Nolan
*Assistant Examiner* — Wae L Louie
(74) *Attorney, Agent, or Firm* — Neal, Gerber & Eisenberg LLP

(57)          ABSTRACT

Systems and methods of using an unmanned aerial or land vehicle (e.g. drone) for agricultural and/or pest control applications, such as on farms, golf courses, parks, and/or along roadways, power lines, etc. The system may have a drone receiving a pesticide from a base station dispensing the pesticide and a holding tank supplying the base station with the pesticide.

38 Claims, 47 Drawing Sheets

(51) Int. Cl.

| | | |
|---|---|---|
| *A01M 21/02* | (2006.01) | |
| *A01M 21/04* | (2006.01) | |
| *B64U 101/30* | (2023.01) | |
| *B64U 101/45* | (2023.01) | |

(52) U.S. Cl.
CPC ........ *A01M 21/043* (2013.01); *A01M 21/046*
(2013.01); *B64U 2101/30* (2023.01); *B64U*
*2101/45* (2023.01); *B64U 2201/104* (2023.01)

(56) References Cited

U.S. PATENT DOCUMENTS

| | | | | |
|---|---|---|---|---|
| 2016/0307448 | A1 | 10/2016 | Salnikov et al. | |
| 2017/0227969 | A1 | 8/2017 | Murray et al. | |
| 2017/0258005 | A1 | 9/2017 | Cutter | |
| 2017/0359943 | A1* | 12/2017 | Calleija | A01M 7/0089 |
| 2020/0108931 | A1* | 4/2020 | Zhou | A01M 7/0089 |
| 2020/0377211 | A1* | 12/2020 | Daddi | A01G 7/06 |
| 2021/0039784 | A1* | 2/2021 | Wu | B64D 1/18 |
| 2021/0094688 | A1* | 4/2021 | Sorek | B64D 1/18 |
| 2021/0101682 | A1* | 4/2021 | Zhao | B05B 13/005 |
| 2021/0166376 | A1* | 6/2021 | Hernandez | B64U 10/14 |
| 2021/0178415 | A1* | 6/2021 | Zhou | A01M 7/00 |
| 2021/0197983 | A1* | 7/2021 | Wang | B64U 80/10 |
| 2021/0207592 | A1* | 7/2021 | Shu | F04B 53/10 |
| 2021/0214080 | A1* | 7/2021 | Shu | F04B 43/04 |
| 2021/0232141 | A1* | 7/2021 | Georgeson | B64U 10/10 |
| 2021/0254980 | A1* | 8/2021 | Wake | G05D 1/101 |
| 2022/0073205 | A1* | 3/2022 | Hertzberg | A01M 7/0089 |
| 2022/0111960 | A1* | 4/2022 | Tran | B64D 1/18 |
| 2022/0137644 | A1* | 5/2022 | Wake | G08G 1/123 |
| | | | | 701/15 |
| 2022/0153417 | A1* | 5/2022 | Faers | G05D 1/12 |
| 2022/0167605 | A1* | 6/2022 | Janssen | G05B 19/4155 |
| 2022/0194579 | A1* | 6/2022 | Kelly | H01M 8/249 |
| 2022/0211026 | A1* | 7/2022 | McCann | B64D 1/18 |
| 2023/0119310 | A1* | 4/2023 | Long | G05D 1/0246 |
| | | | | 701/3 |
| 2023/0152094 | A1* | 5/2023 | Murakumo | B64U 10/00 |
| | | | | 702/5 |
| 2023/0200288 | A1* | 6/2023 | Janssen | A01B 79/005 |
| | | | | 701/50 |
| 2023/0217914 | A1* | 7/2023 | Centola | G06Q 50/02 |
| | | | | 705/7.26 |
| 2023/0221166 | A1* | 7/2023 | Ono | B64C 39/024 |
| | | | | 177/136 |

FOREIGN PATENT DOCUMENTS

| | | |
|---|---|---|
| CN | 205121347 | 3/2016 |
| CN | 107980753 | 5/2018 |
| CN | 108849819 | 11/2018 |
| WO | WO2017079340 | 5/2017 |

* cited by examiner

A spoiler/wing can be
attached to center of H
to help increase lift (not shown)

Red is location of spray
tank/ pumps. Positioned
on sides but may also be positioned in center

1222

520

2236

2602

2602

2602

2602

202

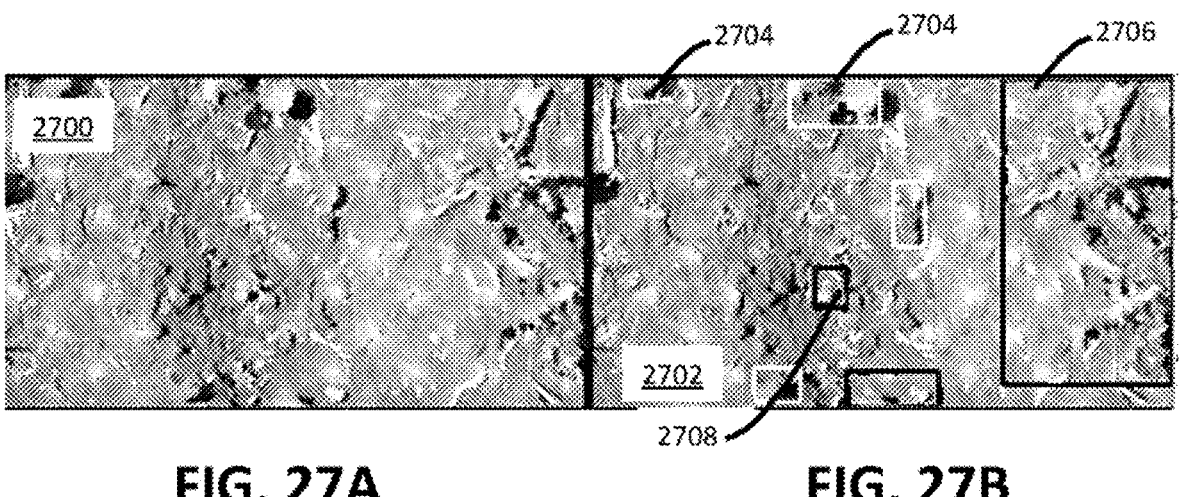
FIG. 27A            FIG. 27B

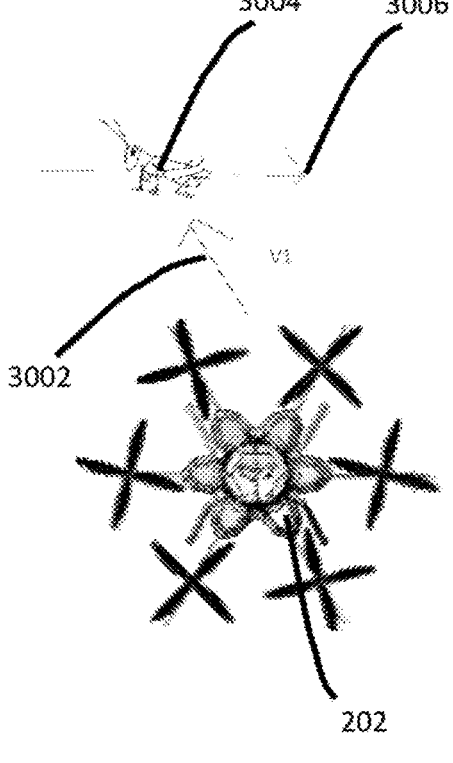
3004   3006
3002
202
At time T1, drone tracks a pest moving across its field of view. Drone is moving forward and pest is moving laterally.
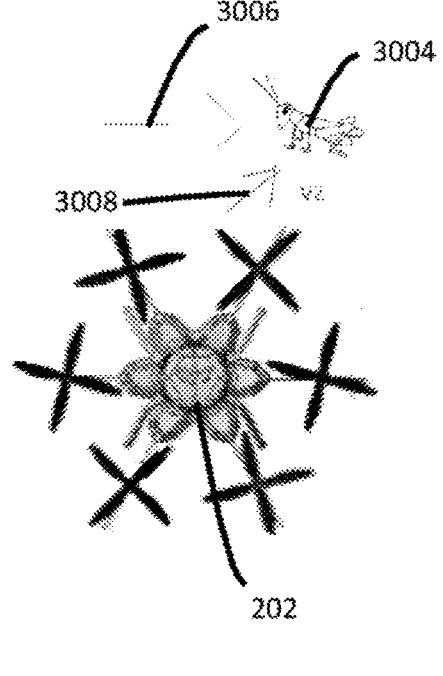
3006   3004
3008
202
At time T2, drone has moved forward a few inches and pest has moved laterally a few inches. New vector V2 is calculated representing updated screen position.
FIG. 30A          FIG. 30B

SYSTEM AND METHOD FOR FIELD TREATMENT AND MONITORING

PRIORITY

The present application claims priority to International Patent Application No. PCT/CA2020/050276, filed on Feb. 28, 2020, which claims priority to Canadian Application No. 3,035,225, filed on Feb. 28, 2019. These prior applications are incorporated herein by reference in their entirety.

FIELD

This invention is in the field of drones, and more specifically to systems and methods of using an unmanned aerial or land vehicle (e.g. drone) for agricultural and/or pest control applications, such as on farms, golf courses, parks, and/or along roadways, power lines, railroads, etc.

BACKGROUND

Generally, a current farm management with a crop process 100 may be shown in FIG. 1. The farmer or agrologist may survey a field for a variety of weeds, fungi, or insects 102 (collectively known herein as "pests"). A pesticide, such as a herbicide, a fungicide, or an insecticide, and/or a mixture thereof, may be selected 104 and purchased from a pesticide dealer. An appropriate application time may be determined 106 and when the application time is reached, the pesticide may be broadly applied to the field. The term pesticide may include all of the following: herbicide, insecticides (which may include insect growth regulators, termiticides, etc.), nematicide, molluscicide, piscicide, avicide, rodenticide, bactericide, insect repellent, animal repellent, antimicrobial, fungicide, and any combination thereof.

In some instances, the appropriate application time may be a balance between a number of pests, an expense for applying the pesticide, and potential damage to the crop. If the application of the pesticide is too late, the pests may be done significant damage to the crop. If the application of the pesticide is too early, then a second application may be required later in the season resulting in additional costs. Also, broad application of pesticides may be wasteful as the application of the pesticide may be to areas of the field that do not have the pests.

Benefits of the aspects described herein may address disadvantages of the current farm management with the crop process. Other advantages may be apparent to a person of skill in the art upon understanding the aspects as described herein.

SUMMARY

The aspects as described herein in any and/or all combinations consistent with the understanding of one skilled in the art on review of the present application.

According to an aspect, there is provided a field treatment system. The field treatment system may have one or more drones receiving one or more pesticides. A base station may dispense the pesticides. One or more holding tanks may supply the base station with the pesticides. The drones may have a data collection system, a navigation system, a propulsion system, a targeting system, a treatment system, and a power source.

The data collection system may provide data and have at least one of: one or more positioning sensors, one or more agricultural sensors, and one or more cameras. The positioning sensors may be selected from at least one of: an altimeter, an ultrasonic sensor, a radar, a lidar, an accelerometer, a global positioning sensor, and the cameras. The one or more agricultural sensors may be configured to measure at least one of: a soil acidity, a soil moisture, a soil temperature, a conductivity, a wind direction, a wind speed, and radiation.

The navigation system may receive the data from the data collection system, determine a travel path of the drones, determine when an obstacle is in the travel path of the drones and adjust the travel path, and provide one or more propulsion instructions to the propulsion system in order to move the autonomous drones. The one or more drones may be selected from at least one of: an aerial drone, a rolling drone, and a combination of the aerial drone and the rolling drone. The propulsion system may comprise one or more motors turning at least one of: one or more propellers and one or more wheels.

The targeting system may receive the data from the data collection system, analyze the data to identifies one or more targets, provide one or more target instructions to the navigation system, determine when the drones are within a range of the treatment system and provide one or more treatment instructions to the treatment system. The treatment system may provide the one or more pesticides to the one or more targets. The treatment system may activates an eradication device directed to the one or more targets. The eradication device may be selected from at least one of: a weed trimmer, a heater, a digger, a microwave, a high energy laser, and an electric discharge. The targeting system may construct a soil profile or a plant profile.

At least one of: the data collection system, the navigation system, and the targeting system may be stored within a tangible computer-readable medium and may be executed by a processor within the one or more drones. The targeting system may be stored within a tangible computer-readable medium and is executed by a processor within the base station.

The base station comprises a refilling system for refilling one or more canisters. The canisters may be within the drones. The refilling system may have a hose under pressure and a controller to activate a valve to dispense the pesticides into the at least one canister. A pressure in the hose may be provided by a pump controlled by the controller or a gravity feed system. A weigh scale weighing the canisters may determine a full canister condition and the controller may deactivates the valve. A spill container may capture the pesticides from either a leak or the at least one canister being overfilled. A level sensor within the spill container may close the valve or deactivate the pump. A conveyor system may transport one or more empty canisters from a drone docking area to the refilling system and may transport one or more full canister from the refilling system to the drone docking area. The base station may have a battery charging system for charging the power source of the drones.

A communication system may enable communication between the base station and the drones, and communication between at least a pair of the drones. One or more mission rules may be transmitted between the base station and the autonomous drones. The targeting system may be configured to prioritize the at least one mission rule.

The field treatment system may be transportable in a self-contained trailer.

In another aspect, there is provided a system for monitoring a field. One or more drones may have a data collection system, a navigation system, a propulsion system, and a power source. The drones may pass over the field collecting data. The data collection system may collect the data from at least one of: at least one positioning sensor, at least one agricultural sensor, and at least one camera. The at least one positioning sensor may be selected from at least one of: an altimeter, an ultrasonic sensor, a radar, a lidar, an accelerometer, a global positioning sensor, and the at least one camera. The at least one agricultural sensor is configured to measure at least one of: a soil acidity, a soil moisture, a soil temperature, a conductivity, a wind direction, a wind speed, and radiation.

The navigation system may receive the data from the data collection system, determines a travel path of the drones, determines when an obstacle is in the travel path of the drones and adjusts the travel path, and provides at least one propulsion instruction to the propulsion system in order to move the drones. The propulsion system may have at least one motor turning at least one of: at least one propeller and at least one wheel. The drones may be selected from at least one of: an aerial drone, a rolling drone, and a combination of the aerial drone and the rolling drone.

A targeting system may receive the data from the data collection system, analyze the data to identify at least one target, and record a location of the at least one target in a target list. A communication system may enable communication of the data among the drones and a base station. The base station may transmit the at least one target to at least one rolling drone for treatment. A high clearance sprayer may receive the target list and treating the at least one target from the target list.

The data collection system, the navigation system, and the targeting system may be stored within a tangible computer-readable medium and is executed by a processor within the drones. The targeting system may construct a soil profile or a plant profile.

According to another aspect, there is provided a method for field treatment. The method may collect data with a data collection system; process the data by a navigation system to produce a travel path for at least one autonomous drone; propel the at least one autonomous drone by a propulsion system according to the travel path; and take at least one agricultural measurement from the field along the travel path.

The data collection system may collect the data from at least one of: at least one positioning sensor, at least one agricultural sensor, and at least one camera. The at least one positioning sensor may be selected from at least one of: an altimeter, an ultrasonic sensor, a radar, a lidar, an accelerometer, a global positioning sensor, and the at least one camera. The at least one agricultural measurement may be selected from at least one of: a soil acidity, a soil moisture, a soil temperature, a conductivity, a wind direction, a wind speed, and radiation.

The method may determine when an obstacle is in the travel path of the at least one autonomous drone and adjust the travel path, and providing at least one propulsion instruction to the propulsion system in order to move the at least one autonomous drone to an adjusted travel path.

The propulsion system may have at least one motor turning at least one of: at least one propeller and at least one wheel. The at least one autonomous drone may be selected from at least one of: an aerial drone, a rolling drone, and a combination of the aerial drone and the rolling drone.

The method may analyze the data by a targeting system to identify at least one target; and providing at least one target instruction to the navigation system. The targeting system may construct a soil profile or a plant profile.

The method may communicate among the at least one autonomous drone and a base station using a communication system. The base station may transmit the at least one target to at least one rolling drone for treatment. The method may dispense at least one pesticide from at least one holding tank into at least one canister of the at least one autonomous drone. The method may determine when the at least one autonomous drone is within a range of a spraying system and providing at least one spray instruction to the spraying system. The at least one canister may be within the at least one autonomous drone.

The method may treat the at least one target with at least one treatment.

The method may activate a valve to dispense the at least one pesticide into the at least one canister from a hose fluidly coupled to the at least one holding tank. The method may pressurize the hose with a pump or a gravity feed system. The method may weigh the at least one canister; determine a full canister condition; and deactivate the valve. The method may capture the at least one pesticide from either a leak or the at least one canister being overfilled in a spill container. The method may measure a level using a level sensor within the spill container; and cease dispensing of the at least one pesticide. The method may transport at least one empty canister from a drone docking area to a refilling system; and may transport at least one full canister from the refilling system to the drone docking area. The method may charge a power source of the at least one autonomous drone.

The method may transmit at least one mission rule from the base station to the at least one autonomous drone. The method may prioritize the at least one mission rule at the at least one autonomous drone.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

FIG. 21 is a block diagram of a steering system for the rolling drone;

FIGS. 27A and 27B are images of the field of view of the drone demonstrating target identification;

FIGS. 30A and 30B are top down diagrams demonstrating targeting of a moving pest.

DETAILED DESCRIPTION

The treatment system 200 disclosed herein may comprise any number and combination of the technologies, systems, subsystems, components, processes, computations, and other items discussed or referred to herein and may also be modified or augmented with existing technologies known in the art upon review of the content herein and still be within the scope and intent of the content disclosed herein.

Figure 2:
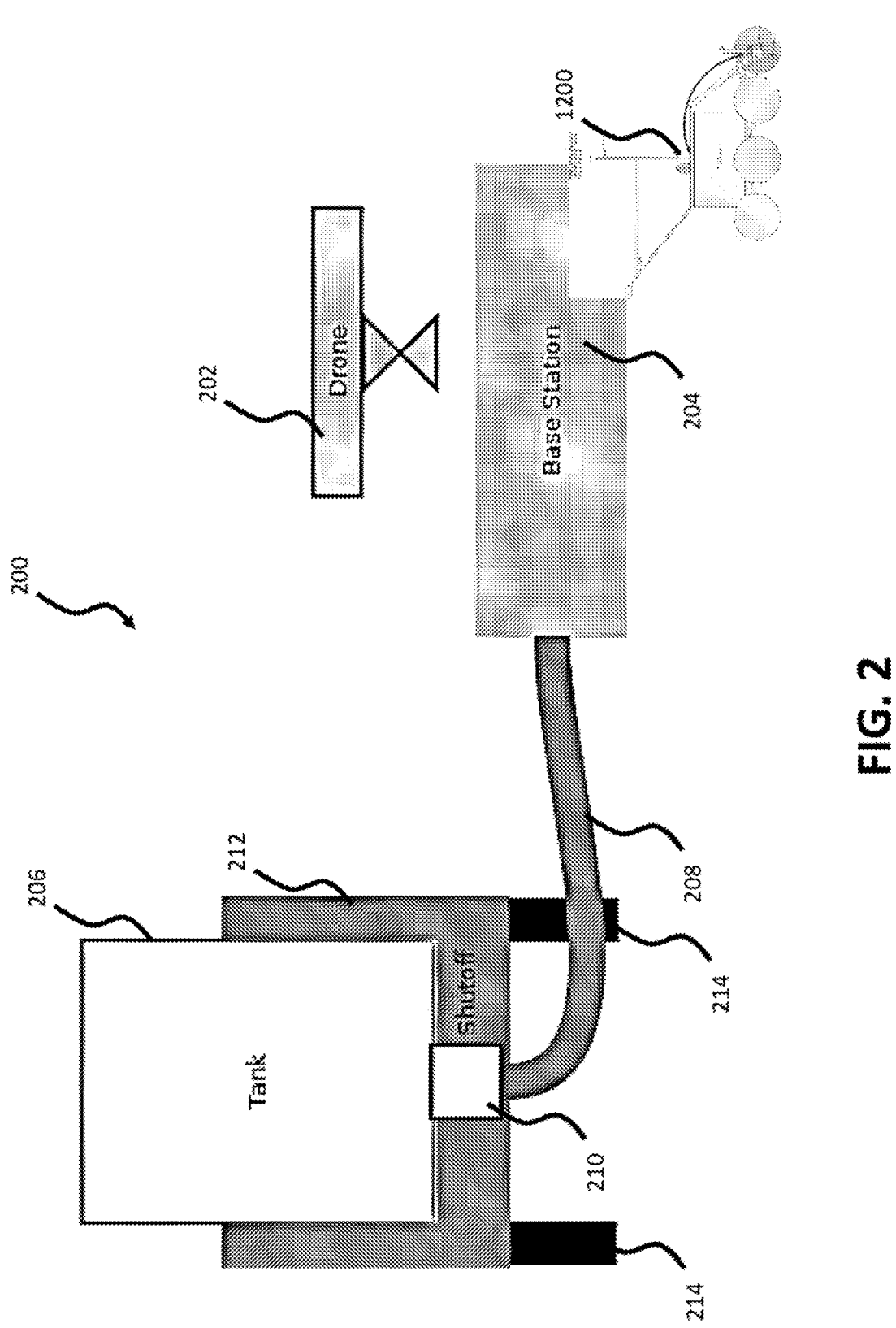
FIG. 2 is a side block diagram of a treatment system having a drone, a base station, and an independent pesticide holding tank.
Figure 12A:
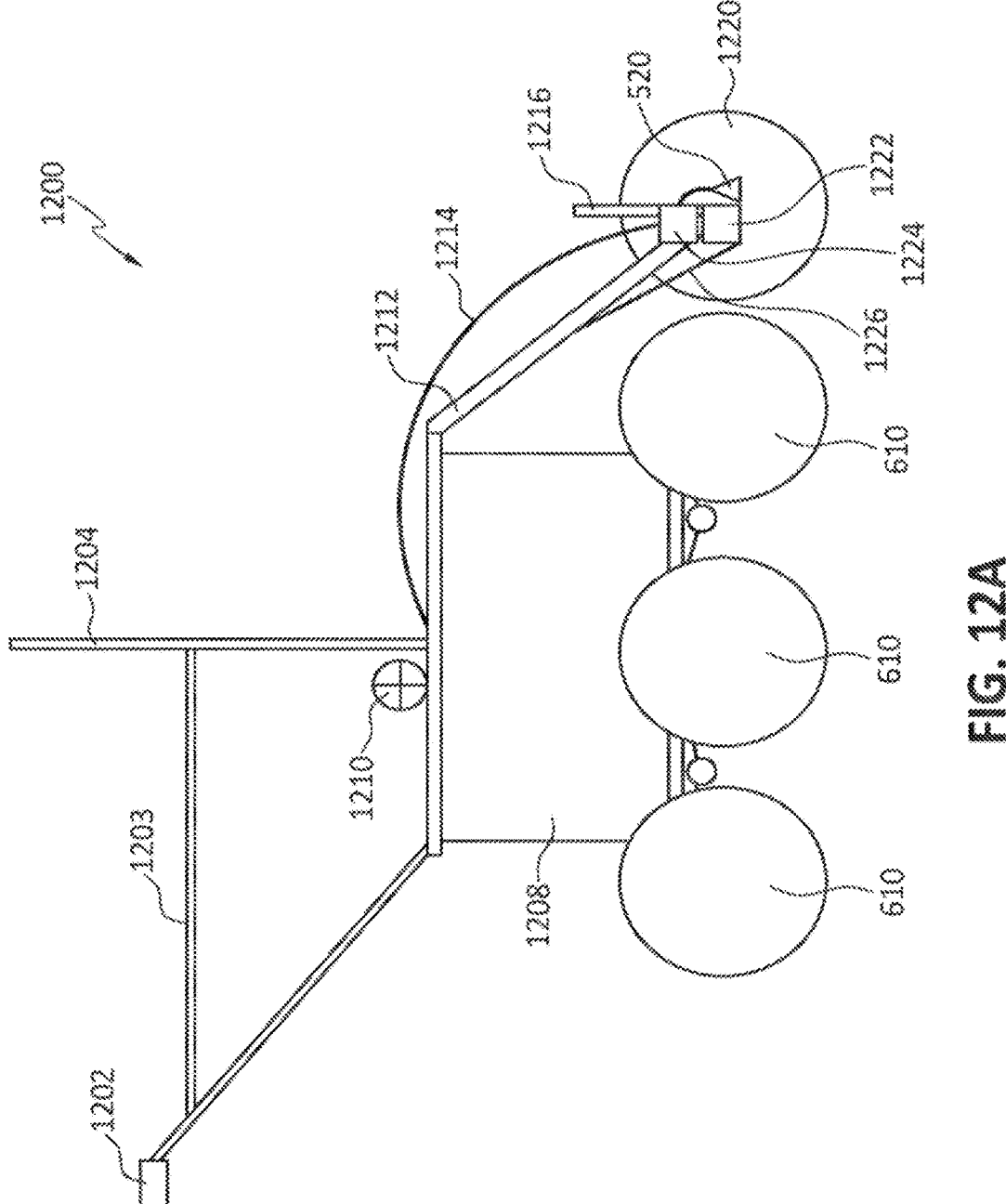
FIG. 12A is a side view diagram of a rolling drone.
Figure 12B:
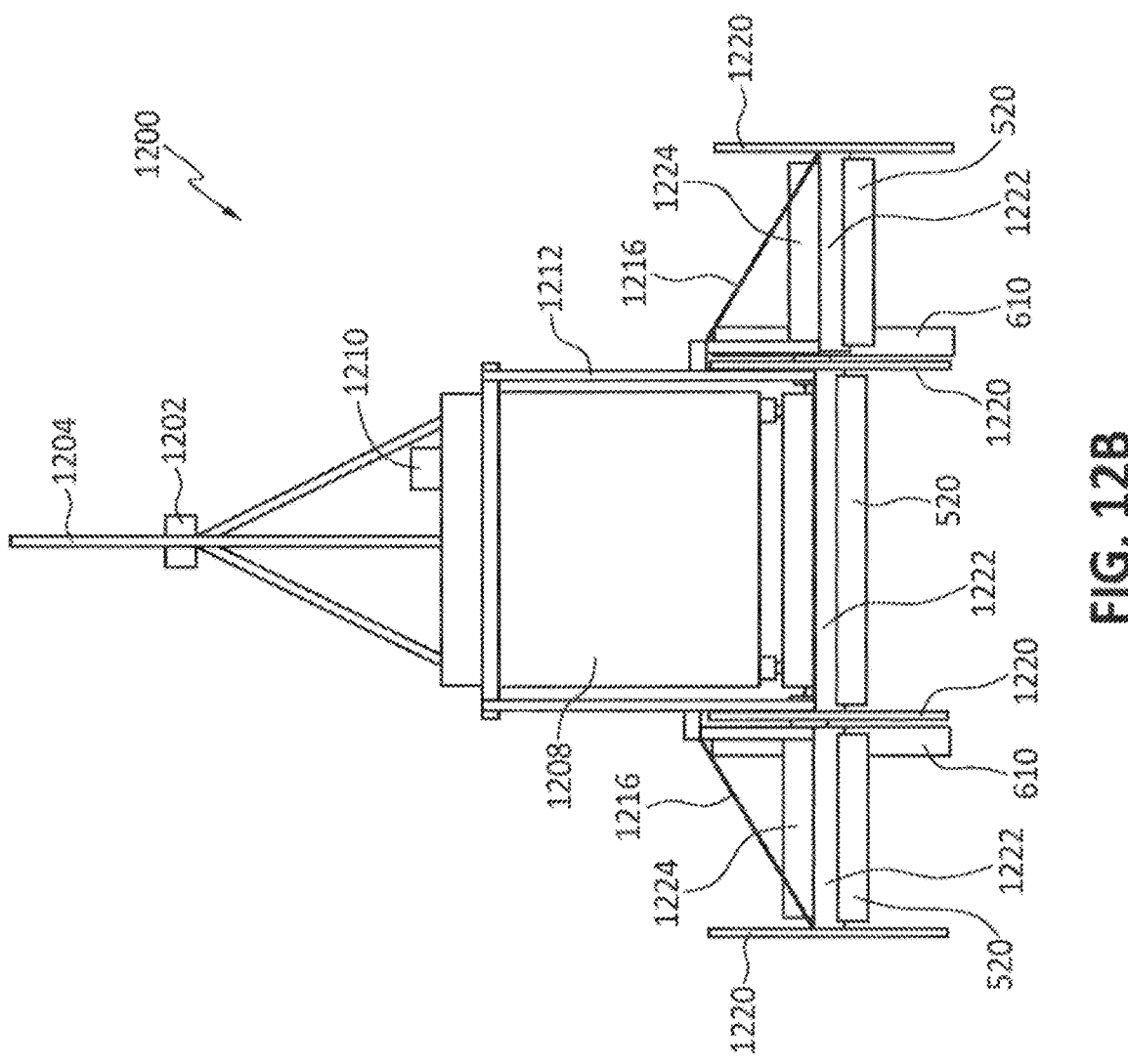
FIG. 12B is a rear view diagram of the rolling drone.

With reference to FIG. 2, a treatment system 200 may comprise one or more aerial drones 202, one or more base stations 204, one or more pesticide holding tanks 206, and/or one or more rolling drones 1200, as described in further detail with regard to FIGS. 12A and 12B. In this aspect, the drone 202 may be an aerial drone 202 capable of autonomous flying over an example field 2300. The aerial drone 202 may land on or near the base station 204 in order to receive electrical power and/or pesticide from the base station 204. Similarly, the rolling drone 1200 may likewise be capable of autonomous movement around the field 2300 and may dock with the base station 204 in other to receive electrical power and/or pesticide from the base station 204. In some aspects, the base station 204 may retrieve data from the aerial drone 202 and/or the rolling drone 1200. In some aspects, the rolling drone 1200 may act as a mobile base station 204 for the one or more aerial drones 202. The base station 204 may be supplied by a hose 208 or other type of passageway for the pesticide. The hose 208 may be connected to the tank 206 using a shutoff valve 210 that enables or disables fluid discharge from the tank 206. The shutoff valve 210 may be a manual valve and/or an automatic valve controlled by the base station 204. The tank 206 may be an independent pesticide holding tank. The tank 206 may be supported above the ground using a support structure 212 having a number of support legs 214.

In some aspects, the treatment system 200 may be fully transportable, such as within a self-contained trailer (not shown) that may be pulled behind a truck or tractor (not shown). In other aspects, the treatment system 200 may be mobile having one or more wheels, steering, and drive motor. In yet another aspect, the base station 204 and holding tank 206 may comprise one or more propulsion devices capable of transporting the base station 204 and holding tank 206 through the air. Although a single holding tank 206 is demonstrated herein, other aspects may have more than one holding tank 206 comprising different types of pesticides. Further details of these particular components of the treatment system 200 may be described in further detail herein.

The treatment system 200 may comprise one or more mission rules, which may be stored in whole or in part in a mission rules database 824, a communication system 614, 1324, 2002 allowing communication by and between the systems and subsystems, such as, the drones 202, 1200, a data collection system 848, a navigation system 608, a targeting system 842, a spraying system 500, a mechanical control system 650, and/or the mission rules which may be the same, in part, across multiple missions and specific, in part, to a particular mission or portion of a mission to be executed by the treatment system 200. The mission rules specific to a mission may govern the mission execution in whole or in part and communicate all or part of the information, data and parameters that the drones may use to execute the mission. One or more of the drones 202, 1200 may be deployed after receiving all or part of the information, data, and/or parameters the drones 202, 1200 required to execute a mission. The drone 202, 1200 may receive portions of the mission rules after the drone 200, 1200 has been deployed and during execution of the mission and after the mission is executed, for example, directing the drone 202, 1200 to execute another mission. The treatment system 200 may use a single drone 202, 1200 or multiple drones 202, 1200 working together for the mission. If using multiple drones 202, 1200, each of the multiple drones 202, 1200 may have the same, similar, and/or different mission tasks and/or mission rules.

The mission rules may comprise one or more optimization rules to be applied and may modify the optimization rules during the mission and/or allow the targeting system 842 to modify the optimization rules during the mission. If the predictive analysis subsystem 822 cannot make the determination with the current mission rules database 824, the targeting system 842 may flag the object to the data collection system 848 so that the data collection system 848 may gather additional data regarding the object. The data collection system 848 and the predictive analysis subsystem 822 may both be capable of processing multiple objects and/or groups of objects simultaneously as described herein. The data collection system 848 and the predictive analysis subsystem 822 may be stored and/or executed in the drones 202, 1200 and/or the base station 204. The targeting system 842 may be a distributed system contained in one or more drones 202, 1200 and/or the base station 204 or other mission command center 932.

The treatment system 200 may be used to accomplish mission objectives within a specific geographic treatment area according to the mission rules. The mission rules may define one or more boundaries and some of the content of the treatment area. The mission rules may provide instructions, data, computational parameters, constants, and/or variables to the treatment system 200 to allow the treatment system 200 to identify objects within the treatment area to be treated and to distinguish objects to be treated from objects that are not to be treated and from objects that are to be ignored or otherwise dispositioned. The treatment system 200 may execute the treatment mission whereby one or more drone systems 202, 1200 may be used to gather information.

The treatment system 200 may execute a treatment mission whereby one or more drones 202, 1200 may be used to identify objects within the treatment area to be treated to allow the objects so identified to be distinguished one from another. The drone 202, 1200 may be used to identify objects to be treated from objects that are not to be treated and from objects that are to be ignored or otherwise dispositioned. The treatment system 200 may execute a treatment mission whereby one or more drones 202, 1200 may be used to treat the objects identified for treatment.

Figure 3:
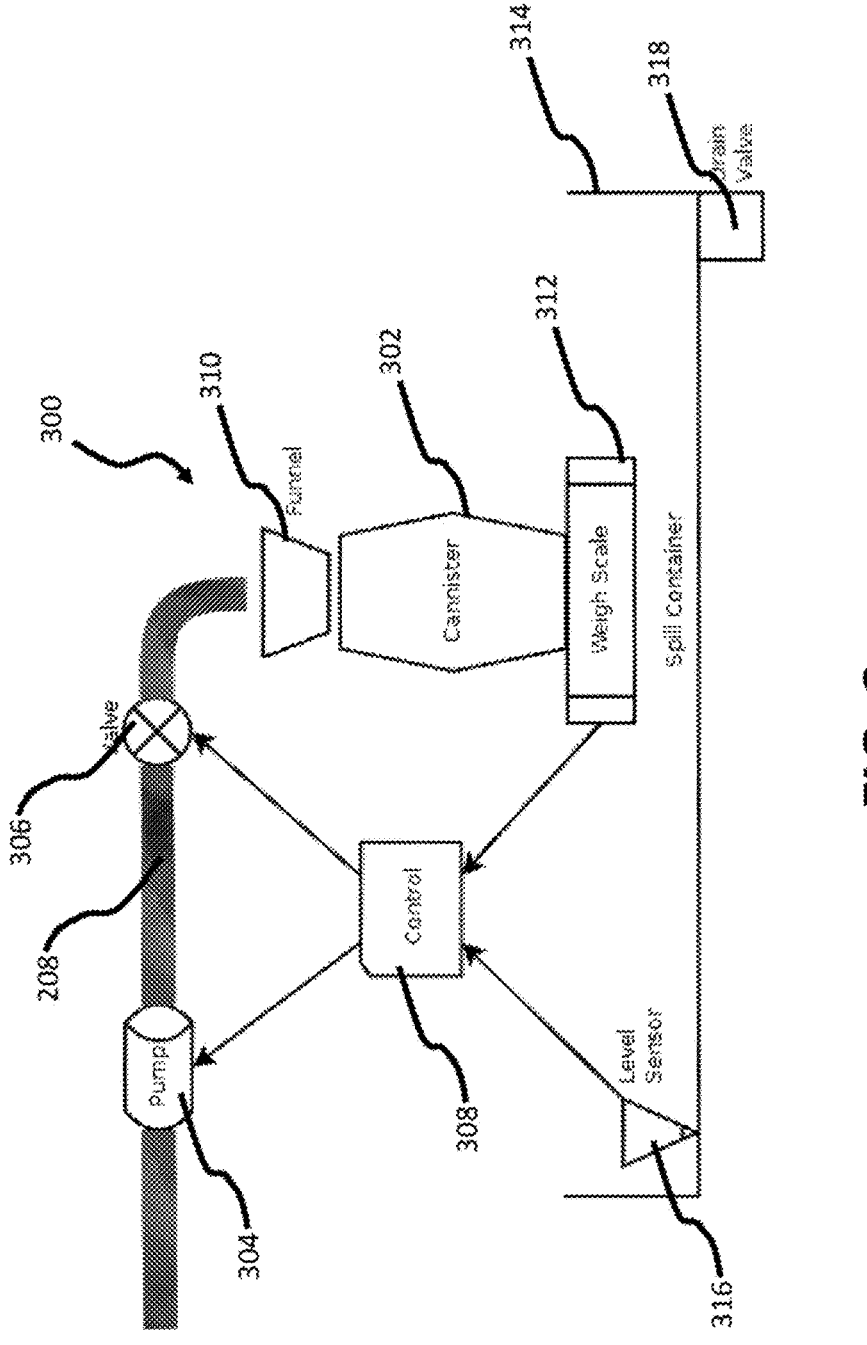
FIG. 3 is a block diagram of a canister refilling system.

Turning to FIG. 3, a block diagram of a refilling system 300 for refilling one or more canisters 302. A pump 304 may provide pressure for the pesticide within the hose 208 enabling the hose 208 to dispense the pesticide into the canister 302. When the pressure within the hose 208 reduces below a threshold pressure as measured by a pressure sensor 1404, a controller 308 may activate the pump 304 in order to increase the pressure within the hose 208. A valve 306 may be selectively turned on and off using the controller 308. The valve 306 may output the pesticide into a funnel 310 above the canister 302 in order to reduce or prevent spillage. In some aspects, the funnel 310 may be attached to the canister 302 while in other aspects, the funnel 310 may be suspended above the canister 302. In another aspect, the pressure may be maintained within the hose 208 using a gravity feed system rather than the pump 304. In the gravity feed system, when the pressure sensor 1404 falls below the threshold pressure, an alert message may be transmitted by the controller 308 to the mission command center 932 indicating that the holding tank 206 is empty.

A weigh scale 312 may weigh the canister 302 and an amount of pesticide being dispensed into the canister 302. The controller 308 may periodically initiate a reading from the weigh scale 312. If the controller 308 does not detect the weight of the canister 302 on the weigh scale 312, then the controller 308 maintains the valve 306 in a closed position. When a canister 302 is in position on the weigh scale 312, the controller 308 detects the canister 302 as the reading exceeds a canister weight threshold. The controller 308 may then initiate a refilling process as described below.

When the canister 302 has been detected by the controller 308, the controller 308 may periodically initiate the reading from the weigh scale 312 and may compare this reading with a weight corresponding to a full canister 406. If the reading from the weigh scale 312 is below the weight corresponding to a full canister 406 (e.g. filled with pesticide), then the controller 308 may activate the pump 304 and/or initiate an opening of the valve 306. When the reading is equal to or exceeds the weight corresponding to the full canister 406, the controller 308 initiates a closure of the valve 306 and/or deactivates the pump 304. A sampling rate of the weigh scale 312 may be sufficiently fast in order to determine when the canister 302 is full in order to prevent spillage. A size of the canister 302 may be dependent on the size of the field, the type of pesticide, and/or the size of the drone 202, 1200. In some aspects the canister 302 may be pressurized and a pressurized refilling system may be used to fill the canister 302. In other aspects the canister 302 may be unpressurized and use a pumping mechanism or gravity feed.

In another aspect, the refilling system 300 for refilling the one or more canisters 302 may be surrounded by a spill container 314. If the container 302, the hose 208, the valve 306, and/or the pump 304 happens to leak or the container 302 is overfilled, the spill container 314 may collect a spilled pesticide therein. A level sensor 316 may trigger a signal sent to the controller 308 and in response, the controller 308 may deactivate the pump 304 and/or close the valve 306. In some aspects, the controller 308 may close the shutoff valve 210 at the tank 206. The controller 308 may initiate a message send to the command center 932 prompting a maintenance person. When the maintenance person has corrected a cause of the spill or leak, the maintenance person may drain the spill container 314 using a drain valve 318, which may be a manual valve or an automatic valve initiated by a button sending a signal to the controller 308.

Figure 4:
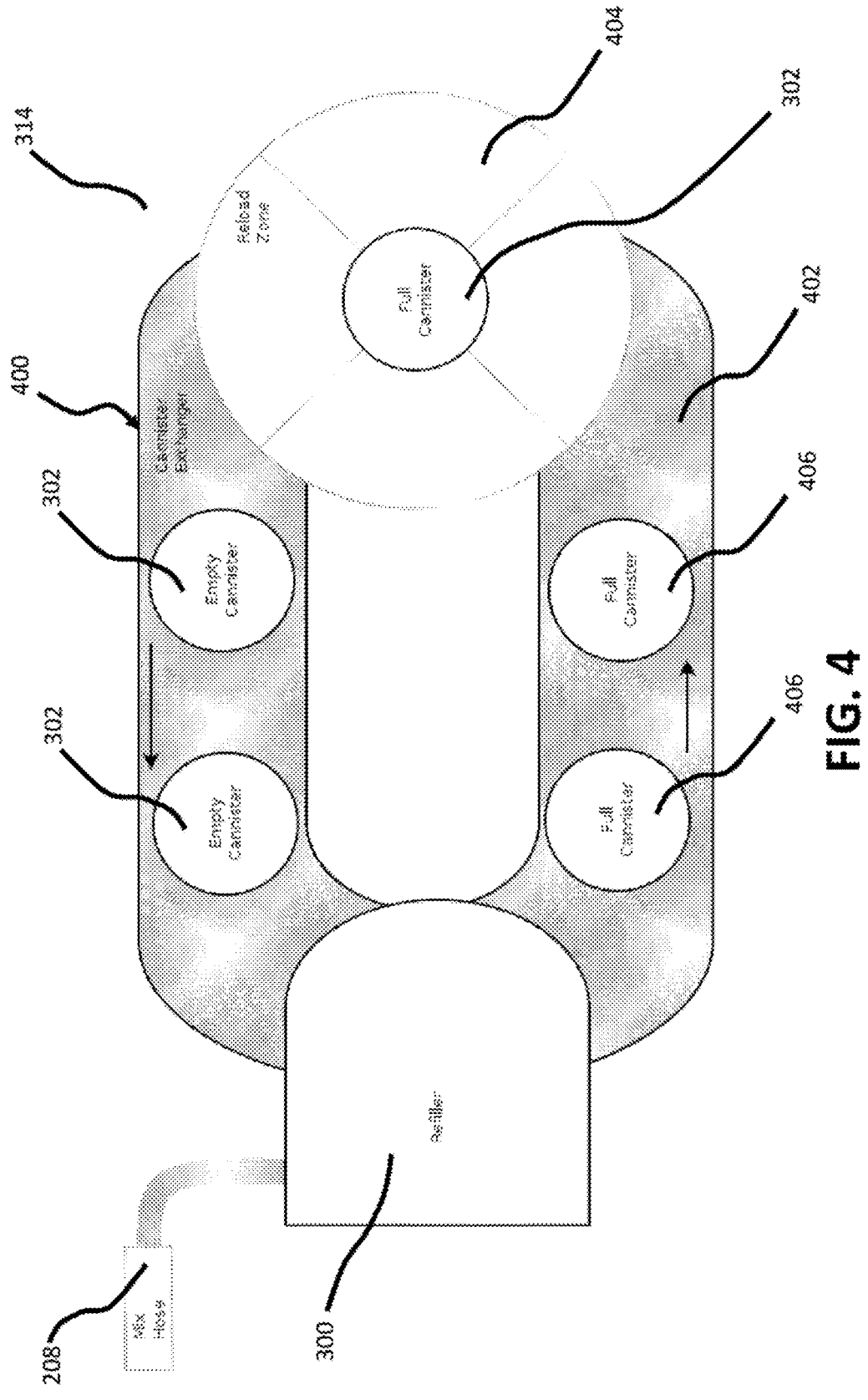
FIG. 4 is a top view block diagram of a refilling system for the base station.

Turning to FIG. 4, the refilling system 300 may work in conjunction with a conveyor system 400. The conveyor system 400 may comprise a conveyor 402 that may transport empty canisters 302 from a drone landing or docking area 404 to the refilling system 300 in order to be refilled. The docking area 404 may be part of the base station 204. Once filled, the conveyor 402 may transport the full canisters 406 from the refilling system 300 to the drone landing or docking area 404. The controller 308 may control the conveyor 402 so that the conveyor 402 only operates when the drone 202, 1200 has docked with the docking area 404. In this aspect, the entire conveyor 402 and docking area 404 may be surrounded by the spill container 314. In this aspect, the conveyor 402 may be a continuous conveyor.

In another aspect, the refilling system 300 may fill the drone 202, 1200 without transporting empty canisters 302. For example, the drone 202, 1200 may comprise a refill port (not shown) fluidly coupled to the onboard canister 302. The refill port may be connected to the hose (e.g. umbilical) of the refilling system 300 when the drone has landed or docked with the base station 204. The refilling system 300 may dispense the pesticide into the refill port in order to fill the onboard canister 302.

The drone 202, 1200 may have a housing 1208 coupled to one or more motors 610 with a frame 1604. In this aspect, the housing 1208 may be a generally square or a rectangular box with a generally hollow interior for holding one or more components 600 as described in further detail below. For the aerial drone 202, the one or more motors 610 may spin one or more propellers 620 using one or more gears 622. The propellers 620 may be protected using one or more guards (not shown) that may be coupled to the motors 610 or the frame 1604. A agricultural sensor probe (not shown) having one or more agricultural sensors 612 may be present on or proximate to a bottom of the housing 1208 and configured to contact the ground when the aerial drone 202 has landed and/or be extended to contact the ground for the rolling drone 1200. The one or more components 600 within or mounted to the housing 1208 may comprise one or more printed circuit boards (PCBs) (not shown) having a number of electronic components and/or electromechanical components.

Figure 5:
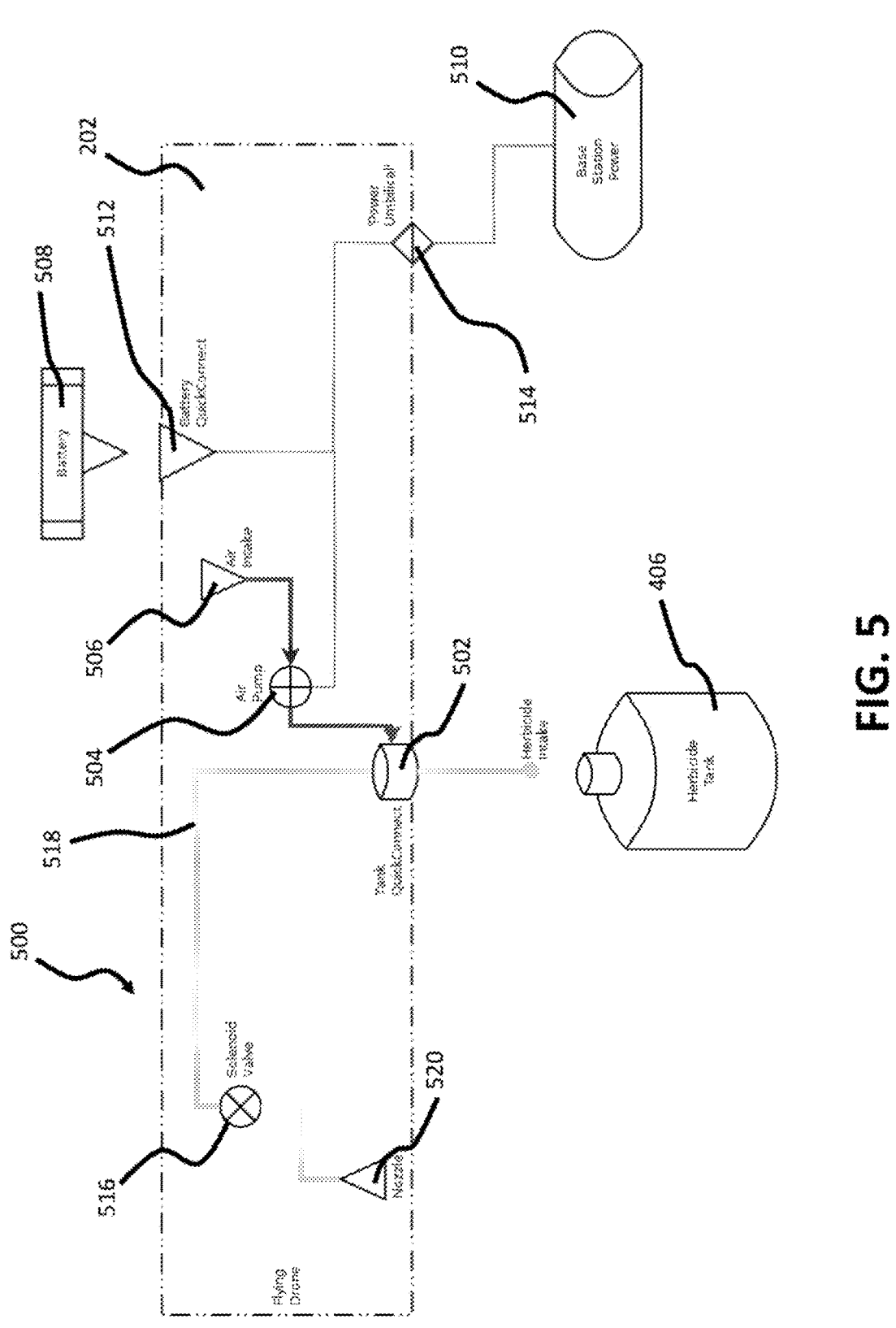
FIG. 5 is a system diagram of a spraying system of the drone.

FIG. 5 demonstrates a spraying system 500 of the drone 202, 1200. The spraying system 500 may comprise a quick connect 502 for receiving the full canister 406 or discharging the empty canister 302. In some aspects as previously described, the drone 202, 1200 may comprise the refill port and therefore would not require the quick connect 502 in order to fill the canister 302. The quick connect 502 may be activated using an air pump 504 such that when the air pump 504 is activated, the quick connect 502 releases the empty canister 302. The air pump 504 may receive air from an air intake 506 and be supplied with electrical power from either a battery 508 and/or a power supply 510 of the base station 204. In this aspect, the battery 508 may be connected using a battery quick connect 512 and/or the power supply 510 may supply power using a power umbilical 514. The pesticide from the full canister 406 may be provided to a solenoid valve 516 via one or more internal hoses 518. The solenoid valve 516 and/or the air pump 504 may be controlled by a drone controller 600 within the drone 202, 1200. When pesticide is to be expelled from the drone 202, 1200, the drone controller 600 opens the solenoid valve 516 permitting the pressurized pesticide from the full canister 406 to be expelled out of one or more spray nozzles 520.

Although the term spraying system 500 is used herein, this term is not intended to be limiting. The spraying system 500 may comprise a chemical spray and/or a chemical applicator such as a wick or swab applicator. The spraying system 500 as used herein may also comprise any other system of treatment that deploys one or more chemical and/or organic substance in response to a command. The drone 202, 1200 may comprise a non-chemical treatment system that may deploys a non-chemical treatment. The non-chemical treatment may comprise an energy treatment such as heat (or fire), sound, radiation, electricity, mechanical removal, etc. The spraying system 500 may comprise both chemical and non-chemical treatment applications.

The spraying system 500 may include one or more spray nozzles 520 mounted on the drone 202, 1200, on one or more spray arms or booms 1222 that may be mounted upon the drone 202, 1200, or a combination thereof. The spraying system 500 may be attached to the drone 202, 1200 using a 2-axis or 3-axis mechanical gimbal mount (not shown), servomotors 610, and/or other electro-mechanical components capable of controlling a spray nozzle vector including pitch, elevation, yaw, azimuth, etc. through the spray arms 1222 and/or the spray nozzles 520. The spraying system 500 may include the servomotor(s) 610 within the drone 202, 1200 configured to drive the gimbal to the identified target. The spraying mechanism may comprise one or more valves 1224 within the spraying system 500 may be configured to activate the spray, in response to a spraying command from a processor 602. The spraying mechanism within the spraying system 500 may be configured to adjust the spray nozzle 520 to change a spray geometry from a fine stream to a broader stream, to a fine mist, and/or to any combination therebetween. In some aspects, the treatment may be applied automatically when the drone 202, 1200 lands on (or arrives at) a treatment area described in further detail herein.

In some aspect, the spraying system 500 may be a part of or be coupled to the mechanical system 650 in order to move one or more spray arms or booms 1222 and/or one or more spray nozzles 520. A spray application, also referred to as a spray event, may be accomplished by aiming the spray nozzle 520 at the target and opening a spray valve 1224 to release the spray chemical and closing the spray valve 1224 to stop the release of the spray chemical. In some aspects, the treatment may be applied automatically when the drone 202 lands on, hovers over, and/or is generally in proximity of (or for rolling drones 1200 arrives at) the treatment area.

Figure 6:
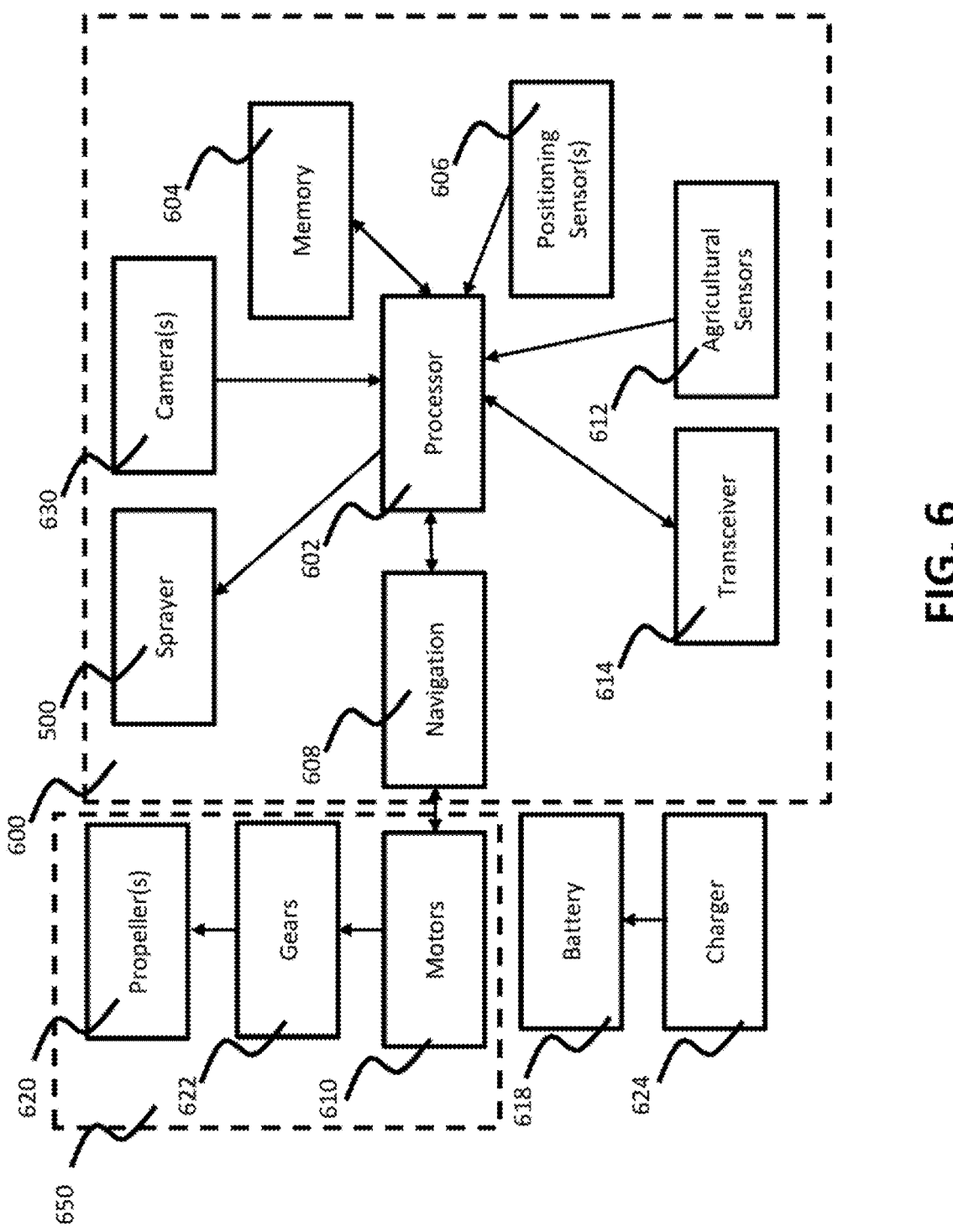
FIG. 6 is a block diagram of various electronic components of an aerial drone.

As shown in FIG. 6, a computing system 600 for the drone 202, 1200 is demonstrated. The computing system may comprise a processor 602 may execute computer-readable instructions from a tangible computer-readable medium 604 (e.g. memory) and the processor 602 may store data to the memory 604. The processor 602 may execute instructions in order to capture image data from one or more camera(s) 630. The camera(s) 630 may have a field of view generally below and/or in front of the drone 202. At least one of the camera(s) 630 may have a field of view generally in a direction of motion of the drone 202, 1200. In some aspects, at least one of the camera(s) 630 may automatically change direction to the direction of motion of the drone 202, 1200. In other aspects, the drone 202, 1200 may rotate in order to align the field of view along the direction of motion of the drone 202, 1200.

The drone 202, 1200 may comprise a data collection system 848. The data collection system 848 may comprise any one of or any combination of one or more cameras 630, one or more sensors 606, 612, and/or other data gathering devices. It is to be understood that the data collection system 848 may include an array of various different sensors 606, 612 configured to collect data within a predefined proximal distance from the drone 202, 1200, and transmit the sensor/image data back to the internal software systems of the drone 202, 1200 (e.g., the targeting system 842, the spraying control, the spray vectors engine) and/or to the base station 204 and/or a display device of mission command center 932 for outputting to an operator. The data collection system 848 may provide data to identify objects. This object data may be provided to the targeting system 842 which uses the mission rules and object comparison data to determine if the object is the target for this mission, the target for another mission, the non-target to be protected from spraying, an obstacle to be avoided and/or an object to be ignored.

Various aspects of the drone 202, 1200 may comprise systems or subsystems for automatic detection of objects and for determining if an object is to be treated according to the mission rules. An object to be treated according to the mission rules may be sometimes referred to as a target. An object that is identified whereby treatment of said object is to be expressly avoided according to the mission rules may be sometimes referred to as a non-target. Various aspects of the drone 202, 1200 may include capabilities for automatic detection of objects that the drone 202, 1200 may physically avoid according to the mission rules or objects to be ignored altogether in this mission or future missions. The mission rules may be used to differentiate between objects, determine if an object is to be avoided with treatment, to select targets to be sprayed, to prioritize targets, to deselect targets, to re-select targets. The mission rules may be used to determine when, where and how the navigation system 608 may use active stabilization. The mission rules may be used to may include spray vector solutions or be used by the drone 202, 1200 to determine spray vector solutions automatically. The mission rules may be used to achieve target identification, single instance target tagging, continuous and intermittent target tracking, etc.

Various aspects of the drone 202, 1200 may comprise a communication system 614, a data collection system 848, the navigation system 608, the targeting system 842, the spraying system 500, and/or a treatment success verification system. The drone communications system 614 may comprise one or more wireless communication devices and/or a chipset such as a Bluetooth™ device, an 802.11 or similar device, a satellite communication device, a wireless network card, an infrared communication device, a Wi-Fi device, a long range antenna (LoRa), a Real-Time Kinematic (RTK) antenna, a WiMAX device, a cellular communication device, etc. and other communication methods, devices and systems available or available in the future. The drone 202, 1200 may also comprise a data bus between onboard systems and subsystems.

In some aspects, the camera(s) 630 may be affixed or integrally formed with a body of the drone 202, 1200. In other aspects, the camera(s) 630 may be extended on an arm 1203 that may rotate 360-planar degrees and/or extend up to 2 meters outside of perimeter of the drone 202 (e.g. a circumference of the drone 202, 1200). By placing the camera(s) 630 on the arm 1203, the camera(s) 630 may be positioned in a way such that the image may be taken before a propeller wash for aerial drones 202. This configuration may permit more clear images to be captured before the propeller wash, which causes the plants to be buffeted around and/or sideways. In another aspect, the camera(s) 630 may be located on a gyroscope or other stabilizing apparatus to minimize jitter and/or shaking of the camera(s) 630. The arm 1203 may also have some mechanical components (not shown) to adjust a camera angle slightly to follow an incline of a terrain of the field. For example, when the drone 202 travels down a steep incline, the camera(s) 630 may image the field at a slightly inclined angle such as to make the images appear "flat" or consistent to an artificial intelligence (AI) framework 1920. In other aspects, digital post processing may correct for any distortion and/or blurriness of the camera(s) 630.

The camera(s) 630 may comprise a lens, a filter, and an imaging device, such as a CCD or CMOS imager. In some aspects, the filter may only permit certain wavelengths of light to pass through and be captured by the imaging device. For example, the filter may only permit infrared light to pass through. In another example, the filter may only permit ultraviolet light to pass through. In yet another example, the filter may only permit visible light to pass through. The visible light filter may be a filter mosaic in order to permit the image sensor to capture red-green-blue (RGB) colored light. In another aspect, the filter mosaic may also include infrared, ultraviolet light filters, and/or any number of filters, such as 10 bands) that divide light into specific frequency bands. The frame rate of the imaging device may be selected based on the number of filters, such as 30 frames-per-second (fps) per filter. In this aspect, the imaging device may have five filters and therefore the imaging device may have a frame rate of at least 150-fps. In other aspects, the frame rate may be higher or lower for a particular filter. According to some aspects, the camera(s) 630 may capture image data at 30 frames-per-second at a 4 k resolution or greater. The processor 602 may be configured to perform image processing on the captured image data as described in further detail below.

In some aspects, the drone 202, 1200 may comprise one or more light emitting diodes (LEDs) for projecting light from the drone 202, 1200 into the field of view of at least one of the cameras 630. The LEDs may project infrared light, ultraviolet light, red light, blue light, green light, white light, and/or any combination thereof. In some aspects, the processor 602 may modulate the LEDs and/or control an on/off state. In some aspects, the LEDs may start with wavelengths not visible to most pests in order to more accurately determine their position without disturbing the pests.

The processor 602 may read position data from one or more positioning sensor(s) 606, such as an altimeter, ultrasonic sensors, radar, lidar, accelerometers, etc. In some aspects, the positioning sensor(s) 606 may be a pair of cameras 630 capturing binocular vision from the drone 202, 1200. In some aspects, the processor 602 may triangulate a position of one or more features external to the aerial drone 202 in order to assist with navigation by a navigation system 608. The navigation system 608 may provide instructions to the one or more motors 610. In this aspect, the navigation system 608 may be performed using the processor 602. In another aspects, the navigation system 608 may be independent of the processor 602.

In another aspect, the navigation system 608 may comprise one or more navigation and/or positioning sensors 606, such as a GPS system, an altimeter, ultrasonic sensors, radar, lidar, etc. In some aspects, the positioning sensor 606 may be a pair of cameras 630 capturing binocular vision from a separate drone 202, 1200 or a remotely located and fixed-position binocular camera system 630, such as a pole-mounted camera system. In some aspects, the processor 602 may triangulate one or more locations of one more feature external to the drone 202, 1200 and triangulate a drone position using the one or more features external to the drone 202, 1200 in order to assist with navigation by the navigation system 608. The navigation system 608 may receive input from the data collection system 848 to assist with navigation. The navigation system 608 may track a specific location of the drone 202, 1200 relative to a previous location and may do so continuously in order to command the drone motors 610 to propel the drone 202, 1200 to follow a desired path from the base station 204 to a treatment area and then within the treatment area.

The navigation system 608 may provide instructions to control the movement of the drone 202, 1200. The navigation system 608 may determine a first drone location and/or orientation, then be provided a desired second drone location and/or orientation, calculate a propulsion to move the drone from the first location to the second location and issue commands to move the drone 202, 1200 in any number of desired directions, orientations, velocities and/or accelerations. The navigation system 608 may comprise internal processors (not shown) to calculate the propulsion and/or may rely on processing resources 602 external to the navigation system 608 to calculate the propulsion with the navigation system 608. The navigation system 608 may issue commands to the drone mechanical system 650, such as motors 610 and gears 622, to control the propulsion system 620, such as wheels 1206 and/or propellers 620, to control the movement of the drone 202, 1200. The control and movement may include commands directed to pitch, elevation, yaw, azimuth, forward, backward, left, right, etc.

The accelerometers may be used to detect and respond to drone 202, 1200 accelerations and vibrations. Such accelerations and vibrations may be caused by weather, terrain, other external influences, and/or mechanical vibration and movement of the drone 202. The drone 202, 1200 may include rate gyros to stabilize the drone 202 and magnetometers and accelerometers used for canceling gyro drift. The global positioning system components or other positioning devices 606 may be included to determine the drone location, heading, and velocity to compute spraying solutions, and to target known treatment target coordinates such as a tree stump or other woody plants that are designated for repeated spraying across multiple missions.

The drone 202, 1200 may comprise the drone mechanical system 650 and the drone mechanical system 650 may comprise a propulsion system 620. The mechanical system 650 may comprise motors 610 driving a transmission system 622, including gears 622, that may in turn drive shafts (not shown) that may drive wheels 1206, rotors or similar components or any combination thereof to create propulsion. The mechanical system 650 may comprise direct drive motors 610 not requiring gears 622 or a combination of direct drive and/or gear drive components. The mechanical system 650 may be commanded by a mechanical control system 650 and/or receive commands directly from the navigation system 608. The mechanical system 650 of the drone may comprise one or more motors 610 to move the drone 202, 1200 to the second location.

The drone 202, 1200 may have one or more agricultural sensors 612 located on a sensor probe (not shown) or alternatively on the wheel 1206. The processor 602 may periodically instruct the navigation system 608 to land the drone 202 or instruct the probe to move into the soil for the rolling drone 1200 at positions in a field. When the drone 202, 1200 has landed or reached a sufficient distance depending on whether or not the sensor 612 requires contact with the field, the processor 602 may read agricultural data from one or more agricultural sensors 612, such as soil acidity, soil moisture, temperature, conductivity, wind, gamma radiation sensor, and/or other radiation sensors, etc. used to construct a soil profile and/or a plant profile.

In some aspects, the sensors 612 may be inserted into the soil via a hydraulic press, auger system, located on the wheel 1206, and/or combination thereof and the sensor 612 may record measurements within the soil and thereby reducing or eliminating the need to collect soil. In another aspect, the sensor 612 may not be inserted into the soil but rather the soil may be collected via an auger system (not shown) or a grapple (not shown) and analyzed by one or more sensors 612 within the drone 202, 1200. In yet other aspects, the sensor 612 may not be located on or within the drone 202, 1200 and the drone 202, 1200 may collect the soil via the auger system or the grapple and may store the soil in a soil canister (not shown) for analysis by the base station 204 and/or delivered to a laboratory. In other aspects, the sensors 612 may be able to remotely sense without requiring physical contact with the soil. For example, one or more sensor readings may be performed by measuring radiation, magnetic fields, and/or spectral analysis. In some aspects, a liquid application system (not shown) may apply a liquid, such as water, to the soil to facilitate softening the soil for collection.

According to some aspects, the processor 602 may perform image processing on the captured image data at a location in order to determine one or more of these characteristics as described in further detail herein.

The processor 602 may communicate via a wireless transceiver 614. The wireless transceiver 614 may communicate using Wi-Fi, Bluetooth, 3G, LTE, 5G and/or a proprietary radio protocol and system, etc. The processor 602 may communicate with the base station 204 in order to relay status data, such as fuel, battery life, pesticide amount, position, etc. and/or agricultural data. In another aspect, the status data and/or agricultural data may be stored in internal memory, such as an SD card and/or a hard drive) until the processor 602 is within communication range (e.g. the wireless transceiver 614 has a stable connection with the base station 204 or when the drone 202, 1200 docks with the base station 204).

The drone 202, 1200 may have one or more sprayers 500 for spraying or depositing a herbicide, pesticide, and/or fungicide. The sprayer 500 may have a spraying distance of between 0 to 3-ft with a targeting area of 4-inches by 4-inches or some other quanta on the ground and a spraying orientation. Some aspects may have the sprayer 500 capable of the spraying distance of 6-inches to 20-inches. In some aspects, multiple sprayers 500 and/or adjustable sprayers 500 may be used depending on a mode that corresponds to a higher concentration of pests in one area (e.g. may spray higher and/or wider).

In some aspects, the spraying orientation and distance may be adjustable. For example, the sprayer 500 may be located on a boom arm 1222 which may be retracted and/or repositioned in a 360-degree pattern. A vertical boom 1222 may adjust a height of the sprayer 500. In another aspect, one or more booms 1222 with one or more sprayers 500 may be present. In yet another aspect, a bar having one or more vertical sprayers may be positioned approximately 6-inches apart. The vertical sprayers may move 2 or more-inches in each direction along the bar creating a "dot-matrix printer"-like effect where the nozzles 520 may be repositioned. In another aspect, the pesticide may be applied using physical contact, such as wicking, to paint on the pesticide contained in a sponge-like material.

In an aspect, the sprayer 500 may have a number of reservoirs (e.g. canisters 302) for holding one or more herbicides, pesticides, and/or fungicides. On detection of a weed 2320, 2322 by the processor 602 as described in further detail below with reference to FIG. 23, the drone 202, 1200 may land or approach within the spraying distance and/or may approach the spray area within the spraying distance. The processor 602 may then select the appropriate reservoir based on a type of weed 2320, 2322 and initiate an actuator in order to spray the chemical and/or powder onto the weed. In another aspect, instead or in addition to the sprayer 500, the processor 602 may instruct a microwave or high energy laser beam directed at the weed 2320, 2322. In another aspect, the processor 602 may instruct the drone

202, 1200 to land on or approach the weed 2320, 2322 and activate a weed eradication device (not shown), such as a weed trimmer, heater, sprayer, digger, microwave, high energy laser, electric discharge, etc.

In another aspect, on detection of the weed 2320, 2322 by the processor 602, the processor 602 may record the GPS/RTK coordinate data and/or other spatial sensing data (e.g. accelerometers, etc.) to determine the spray location without the use of cameras. The GPS/RTK coordinate data may then subsequently be used by a spray drone 202, 1200 that performs treatment of the one or more identified weeds.

In another aspect, the sprayer 500 may have a single reservoir (e.g. canister 302) for holding only one selected pesticide. The processor 602 may be configured to identify only the type of weed 2320, 2322 capable of being treated with the selected pesticide. In such a treatment system, a plurality of drones 202, 1200 may each contain different selected pesticides and each processor 602 within each drone 202, 1200 may identify their respective type of weed 2320, 2322.

A battery 618 may be used to power the motors 610 and the other electronic components 600. In some aspects, the battery 618 may only be used to power the other components 600 and a gasoline, hydrogen, or other combustible fuel engine may be used to power the motors 610. The motors 610 may be coupled to one or more propellers 620 via one or more gears 622. One or more chargers 624 may be used to recharge the battery 618.

Figure 1:
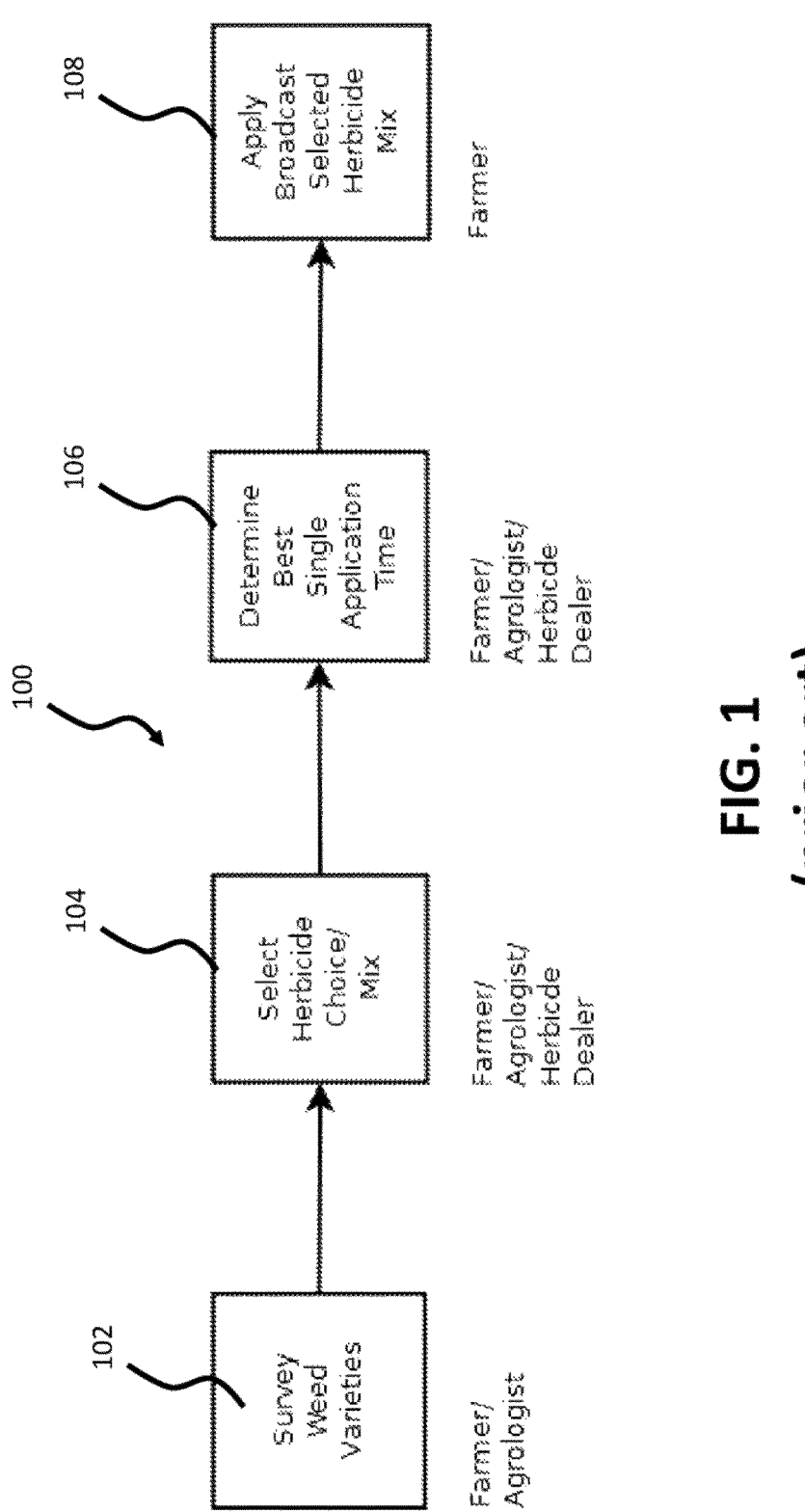
FIG. 1 is a block diagram of the current farm management process.
Figure 7:
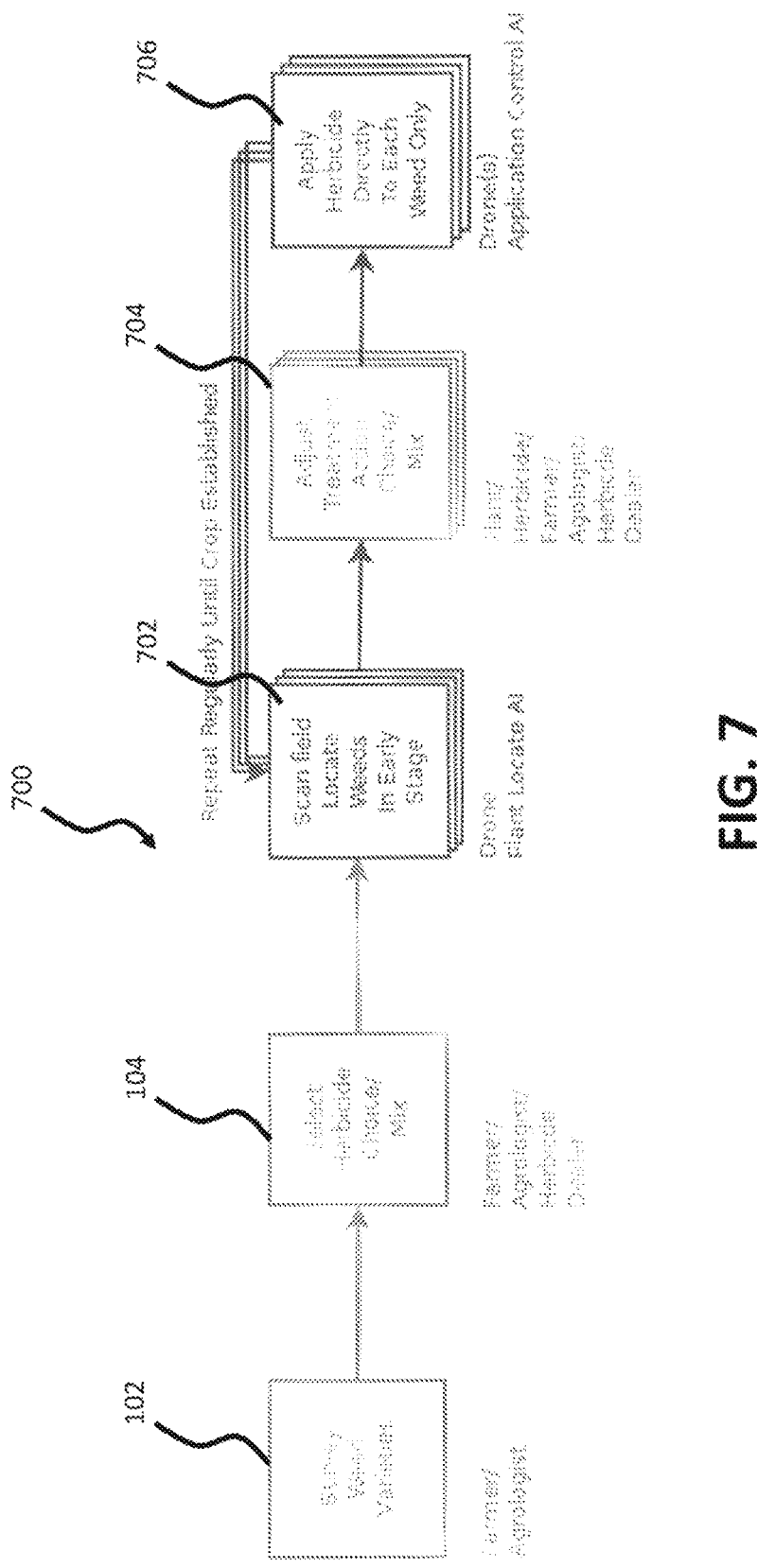
FIG. 7 is a block diagram of an autonomous drone farm management process having a crop phase 1 cycle advanced process.

Turning to FIG. 7, an autonomous drone farm management process 700 having a crop phase 1 cycle advanced process is shown. Steps 102 and 104 may be the same as previously described with reference to FIG. 1. In this aspect, the drone 202, 1200, in particular to aerial drone 202, may perform a scanning process 702 as described in further detail below with reference to FIG. 23 in order to locate any pests in the field. During the scanning process 702, the base station 204 and/or the mission command center 932 may include a rules data store 810 which may include identification rules for plants, pests or other target types. The rules data store 810 may include one or more target selection and target priority rules. The rules data store 810 may include one or more spraying rules, and other chemical application rules specific to the mission, the chemical(s) being applied, the target, and any other data input. The rules data store 810 may include treatment rules, spraying rules, and/or other chemical application rules specific to the mission, including the chemical(s) being applied, the target, and any other data that may be useful in processing and understanding camera/sensor data input. The drone 202, 1200 may include an local onsite data store 824 within the memory 604 which may include identification rules for specific targets, non-targets, plants, pests or other types of objects. The rules data store 810 may include object or target identification, selection and prioritization rules.

Periodically, a treatment action 704 may be adjusted. In general, a broad-scope aerial survey may be performed at high altitude in order to identify key areas requiring treatment within a 1-m by 1-m space, or other size depending on a resolution of the system. For each of these treatment areas, a low-altitude drone 202, 1200 may survey at a lower altitude (e.g. high resolution) and may determine one or more precise coordinates of pests to spray. A pesticide application process 706 may then instruct one or more of the drones 202 to apply the pesticide directly to each area of the field impacted by the pest and/or directly to the pest itself. In alternative aspect, the pesticide application process 706 may provide the location and/or coordinates of the identified pests to a manually controlled system, such as a high clearance sprayer or may provide a map to a farmer with a manual sprayer.

Figure 8:
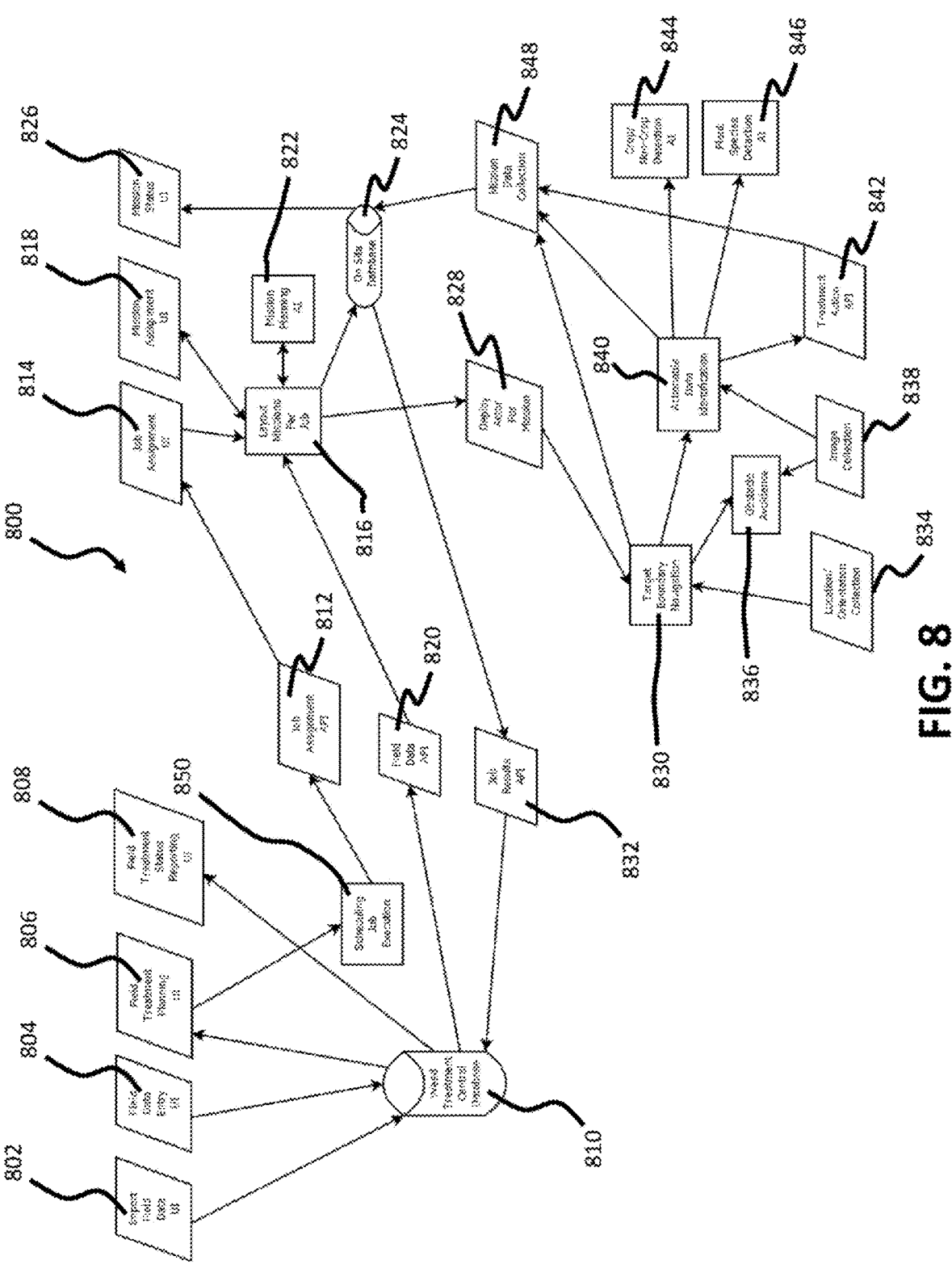
FIG. 8 is a system logical architecture diagram of the treatment system.
Figure 8A:
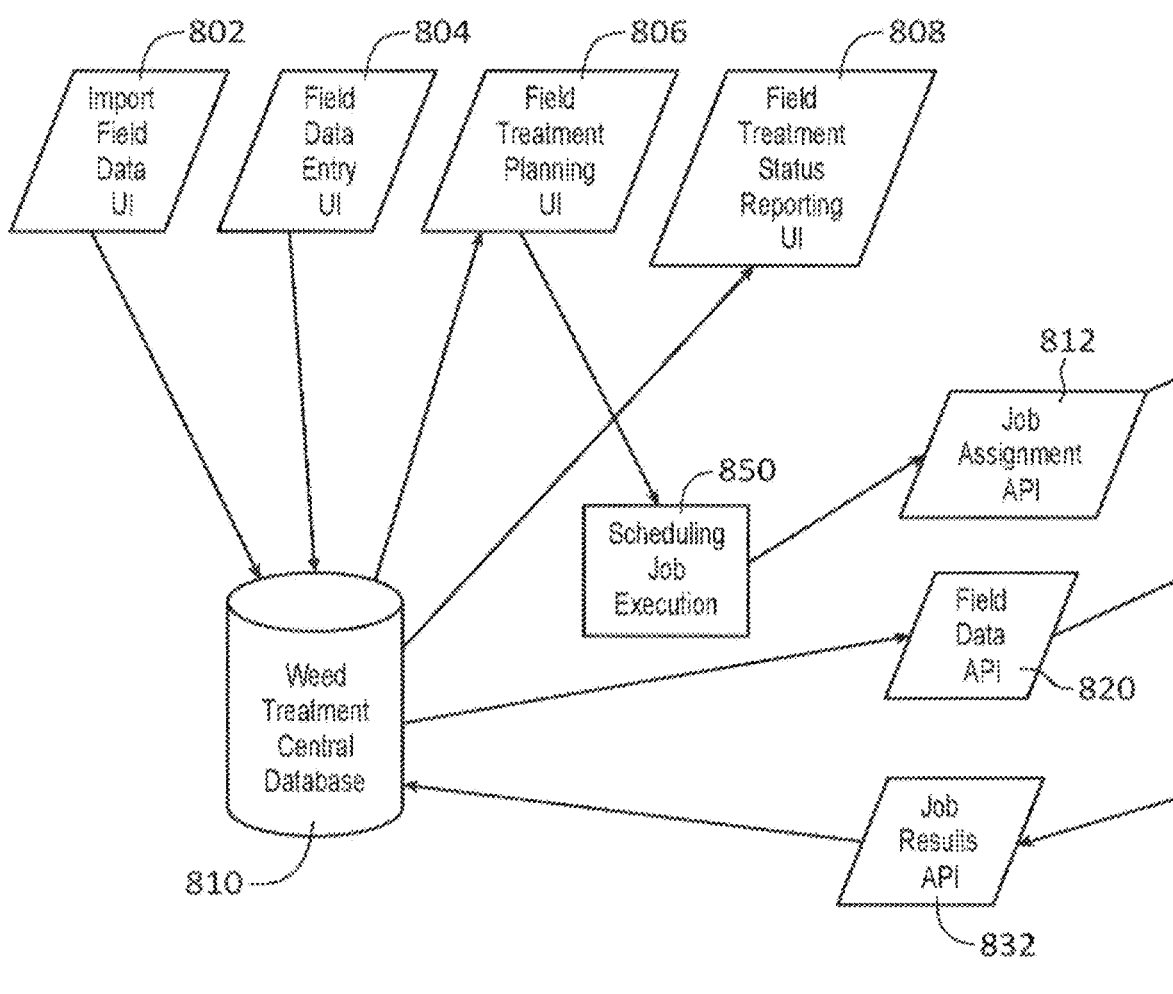
FIG. 8A is a close up view of the content on the left side of FIG. 8.
Figure 8B:
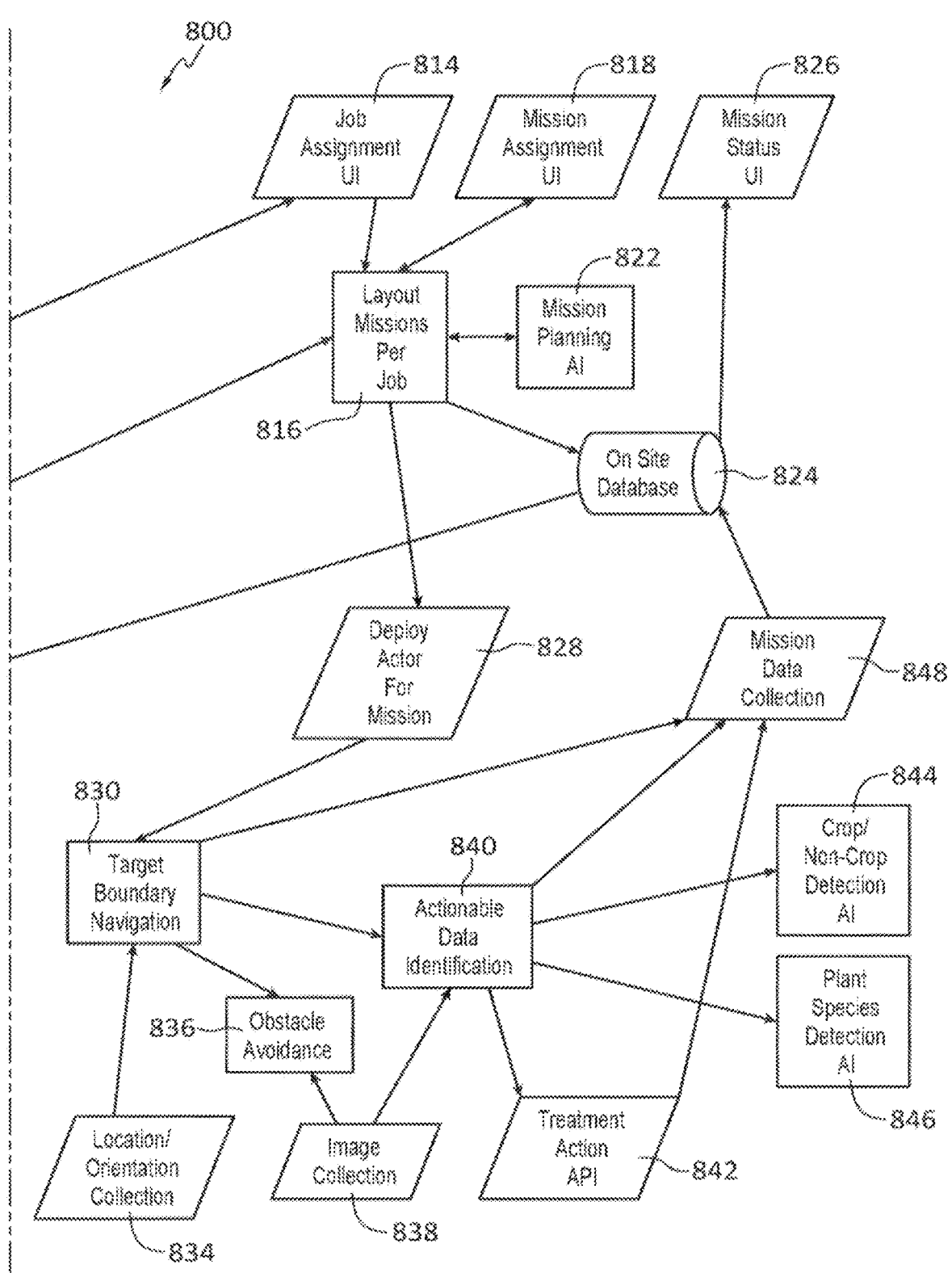
FIG. 8B is a close up view of the content on the right side of FIG. 8.

As presented in FIGS. 8, 8A and 8B, a system logical architecture 800 for the treatment system 200 may comprise a number of user interfaces, application program interfaces (APIs), databases, artificial intelligence modules, and/or control modules. The system logical architecture 800 may have one or more field condition user interfaces 802, 804 on the mission command center 932 systems for entering and/or importing field condition data into a pest treatment central database 810. A field treatment planning user interface 806, such as on a computer of the farmer, may permit a user to determine a field treatment plan for a particular field from the pest treatment central database 810. Once a field plan has been devised, a job scheduler 850 may be executed that assigns one or more jobs through a job assignment API 812.

A job assignment user interface 814 may access the job assignment API 812 in order to assign jobs to one or more missions and a mission assignment user interface 818 providing input to a mission layout per job module 816. The mission layout per job module 816 may receive field data from a field data API 820. A mission planning artificial intelligence module 822 may generate the one or more missions per job based on the data provided by the mission layout per job module 816. The mission data may be stored in the on-site mission rules database 824, which may be accessed by a mission status user interface 826 in order to display mission status data. The mission data may also be transferred to the pest treatment database 810 using a job results API 832.

The drone 202, 1200 may comprise the targeting system 842 which may receive input data from various data sources, and analyze the data to identify, select, and prioritize targets, track real-time or near-real-time relative target location, calculate and converge on spraying solutions, and activate and control drone spraying. The targeting system 842 be an integrated system with common control modules or may be implemented as a separate targeting system 842 with onboard target control module to be used in conjunction with a spraying system 500 having an onboard spray control module. The targeting system 842 may receive data from one or more cameras 630 and/or one or more sensors 606, 616 controlled by the data collection system 848. The data may include drone location, drone movement vectors, drone vibration data, weather data, target images, distance/range data, infrared data, GPS/RTK data, and any other sensor data described herein.

In one aspect, the drone 202, 1200 may include a process by which a drone 202, 1200 may identify target characteristics, calculate a spray vector, position a spray nozzle in accordance with the spray vector, position the drone 202, 1200 in accordance with the spray vector and spray the target. The steps in this process may be performed by one or more components in the drone 202, 1200 such as the targeting system 842 and the subsystems thereof, in coordination with the drone motor components, the camera/sensor, and/or various remote and external systems that may include an operator interface as described.

In another aspect, the base station 204 may identify target characteristics, calculate a spray vector, position a spray nozzle in accordance with the spray vector, position the drone in accordance with the spray vector and spray the target. The steps in this process may be performed by one or more components in the base station 204 and relayed to the drones 202 such as the targeting system 842 and the subsystems thereof, in coordination with the drone motor components, the camera/sensor, and/or various remote and external systems that may include an operator interface. In another aspect, the base station 204 may relay an array of target coordinates to a high clearance sprayer that may be used to instruct the nozzles to turn on and off when the nozzle coordinates correspond to the target coordinates.

Once the layout missions per job module has planned the missions, the layout missions per job module may initiate a deployment module 828 to deploy one or more drones 202 according to their respective mission plan. Each of the drones 202 may execute a target boundary navigation module 830 that ensures the drone 202 remains within the mission plan parameters.

The mission rules may result in the drone 202, 1200 prioritizing targets. For example, the system logical architecture 800 may identify multiple targets in close proximity to one another such that the probability of effectively spraying all proximal targets with a single spray is within acceptable limits. Another example is the case where the mission rules result in target sequencing whereby the system logical architecture 800 optimizes the number of targets the drone 202, 1200 can spray for a given rate of drone travel. Further, the mission rules may dictate a target sequence based on a desired lag time between sprays. The mission rules can be modified once or multiple times during the mission to optimize the target treatment.

In addition to modifying the mission rules, an operator or the system logical architecture 800 may modify the priorities within the mission rules. The operator may be an artificial intelligence engine. For example, targets may have different characteristics such as type or size or proximity to the drone or proximity to a non-targeted plant or object. Any one or all of these may generate different spraying priorities. Thus, the system logical architecture 800 may be required to prioritize the targets as the targets are identified. The prioritization process may be included in the identification or verification steps or may be a separate step. The prioritization may result in targets being tagged for later treatment or ignored. The prioritization may affect the order in which the targets are sprayed, or which spray nozzle 520 is used. The prioritization may result in multiple spray nozzles 520 being used to treat the same target. The prioritization may affect calculation of spray vectors. In some aspects, the prioritization may determine a type of treatment, such as, for example, larger targets may receive chemical treatment whereas small targets may receive an energy treatment.

For example, a first prioritized target may be sprayed in a first manner with the same spray vector calculation. A second prioritized target may be sprayed in the same manner, but the set of initial conditions for target may be a set of spray conditions for target. Similarly, a third prioritized target may be sprayed in the same manner, but a set of initial conditions for target may be the set of spray conditions for target. The targets may be grouped by the targeting system 842 as targets to be sprayed with a single spray and as such have been given by the targeting system 842 a single collective target contact area with a single center point for all three targets. The targeting system 842 calculates and executes a single spray vector for the collective target contact area with a spray geometry that the targeting system 842 selects for the single collective target contact area.

The navigation module 830 may receive location and/or orientation data via a location/orientation collection module 834. Obstacles may be avoided using an obstacle avoidance module 836 that may receive one or more images from an image collection module 838. The obstacle avoidance module 836 may perform computer vision in order to determine if the obstacle is likely to interfere with the mission plan. The navigation module 830 may provide data to an actionable data identification module 840, which may also receive images from the image collection module 838.

The targeting system 842 determines if the object is an obstacle by referencing obstacle data or using an obstacle algorithm or both. If the object is determined to be an obstacle, the targeting system 842 flags the obstacle to the navigation module 830 to become a navigation factor. If the targeting system 842 determines the object is to be ignored, then the targeting system 842 flags the object to be ignored and takes no further action regarding the object so flagged. If the targeting system 842 determines the object is a non-target, the targeting system 842 flags the object as a non-target to be avoided by the spray and the non-target so flagged becomes a factor used in calculating one or more spray vectors.

The actionable data identification module 840 may determine when a treatment action is required and initiate instructions to a treatment action API 842. The actionable identification module 840 may perform a crop/non-crop detection AI module 844 and/or a plant species detection AI module 846. In some aspects, the crop/non-crop AI module 844 and/or the plant species detection AI module 846 may be configured to detect pests, disease, such as weeds, fungus, insects, etc. In other aspects, the pests and/or disease detection may be performed in dedicated modules or systems. These two modules 844, 846 assist the actionable data identification module in determining where the treatment action is required. All of the data provided by the navigation module 830, the actionable data identification module 840, and the treatment action API 842 may be stored in the on-site mission rules database 824 using a mission data collection module 848.

In one aspect, the drone 202, 1200 may detect objects and identify and verify one or more targets, using the camera 630 and/or the sensors 606, 612 and may use additional data sources. For example, the image data from cameras 630 and the sensor data from the sensors 606, 612 may be used to detect one or more objects. The same data or additional data may be used to identify the object as a target or potential target. The object may be tagged for further analysis prior to being added to the target list, being tagged or being ignored. The further analysis may be performed using the same or additional data such that the drone is made to collect additional data for analysis. In this way a predictive first analysis may be performed that requires fewer analysis resources and reduced analysis time. The predictive first analysis can be used to optimize the drone resources 600 and only commit drone system resources 600 to objects that are predicted to be targets. The predictive first analysis may be followed by a second analysis or a series of analysis prior to being added, or not, to the target list. An object may be added to the target list based on one, two, or any number of analysis cycles consistent with mission rules. The target list may be verified prior to or after a spray vector has been calculated.

In another aspect, the base station 204 may detect objects and identify and verify one or more targets, receiving data from the cameras 630 and/or the sensor units 606 of the drones 202 and may use additional data sources. For example, the image data and the sensor data may be used to detect one or more objects. The same data or additional data may be used to identify the object as the target or potential target. The object may be tagged for further analysis prior to being added to the target list, or be tagged a non-target or be tagged to be ignored. The further analysis may be performed using the same or additional data such that the drone 202, 1200 is made to collect additional data for analysis. In this way a predictive first analysis may be performed that requires fewer analysis resources and reduced analysis time. The predictive first analysis can be used to optimize one or more resources of the drone 202, 1200 and only commit the resources to objects that are predicted to be targets. The predictive first analysis may be followed by a second analysis or a series of analysis prior to being added, or not, to the target list. An object may be added to the target list based on one, two, or any number of analysis cycles consistent with mission rules. The target list may be verified prior to or after a spray vector has been calculated.

The targeting system 842 adds the target to the target list to be sprayed and the target so added to the target list is identified to the spray vector calculation subsystem within the targeting system 842. The flagged target is added to the target list so that the target's desired contact area and spray center point may be computed. The target list may comprise one or more GPS/RTK coordinates and one or more heights above the ground.

The targeting system 842 may receive input data from various data sources, and analyze the data to identify, select, and prioritize targets, track real-time or near-real-time relative target location, calculate and converge on spraying solutions, and control drone spraying. The targeting system 842 may receive data from the cameras 630 and/or the sensor units 606, 616. The data may include drone location data, drone movement vectors, drone vibration data, weather data, target images, distance/range data, infrared data, and any other sensor data described herein. The drone 202, 1200 may include a rules data store which may include identification rules for plants, pests or other target types. The rules data store may include target selection and target priority rules. The rules data store may include spraying rules, and other chemical application rules specific to the mission, the chemical(s) being applied, the target, and any other camera/sensor data input.

In one aspect, the drone 202, 1200 may identify a desired contact area for the treatment to be applied to the target. The desired contact area may be a portion of the target based on target-specific characteristics such as those used for verification or may be a result of the verification step. The desired contact area may be determined at any point in the process. The contact area may be any particular shape or size relative to the target. The target area may be determined based on the mission objectives and parameters. For example, if the mission is to spray weeds with a herbicide, a contact area for a targeted weed may include a portion of a leaf, an entire leaf, a group of leaves, stem, root(s), or the entire plant. In another aspect, the base station 204 may identify the desired contact area for the drone 202, 1200 to treat the target.

An object detection may involve an analysis of the image data, sensor data, etc., to detect one or more objects that may be targets within a proximity of the drone 202, 1200 based on the mission rules. The target identification may involve comparing object data and characteristics to a target data base 810 or target identification rules to recognize desired targets and distinguish targets from non-targets. The target identification rules may be based on one or more GPS/RTK coordinates, relative locations to other objects, and/or visual characteristics. For example, the object may be detected and compared to the onboard plant database 824 to identify the object as a weed or pest and distinguish the object from a non-target desirable plant and/or a weed or pest that has already been treated. Further, the identified weed may be added to the target list for verification or tagged for future treatment depending on the mission rules. If the object detected is not matched to the onboard plant database, the data may be relayed to the base station 204 or the mission command center 932 for further analysis with a more extensive plant database. The onboard plant database of each drone 202 may be subsequently updated with the newly identified plant in order to facilitate more efficient determination of the plant by other drones 202, 1200.

For example, as shown in FIG. 27A, an initial image 2700 may be captured by the data collection system and processed by the object detection. FIG. 27B shows the image 2702 following the processing. The object detection has identified crop plants 2704 (e.g. surrounded by white boxes) and identified weeds 2706 (e.g. surrounded by black boxes) and surrounded those identified plants 2704 and weeds 2706 with one or more bounding boxes that have been calculated. Based on the bounding box, a center point may be determined as described herein and may correspond to the spray target area. In some aspects as described herein, only weeds 2706 of a sufficient size may be targeted whereas weeds 2708 below a certain size may not be targeted until the weed 2708 has grown to a sufficient size.

Before or after the drone 202, 1200 is within the range of a target, as defined by the mission rules, data from additional sources may be used including image data or sensor data from the drone 202, 1200 and/or other drones 202, 1200. The drone 202, 1200 may also use approximation techniques if a particular camera 630 and/or sensor 606, 612 is not available or has failed. For example, if the exact target range is unknown, the targeting system 842 may use onboard calculations to approximate range data using estimated target height relative to target surroundings to calculate the distance of the target from the drone 202, 1200. Accordingly, the image data and the sensor data and the approximations may be used by the targeting system 842 to confirm the location of the target and resolve the desired spray vector.

The targeting system 842 may include a target verification subsystem. If the targeting system 842 determines the object is a target or likely to be a target, the object is flagged as such and sent to the target verification subsystem. The target verification subsystem uses the mission rules and the object data from the data collection system 848 and algorithms to verify that the object is a target to be sprayed. The target verification subsystem is used as a final check that the object is to be sprayed according to the mission rules. The target verification subsystem may add the object to the target list or flag the object as the obstacle, or a non-target, or the object to be ignored, or as a target to be included in another mission.

The target verification may determine if the identified potential target is to be sprayed by the drone 202, 1200. The target verification may involve additional analyses of the same images/sensor data already collected by the drone 202, 1200 and/or another drones 202, 1200. The target verification may involve analyses of additional image data and/or sensor data. The target verification rules may be based on the configuration of the drone 202, 1200, the resources of the drone 202, 1200 remaining at the time of verification, the mission priorities in effect at the time, and/or other criteria. The verification rules may also involve the probability that the target has been accurately identified. The verification rules may also involve the confidence level that the spray will reach the target in a sufficient dosage. The verification rules may also involve the probability of an over spray or an under spray. The verification rules may also involve the probability that non-targets may be sprayed as the spray vector hits the desired contact area. The object detection, the target identification, the target verification, and the determination of the desired contact area may be performed in a single step or in two or more separate steps or as a series of iterations of one or more steps.

In some aspects, the target verification may comprise image registration and/or geocoordinate registration whereby the previously captured sensor data of the target and/or geocoordinates may be saved and compared to the newly captured sensor data. For example, a matching two photos of the same target plant at different times, which might be slightly different (e.g. different angle, different position in photo, moved by wind, etc.). The image registration and/or geocoordinate registration may ensure that multiple passes do not spray the same target plant more than once or may be used to determine a health of the target plant in order to determine if a more effective treatment may be necessary.

The techniques for object detection, target identification and verification, may also be applied to gathering data for target prioritization such that the same or similar image and sensor data is used. Examples of the target prioritization include rules that prioritize the targets that are dropping or ready to drop seeds, targets that are larger, targets that are closer to or further away from non-targets, targets of a particular variety over another variety, targets with desirable orientation relative to the drone 202, 1200, targets with higher identification confidence, targets with higher hit confidence, etc., or any combination thereof.

The targeting system 842 may include a target prioritization subsystem. The prioritization subsystem processes the verified target list to optimize the grouping and sequence of the verified target list according to the mission rules. The prioritization subsystem processes the target list including target information and target tracking data, to determine if there are targets that should be grouped together and the relative order or sequence in which the targets should be sprayed. If the drone 202, 1200 includes multiple spray nozzles 520, the prioritization subsystem assigns a specific nozzle 520 to the target or the group of targets. If the prioritization subsystem creates a target group, then spray vector computation subsystem may give the target group a single, contact area, center point, and/or spray vector for that target group. The prioritization subsystem acts as a mission optimization frontend for the spray vector computation subsystem by adjusting the target list received by the prioritization subsystem to create a second target list that is the input to the spray vector computation subsystem. Thus, the spray vector computation subsystem achieves resource efficiencies by having a predetermined target order that optimizes the timing of each spray relative to the time and resources required for each spray vector calculation. The spray vector computation subsystem also achieves resource efficiencies by calculating fewer spray vectors because of the target groupings.

The prioritization subsystem may potentially reformulate the second target list based updated information from the data collection system 848. For example, the data collection system 848 may detect target movement that changes the relative location of the target such that the target sequence is adjusted or the target is removed from the target list such as when the target has moved or is expected to move out of range as dictated by the mission rules.

In one aspect, the data gathered by the drone 202, 1200 regarding the environmental and other local conditions may be used to modify the prioritization rules for the drone 202, 1200 or one or more drones 202, 1200 by relaying the data from to the base station 204 or directly to the one or more drones 202, 1200. For example, a local micro topography and wind data may be used to modify the prioritization rules. As a further example, one or more non-target plant characteristics in a row or section may create a wind pattern that may be different from other rows or sections in that shorter or less dense non-target plants may not block the wind. In such a circumstance the spray vector may be affected to a greater degree in these rows compared to other rows or sections. Such variations may be accommodated by modifying the prioritization rules and/or modifying the spray vector algorithm. Further the conditions of the drone 202, 1200 and the components 600 may be used to modify the prioritization such as a life of the battery 618, the amount of spray remaining in the canister 406, the achievable spray pressure, etc. Further, a complete or partial failure of a drone component 600 may be the basis for modifying the prioritization rules or the spray vector algorithm. For example, a lower than expected tank pressure resulting from a pump problem or a leak in the spraying system 500 may cause a modification. Similarly, a partial or total failure of the camera 630 and/or the sensors 606 may cause the prioritization rule modification.

In one aspect, the drone 202, 1200 may use the image data and/or the sensor data to determine how effectively the target was sprayed. For example, the image data and/or the sensor data may determine that the moisture on the target plant after being sprayed is less than desired or more than desired. The determination may be used to modify the prioritization rules and/or the spray vector algorithm.

For each target to be sprayed, the targeting system 842 may calculate a spray vector. The spray vector may include a specific position and orientation for the spray nozzle 520, a precise spraying time and duration, a spray geometry, a spray pressure, a distance between the spray nozzle 520 and the desired contact point at the spray time, a time required for the spray to travel from the spray nozzle 520 to the desired application area, etc. The spray vector may be calculated to aim a tip of the spray nozzle 520 and a tip vector of the nozzle 520 to spray a specific spray contact area such as a portion of the target to optimize the treatment objectives within the mission rules. For example, the spray vector may aim for a base of the target plant or a leafy area, or the entire target, or the head or the body or another portion of the target. The spray vector calculation may include a number of factors including a relative speed and heading of the drone 202, an inertia of the drone 202, 1200 and the spray nozzle 520, a relative stability and vibration of the drone 202, 1200 and the spray nozzle 520, a time lag from the spray command to the spray initiation, one or more environmental conditions such as humidity, wind, and rain, a dampness or dryness of the target, the size of the target and the identified contact area, an aerodynamic drag of the spray and wind effects on the spray travel, an effect of gravity, the size of the desired target contact area, one or more available spray pressure(s) and geometry(s), a velocity of the spray leaving the spray nozzle 520, an anticipated movement of the target, a proximity of non-targets, and any other factor relevant to mission success.

The number of factors used in calculating a spray vector affects the complexity of the calculation and thus the computing resources 602 and time required for the calculation. Similarly, each factor may be a variable that introduces uncertainty in the spray vector calculation. The uncertainty may be used as a probability of a successful spray and the probability may be used to modify the spray vector to increase the probability of a successful spray. The probability calculation may include such results as the probability of affecting a non-target, or not applying the desired amount of spray to the desired contact area. In response to probability calculations the drone 202, 1200 may for example, increased or decrease the number or the boundaries of desired contact areas. The probability calculations may affect the mission rules or target priorities. The probability calculations may be combined with ongoing or intermittent scoring of how successful past sprays have been. In some aspects, the drone 202, 1200 may adjust the velocity of the drone 202, 1200 by reducing power to the motors 610 so that the spray may be more accurate and thereby more successful.

The targeting system 842 may include a first predictive analysis subsystem 822 directed to implementing a triage type analysis to quickly and efficiently disposition objects that can be identified with fewer computation resources 602 while flagging those objects that require more computational resources 602 to distinguish for further processing. The first predictive analysis subsystem 822 may make object type determinations using fewer computational resources 602 and less computational time where possible. One purpose of the first predictive analysis subsystem 822 may be to use less computational time and resources 602 to quickly and efficiently distinguish targets and potential targets from everything else and flag those objects to the target identification system for further processing. The first predictive analysis subsystem 822 may be to use less computational time and resources of the processor 602 to quickly and efficiently distinguish objects that should be ignored from everything else and flag those objects as objects to be ignored. The first predictive analysis subsystem 822 may be to use less computational time and resources to quickly and efficiently distinguish obstacles from everything else and flag those objects to the drone navigation system 608. The first predictive analysis subsystem 822 may be to use less computational time and resources of the processor 602 to quickly and efficiently distinguish non-targets that are not located near objects identified as targets or potential targets or objects that require further processing and are less likely to be affected by overspray and therefore not included in an overspray calculation.

The targeting system 842 may include a second analysis subsystem. The second analysis subsystem may be designed to perform object type determinations on objects not dispositioned by the first object identification subsystem. The second analysis subsystem may be designed to use additional data and/or more computational resources to perform object type determinations than were allocated to the object by the first object identification subsystem.

As previously described with regard to the first and the second analysis subsystem, this may be extended to the targeting system 842 having a series of object identification subsystems each directed to using greater computational resources and more computational time than the preceding object identification subsystem. The series of object identification subsystems may allow the targeting system 842 to manage computational time and resources to only apply the greatest computational time and resources to those objects that are not dispositioned using less computational time and resources. Each object identification subsystem may provide processed data and computational results to the next object identification subsystem until the mission rules are satisfied regarding object disposition. This allows the targeting system 842 to direct the data collection system 848 to gather more data if needed based on the mission rules and to optimize computational resources and power resources to be used as needed. The mission rules may specify that not all objects need to be identified and dispositioned and may contain rules that allows the data collection system 848 or the targeting system 842 to ignore objects or classes of objects while only gathering minimum data and performing little or no object dispositioning.

In some aspects, the targeting system 842 may use a target tracking method to determine precisely, or to estimate, the location of the target and/or the desired target contact area as a factor to be used in calculating the spray vector. The target tracking method may include a single calculation step, for example by maintaining constant heading and velocity and relative altitude above ground for the drone. A single calculation can provide the target coordinates in relation to the drone for each point of time during the drone approach. The target tracking method may include multiple calculation steps or may include an iterative and/or recursive calculation process. For targets that are moving or may move, a dynamic target tracking method may be used. The dynamic target tracking method may be used for the target having for example a stationary base but where the desired contact area is moving, for example a wind-blown plant. The dynamic target tracking method may be used where the entire target may move such as an insect or small animal.

The targeting system 842 may include a moving target computation subsystem. The data collection system 848 determines if the object is a moving object and flags the object as a moving object for the targeting system 842 for processing by the moving target computation subsystem. The target identification subsystem and target verification subsystem may also flag a target as the type of target that may move. The data collection system 848 continues to observe the moving target or potentially moving target to provide target movement data to the moving target computation subsystem. The moving target computation subsystem calculates an expected target trajectory and/or time sequenced series of target location coordinates using target movement data, target movement algorithms and other target data. The moving target computation subsystem may provide expected target trajectory or coordinates to the prioritization subsystem. The moving target is processed by the moving target computation subsystem to provide input to the spray vector computation subsystem. The moving target computation subsystem may be designed to calculate a target location uncertainty input to the spray vector computation subsystem. The moving target computation subsystem or a separate similar subsystem may be used to track moving or potentially moving non-target objects or obstacles.

In some aspects, the dynamic target tracking method may include factors including target movement patterns including frequency, duration, direction, and/or magnitude of acceleration and/or changes in direction. The target movement pattern may be continuous in a straight or curved line and may include hopping or jumping movement. The dynamic target tracking method may include predictive algorithms based on the specific target characteristics and extrapolations of observed movements. The dynamic target tracking method may include predictive algorithms based on information in a target database and/or based on recent observations of the same or similar types of targets. The dynamic target tracking method may anticipate future changes in target course or speed, based on factors such as upcoming topography changes and/or obstructions in the target's anticipated path.

FIGS. 30A and 30B demonstrate a new spray vector being calculated and executed because of a target movement. In this example, the target 3004 may have been stationary when a first spray vector 3002 was calculated as shown in FIG. 30A. The target 3004 began moving or is anticipated to begin moving as per pest vector 3006 and changed an acceptable spray vector 3002 into an unacceptable spray vector. When the target 3004 and the drone 202 are moving and/or are anticipated to be moving, dynamic target tracking may be required to generate or update a spraying solution, and additional variables may increase the complexity and uncertainty of the spray vector calculation. For example, dynamic target tracking may be used to determine the current velocity and direction of travel of both the drone 202 and the target 3004, and those velocities and directions may be used to calculate an anticipated velocity and a direction of target travel in order to calculate the new spray vector 3008 and/or a new direction of travel for the drone 202 as shown in FIG. 30B.

In some cases, the targeting system 842 may assume that the target 3004 may continue along a linear course with the same current velocity and direction, and if the target 3004 is currently moving along a non-linear path or movement pattern, then the targeting system 842 may assume the same non-linear path or movement pattern. As noted above, when performing dynamical tracking on a moving target 3004, the determination of a spray vector (e.g., predicted future coordinates at a future spraying time) also may take into account the anticipated time to engage the motor to position and orient the drone 202, 1200 at the correct spraying point, as well as the anticipated time lag for a fired projectile to reach the target. Note that a movement pattern may include stopping, starting, and moving in three dimensions such as jumping. Note also that the target contact area may be recalculated intermittently or continuously and that a target may be assigned multiple target contact areas.

To accommodate the target uncertainty resulting from the leaf movement indications, namely the uncertainty in the target area and the center point at the spray time, the targeting system 842 may calculate a spray vector that requires the drone spray position component and the spray nozzle tip position component to be closer to the target than it may otherwise be if the target were stationary. Additionally, the targeting system 842 may calculate a spray vector that changes the spray vector geometric component to be wider than it may otherwise be if the target were stationary.

The spray vector calculation for a target which is partially fixed and partially moving, the targeting system 842 can perform a similar spray vector calculation the entire target may move such as an insect or small mammal with the set of target spray conditions being defined by the potentially moving target and being calculated based on the same, different or additional target characteristics as discussed herein. The spray vector calculation for the target 3004 that can be applied to multiple targets simultaneously or near simultaneously as discussed herein and in doing so may continuously perform dynamic tracking for all targets selected and prioritized.

In some aspect, the targeting system 842 may determine the spray vector by considering a travel time for the drone 202, 1200 to reach the desired spray location with a heading and velocity and/or to mechanically move the selected spray nozzle 520 from a preceding position to the desired spray point from which the spray is to be initiated. In some aspect, the targeting system 842 may determine the spray vector by considering the time required for the target to move to the desired spray location.

In one aspect, the drone 202, 1200 comprises one or more steps of detecting multiple objects, identifying, verifying, and/or prioritizing multiple targets, calculating multiple spray vectors, determining the success of multiple sprays and using the spray success determinations as an input to subsequent spray vector calculations. One skilled in the art will understand that these systems, subsystems or portions thereof used to perform these steps, can be combined, used in a different sequence than described herein. In some aspects, simplified and in some implementations omitted to achieve a less complex and/or less resource intensive design.

The targeting system 842 includes a target contact area computation subsystem. The target contact area computation subsystem includes the contact area center point computation subsystem. The contact area computation subsystem uses mission rules, spray chemical composition, target data from the data collection system 848 and target identification data to calculate the size and/or orientation of the target relative to the drone 202, 1200 and/or one or more possible positions of the nozzle 520. The drone 202, 1200 and/or one or more possible positions of the nozzle 520 may be estimated at the estimated time of the spray command being initiated using data from the drone navigation system 608, and the drone mechanical status system (not shown) and the target location data. The target location data may be known from the target data collection subsystem or estimated by the moving target computation subsystem as previously described. The contact area computation subsystem may calculate the contact area to define one or more geometric 2-D or 3-D boundaries. The contact area may be calculated to optimize the mission objectives, for example, to kill an identified weed or an identified pest with the smallest reasonable amount of spray necessary. For example, if the target is a plant, the contact area may include one or more leaves, a stalk, a base, an area around the base, or any combination thereof. The contact area may be calculated to maximize the sprays absorption into the target or into the earth surrounding the target. The contact area may be calculated to concentrate the spray on the body of a pest or an area surrounding the pest but including the pest. The contact area may be calculated to concentrate the spray on a head, face or eye of a pest such as a mouse or other unwanted living creature. The contact area geometry may be an input to the spray vector computation subsystem.

The contact area computation subsystem may calculate a contact area center point using a center point computation subsystem. The calculated contact area and center point are reference points to be used by the spray vector computation subsystem for calculating the spray vector for the target. The center point may be calculated based on the contact area geometry and spray vector variables selected to simplify the spray vector calculation. For example, the center point may be calculated based on the spray geometry and the estimated target range at the time the spray command is estimated to be issued. The center point may provide an aiming reference point used by the spray vector computation subsystem for calculating the spray vector and factoring the uncertainties and probabilities of the moving drone 202, 1200 to aiming the nozzle 520 at the stationary or moving target in the environment that includes wind data and non-targets to be avoided. For example, the spray vector computation subsystem may center the centerline of the spray geometry on the target center point.

The contact area computation subsystem may calculate an amount of spray to be deposited on or within the contact area to achieve the mission objectives for the specific target. For example, the amount of spray to be deposited may be determined by the desired effect on the target, the target characteristics, and the chemical composition of the spray, and current environmental conditions, such as wind or moisture.

The targeting system 842 may include a spray vector computation subsystem. The spray vector computation subsystem may calculate the spray vector command set. The spray vector command set may be a set of commands issued to the drone to instruct the drone 202, 1200 to execute the spraying of the individual target or the cluster targets. Each spraying event may have an associated spray vector command set. The spray vector command set may include at least the positioning of the drone 202, 1200 and at least one spray nozzle 520 and may include the timing of the spray on command to initiate the spray and the timing of the spray off command to stop the spray. The spray vector command set may also include commands to change the position of drone 202, 1200 and or the spray nozzle 520 on the drone 202, 1200 to achieve the desired distance and orientation of the nozzle tip 520 relative to the target, the spray geometry, and may also include the movement of the spray nozzle 520 and drone 202, 1200 before, during, and/or after the spraying process.

The spray vector computation subsystem may use a variety of factors, inputs and calculations to determine the spray vector for each spraying event in accordance with the mission rules. These factors, inputs and calculations may include the contact area geometry and the center point, the motion vector of the nozzle tip 520 and the expected spray momentum and inertia, the uncertainties and probabilities introduced by the movement and vibration of the drone 202, 1200, the localized wind effects, the spray chemical characteristics including its specific weight, dispersion characteristics, and anticipated aerodynamic drag, gravitational affects, and target movement trajectory, probabilities and uncertainties (if any). The spray vector computation subsystem may use a continuous best fit analysis to continually refine the spray vector command set and/or contact area(s) boundaries and center points. The spray vector computation subsystem may calculate the spray vector command set once, twice, or multiple times based on a predetermined schedule or based on a material change in one of the factors used to calculate the contact area or the spray vector.

The targeting system 842 may provide to the spray vector computation subsystem data and rules regarding non-targets. The spray vector that results in the spraying of non-targets may be undesirable or extremely undesirable. Thus, non-target spray avoidance may be a high priority even to the point of the spray vector computation subsystem flagging the target as off-limits for this mission and thus not issuing a set of spray vector commands. The proximity of the non-target to the target may also affect the calculation of the desired contact area(s) for the target. The contact area(s) may be calculated to be located less proximate to the non-targets even though the resulting contact area(s) may be less desirable and more difficult to hit with the pray vector. As before, a less optimum contact area as related to a volume intersection (hereinafter referred to as the V-INT) as discussed herein may result in the target being flagged as off limits and not to be sprayed at this time under these conditions. For example, the target flagged as off limits for this mission may be sprayed successfully during a future mission when the wind may be less of a factor or other factors may be less of an issue regarding overspray. The overspray of non-targets may be such a priority that the same or greater methods and rigor as described herein to achieve a successful spray may be used to avoid an overspray of a non-target.

The targeting system 842 may include a non-target avoidance subsystem that can override the spray vector computation subsystem. In the same or similar way a target contact area may be calculated as an input to the spray vector computation subsystem. The non-target avoidance subsystem may calculate an avoidance area with one or more avoidance boundaries and/or a probability of avoidance of the non-targets referred to herein as $P_{avoid}$. The spray vector computation subsystem may use a $P_{avoid}$ calculation is a similar way it uses a $P_{spray}$ calculation to refine and finalize the spray vector for a target and the resulting spray vector command set. A $P_{avoid}$ may have an acceptable range of values similar to the $P_{spray}$ and may be designated by the mission rules as a more important, less important or equally important result relative to $P_{spray}$ such that $P_{avoid}$ may be an overriding mission objective.

To execute the spray process, the spray vector computation subsystem may generate commands that the targeting system 842 sends to the drone navigation system 608 and the drone mechanical system 650 to adjust the drone's pre-spray state to the desired spray state including the current drone velocity and orientation relative to the target and to direct servo motors 610 to drive the spray arm 1222 orientation and the spray nozzle tip 520 orientation, including adjusting the nozzle tip 520 to control the spray geometry in order to match calculated spray vector components.

These mechanical and navigational adjustments may have a certain amount of time delay to reach the commanded state. The spray vector may be updated intermittently or continuously during this time delay and the orientation commands may be intermittently or continuously updated so that the drone 202, 1200 may be continuously aimed at the most recent spray vector target point. The target identification, verification, and prioritization subsystems may continue to update their respective inputs to the spray vector computation subsystem and the spray vector calculation may be updated based on new camera and/or new sensor data, and other relevant data received during the time delay for the drone state change.

The targeting system 842 initiates a spray on and spray off command to the spray nozzle vector control system to execute the spray and control spraying by the drone 202, 1200. The entire process may be conducted simultaneously or near simultaneously for the next prioritized targets using different spray nozzles 520 or the same spray nozzle 520.

The targeting system 842 may include a success determination subsystem. The success determination subsystem may use post-spray target data gathered by the target data acquisition system to provide feedback to the targeting system 842 regarding the effectiveness of the spray relative to the spray objectives. For example, the target data acquisition system may use the cameras 630 and/or the sensors 606, 612 to measure how much spray was deposited on or within a target's desired contact area. This measure of success may be used to calibrate and adjust certain targeting system 842 calculations for subsequent spray vector inputs and calculations and as inputs to the mission rules and mission planning process. If the spray or a sample of sprays is measured to be not successful within a first predetermined success threshold, then the targeting system 842 may be configured to adjust one or more targeting computations in real-time, or near real-time, to increase the probability of success for the upcoming prioritized targets. If the spray or a sample of sprays is measured to be not successful within a second predetermined success threshold, then these targets that were not successfully sprayed may be flagged by the targeting system 842 to be resubmitted to the target prioritization subsystem for immediate spraying or spraying at a future point in the current mission by the same or a different drone, or be flagged for treatment during a future mission.

The success determination subsystem may report to the targeting system 842 that a target or group of targets or an entire area has been successfully treated and are to be excluded from target selection during future missions. The success determination subsystem may report to the targeting system 842 a success rate for an area or a type of target or a certain set of mission rules.

Certain aspects of the present disclosure relate to techniques for determining the changing target range, including angular distance, as the drone approaches targets. As the drone 202, 1200 travels the projected spray points of application on the target may become closer and closer and the probability of a successful spray may increase continuously until a maximum probability of success is reached when the spray vector's projected spray geometry intersects the contact area to the maximum extent available to the spray vector calculation. A theoretical projected spray geometry intersection with the contact area may be a prediction of the volume of spray that intersects with the contact area and can be considered as the spray coverage over or within the 2-D or 3-D contact area of a target. This volume-intersection is referred to herein as V-INT. The mission rules may define a maximum and minimum volume of spray to be applied to a given target surface area for a given target type. The calculated V-INT may be express as microliters per square, millimeter or microliters per cubic millimeter, or any other convenient reference units.

The desired maximum V-INT and minimum V-INT may be established by the mission rules as a V-INT range. The mission rules may establish different V-INT ranges. For example, the mission rules may establish a different V-INT range for different factors such as mission objectives, different types of targets, different spray chemical compositions, different proximities to non-targets at the spray time, different environmental conditions, etc. The mission rules may establish a different V-INT range for a single factor or a combination of factors. The mission rules may provide one or more algorithms to allow the targeting system 842 to determine different V-INT ranges prior to a spray vector calculation.

Once a spray vector is calculated that provides a V-INT that is within the V-INT range for the particular target, then the targeting system 842 may issue a set of spray vector commands that direct the drone to configure itself according to the spray vector and execute the spray vector to spray the target. In some aspects, the targeting system 842 may issue a complete set of spray vector commands after a single spray vector calculation. In another aspect, the targeting system 842 may issue individual spray vector commands or a subset of spray vector commands to incrementally create a complete set of spray vector commands. The individual or subset of spray vector commands may be issued, or may be updated, during an iterative series of two or more spray vector calculations for a particular target. A complete set of spray vector commands may be limited to only the spray on and spray off times and the drone characteristics that need to be adjusted from the most recent spray vector commands. For example, the orientation of the drone 202, 1200 and the spray nozzle 520 may not need to be adjusted from the last spray sequence to the next spray sequence. In another example, a complete set of spray vector commands may be limited to a spray on time and a spray duration.

In one aspect, a new spray vector may be calculated and executed because of a drift of the drone 202, 1200 detected by the drone navigation system 608. In this example, the drone 202, 1200 may be blown by a gust of wind that changes an acceptable spray vector into an unacceptable spray vector. For example, a heading, velocity and/or orientation of the drone 202, 1200 expected just prior to the spray on command being executed may change to a material extent such that the spray vector may be recalculated resulting in a new set of spray vector commands controlling position of the drone 202, 1200 via the drone navigation system 608. This is an example of the calculated spray vector drifting out of the contact area from the drone drift. This drifting out of the contact area represents the spray vector starting from a higher V-INT but moving to a lower V-INT and then to a V-INT that is outside the V-INT range for this target. Another example of the spray vector being recalculated and a new set of spray vector commands being generated and executed by the processor 602 may result in the mechanical system 650 moving the entire drone 202, 1200, or the spray nozzle 520 or both.

In another aspect, a new spray vector may be calculated and executed because of target movement. In this example, the target may have been stationary when the first spray vector was calculated but the target began moving or is anticipated to begin moving and changed the acceptable spray vector into the unacceptable spray vector. When the target and the drone are moving and/or are anticipated to be moving, dynamic target tracking may be required to generate or update a spraying solution, and additional variables may increase the complexity and uncertainty of the spray vector calculation. For example, dynamic target tracking may be used to determine the current velocity and direction of travel of both the drone and the target, and that data may be used to calculate the anticipated velocity and direction of target travel. In some cases, the targeting system 842 may assume that the target may continue along a linear course with the same current velocity and direction, and if the target is currently moving along a non-linear path or movement pattern, then the targeting system 842 may assume the same non-linear path or movement pattern. As noted above, when performing dynamical tracking on a moving target, the determination of the spray vector (e.g., predicted future coordinates at a future spraying time) also may take into account the anticipated time to engage the motor to position and orient the drone 202, 1200 at the correct spraying point, as well as the anticipated time lag for the fired projectile to reach the target. Note that a target movement pattern may include stopping, starting, and/or moving in three dimensions such as jumping. Note also that the target contact area may be recalculated intermittently or continuously and that a target may be assigned multiple target contact areas.

Figure 28:
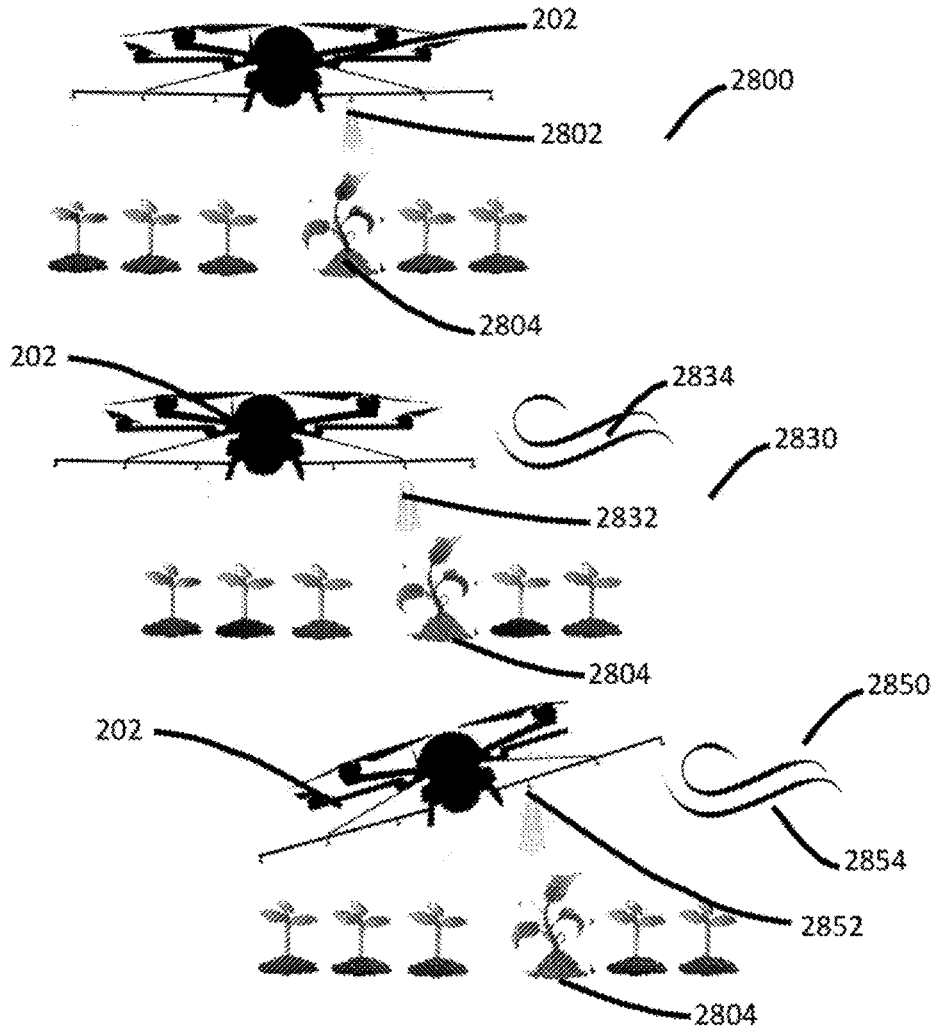
FIG. 28 is a conceptual diagram of the navigation system adjusting for wind conditions.

FIG. 28 demonstrates three scenarios. A first scenario 2800 demonstrates the drone 202 on a mission. When the drone 202 passes over the field and determines which nozzle 2802 is to be triggered at a calculated time that the drone passes over 202 a weed 2804. For clarity, only a single spray nozzle 520 having a single spray nozzle tip 520 is activated whereas the drone 202 may have multiple spray nozzles 520 and each spray nozzle 520 may have multiple spray nozzle tips 520 and any combination of these may be selected for use on a target. The targeting system 842 includes a set of initial conditions for the drone 202 which include for example an initial location and an initial directional velocity vector, the selected spray nozzle and the location on the drone 202, the spray tip and the spray tip's initial location on the spray nozzle, an initial spray nozzle vector and an initial spray geometry. In this example, the targeting system 842 determines a spray vector that includes calculating a set of spray conditions that are different than the set of initial conditions. The set of spray conditions may be achieved by changing one or more of the initial conditions to spray conditions.

The targeting system 842 may include a set of target initial conditions which include target characteristics such as for example the target identification, target location, target size, and target contact area, and center point.

Figure 29A:
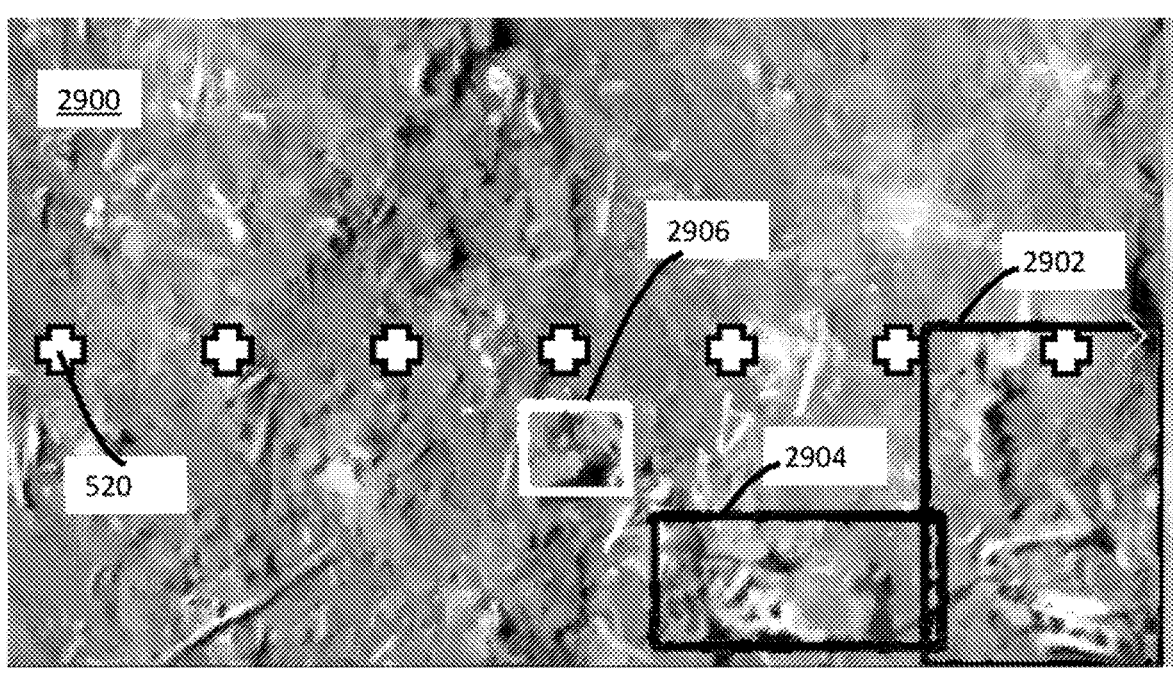
FIGS. 29A and 29B are images of the field of view of the drone demonstrating when the nozzles are to be activate.

For example, FIG. 29A shows a drone field of view 2900 expected just prior to the spray on command provided by the cameras 630 and/or the sensors 606. The field of view 2900 includes two targets 2902, 2904 within a target contact area and one non-target 2906. In this example the targets 2902, 2904 do not move but the drone 202 is moving in a direction towards the bottom of the image 2900. A position of a boom of spray nozzles 502 are shown on the image 2900. As can be seen in FIG. 29A, none of the spray nozzles 520 sufficiently correspond in position to the targets 2902, 2904 and are close to the non-target 2906.

Figure 29B:
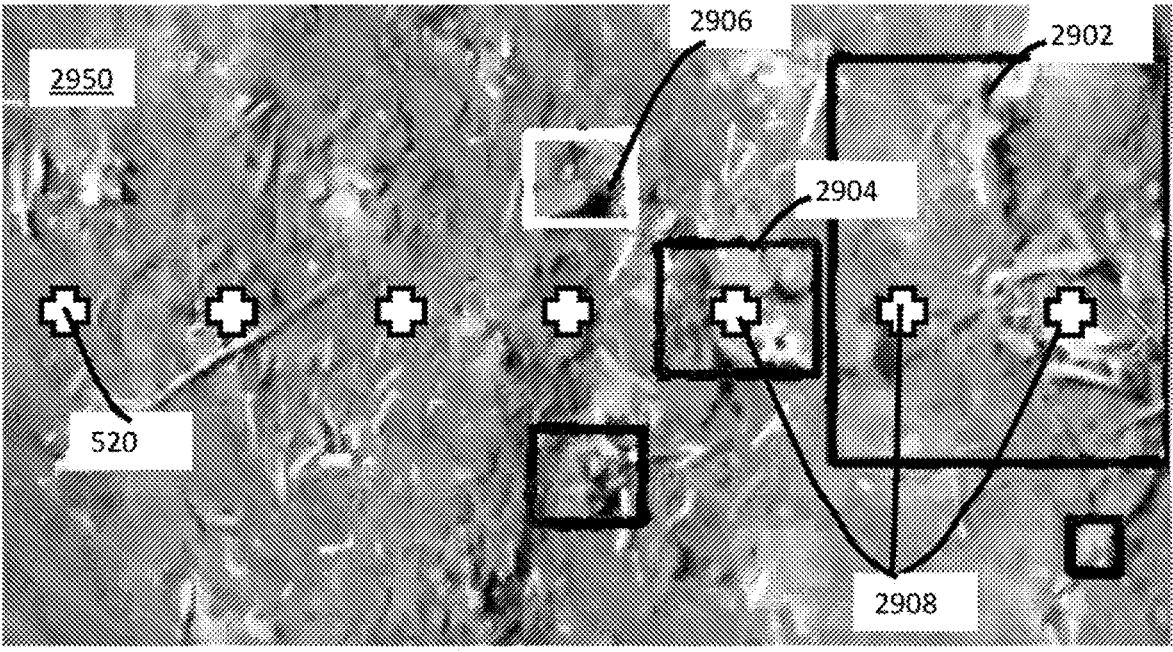

Turning to FIG. 29B, the drone 202 has moved position causing the bounding boxes for the targets 2902, 2904 to be adjusted to account for an updated relative position of the weeds identified as the targets 2902, 2904 become more visible in the image 2950. The spray vectors and center points may be recalculated in real-time to ensure the spray operation hits the correct locations on the targets 2902, 2904. The spray nozzles 2908 are now aligned with a center point of target 2904 and sufficiently correspond with target 2902. In this instance, these spray nozzles 2908 may be activated in order to treat these targets 2902, 2904.

Returning to FIG. 28, a second scenario 2830 the drone 202 is shown during a spraying mission where the drone 202 is blown by a gust of wind 2834 in only two dimensions. The targeting system 842 has already determined that the spray vector. In this scenario, a new spray vector may be calculated and executed because of the drone drift detected by the drone navigation system 608. In this example, the drone 202 may be blown by the gust of wind 2834 that changes an acceptable spray vector into an unacceptable spray vector. A recalculation may determine a new position relative to the weed 2804 and the adjustment has directed nozzle 2832 to be activated rather than nozzle 2802.

The drone drift may be determined by defining a circle associated with the spray diameter. If the circle drifts outside of the target area, then the navigation system 608 may determine that the drone 202 has drifted. This drifting out of the target area represents the spray vector starting from a higher V-INT but moving to a lower V-INT and then to a V-INT that is outside the V-INT range for this target area. A new spray vector may be calculated for each of the nozzles 520 to determine which nozzle 520 can most effectively hit the target area. Once a nozzle 520 has been selected, the new spray vector determines the spray area required for the target area. One or more incremental movements may be determined by the drone navigation system 608 moving the drone 202, 1200 and/or the drone mechanical system 650 moving a drone component to a new position, according to the new spray vector command set. This repositioning back into the target area results from the newly calculated spray vector that is within the V-INT range for this target. Note also that drone 202, 1200 may move the entire drone 202, 1200, or the spray nozzle 520 or both.

In a third scenario 2850, the drone 202 may be blown by a gust of wind 2854 that moves the drone 202 in three dimensions. The drone 202 has moved laterally as well as tilted the drone 202 such that the spray vector is no longer straight down. In this instance, the targeting system may recalculate the relative nozzle position and turn on the nozzle 2852 that is most likely to hit the target. Also, in this instance, an orientation of the nozzle 2852 may be adjusted such that the spray is not directed perpendicular to the boom of the drone 202.

In some aspects, a radius of the spray may be adjusted in order to correspond to the target area. For example, for a larger target area, the radius of the spray may be increased whereas for a smaller target area, the radius of the spray may be decreased. This increase or decrease may be accomplished by adjusting the properties of the nozzle 520 and/or may be adjusted by having the drone 202 fly higher or lower to the target area.

In one aspect, the target contact area may be a single point selected by the targeting system 842 from multiple candidate single points on the target. In another aspect, the target contact area may be a 2-dimensional or 3-dimensional geometric shape having one or more boundaries. The boundaries may be calculated by the targeting system 842 and may be calculated based in part on the expected relative orientation of the spray nozzle to the target at the time of spraying and the target geometry. Each different factor chosen by the mission rules to be included in the spray vector calculation may each be represented by a variable. Since the variables may each have an associated uncertainty and may be changing during the targeting and spraying process, the theoretical maximum probability $P_{max}$ available for the mission may be a percentage less than or equal to 100%. The actual calculated probability that a spray vector deposits an acceptable V-INT for a given target contact area is $P_{spray}$. $P_{spray}$ may be compared to the acceptable range between $P_{min}$ and $P_{max}$.

The boundaries of each of the multiple contact areas may or may not overlap. The targeting system 842 may calculate one or more initial target contact areas as an input to the spray vector calculation subsystem, then calculate all or a portion of an initial spray vector, and then use the initial spray vector calculation to revise the one or more calculated target contact areas. This calculation of one or more target contact areas and spray vectors may be repeated in an iterative process and may be constrained by a predetermined minimum probability of a successful spray referred to as $P_{min}$. Since the calculation of the actual probability P of a successful spray may be based upon the V-INT range, the probability, P, of a successful spray may vary as the center point of the spray vector geometry may be directed to different points on the contact area. For example, P may be greater if the spray vector is centered at the geometric center of the contact area and P may be smaller if the spray vector is centered at or near a boundary of the contact area. Thus, the contact area may be calculated as geometric contact points within and including the contact boundary with each contact point or the group of contact points having the associated P if the spray center point were to be aimed at that contact point or group of contact points. In one aspect, the contact area boundary points may be calculated as the contact points approximating the $P_{min}$ so that all points within the boundary have the predicted P greater than or equal to the $P_{min}$. In another aspect, the contact area boundary points may form a circle or ellipse or any other shape. If the contact area is calculated in 3 dimensions, the area boundary points may be in the form of a cone, a sphere, a cube or any other 3-dimensional shape. The spray vector geometry may be calculated in 3 dimensions. These 3 dimensions are a 2-dimensional shape that changes according to the third dimension of time which is the time required for the 2-dimensional spray shape to travel from the nozzle tip to the contact area. The 3-dimensional geometry may be mathematically calculated as a 2-dimensional shape traveling and changing in 2 dimensions over the distance and time from the nozzle tip to the contact points. The spray vector geometry may be calculated in 4 dimensions. The same 3 dimensions as for the 3-dimension geometry but including a 4th dimension representing the difference in time between at least one of the first microdroplets leaving the nozzle tip and at least one of a later microdroplets leaving the nozzle tip. The four-dimensional geometry may be mathematically calculated as a cloud emanating from the nozzle tip 520 and traveling toward the target and changing in three dimensions over the distance and time from the nozzle tip 520 to the contact points. Any of the spray vector geometries discussed herein may be combined with any of the contact area geometries discussed herein.

A spray vector having a center point outside of the boundary area may have the spray vector P that is less than the $P_{min}$. If the spray vector defines a tight geometry such as a tight spray stream with a small geometric coverage area at the point of spray impact. For example, such a tight spray geometry may have a predicted impact point of about 10 millimeters in diameter. Conversely, a spray vector defining a broad geometry may have a predicted impact point of about 100 millimeters in diameter and result in a much greater geometric coverage area. Thus, a spray vector defining the broader spray geometry but having the spray center point outside of the boundary area, may still have the spray vector P that is equal to or greater than the $P_{min}$.

In one aspect, the mission rules may define the $P_{min}$ based on a fixed spray geometry. In another aspect, the mission rules may define the $P_{min}$ based on the fixed spray geometry and include mission rules that direct the targeting system 842 to adjust the spray vector geometry according to the drones micro environment and target conditions to achieve the $P_{spray}$ that is equal to or greater than the $P_{min}$. The target spray geometry may be in the form of a circle, an ellipse or any other 2-dimensional shape appropriate for the mission objectives.

For example, when a target vector calculation includes motion of either the target or the drone, the boundary area may assume a more elongated shape in the direction of the movement in order to account for the additional targeting uncertainties caused by the movement of the drone or target. For example, for a horizontally moving target and/or horizontally moving drone system, the boundary area may be shaped like a horizontally-elongated ellipse. In any of these examples, the boundary area may be defined in terms of any convenient coordinate system with reference to the drone 202, 1200, the base station 204, and/or field 2300.

The size and number of contact areas may be based on any combination of factors. Different factors may be introduced to increase $P_{max}$ by reducing uncertainties while other factors may introduce uncertainties into the spray vector calculation and thus lower $P_{max}$ for a given target. For example, the size of the contact area may be based on: the target size, a distance between the drone 202, 1200 and the target at spray time, an accuracy of the drone navigation system 608, a precision which the drone 202, 1200 can move and aim the spray nozzle 520, an accuracy with which the spray geometry can be controlled by movement of the nozzle tip 520, the influence of the wind, the pressure of the spray and resulting time required for the spray to reach the target, the vibration level of the drone 202, 1200 during drone component movement 650, the vibration level of the drone 202, 1200 arising from the drone movement or any other relevant factor selected by the mission rules for use by the targeting system 842 or any combination of these factors. For targets having a large $P_{min}$ where the relevant uncertainties are fewer, the contact area boundary may be relatively small. For targets having a small $P_{min}$ where the relevant uncertainties are greater, the contact area boundary may be relatively larger.

In some aspects, the targeting system 842 may have achieved the spray vector that results in the $P_{spray}$ being greater than $P_{min}$ but then may delay the execution of the spray vector command set by changing the spray on command time to allow a period of time that may result in an increased $P_{spray}$. In another aspect, the targeting system 842 may have achieved the spray vector that results in the $P_{spray}$ being greater than $P_{min}$ but then may calculate second spray vector and command set for the same or a second spray nozzle to spray the same target a second time to further increase $P_{spray}$. This second spray may be initiated by the targeting system 842 in response to factors that changed or arose while the first spray was being executed.

Figure 9:
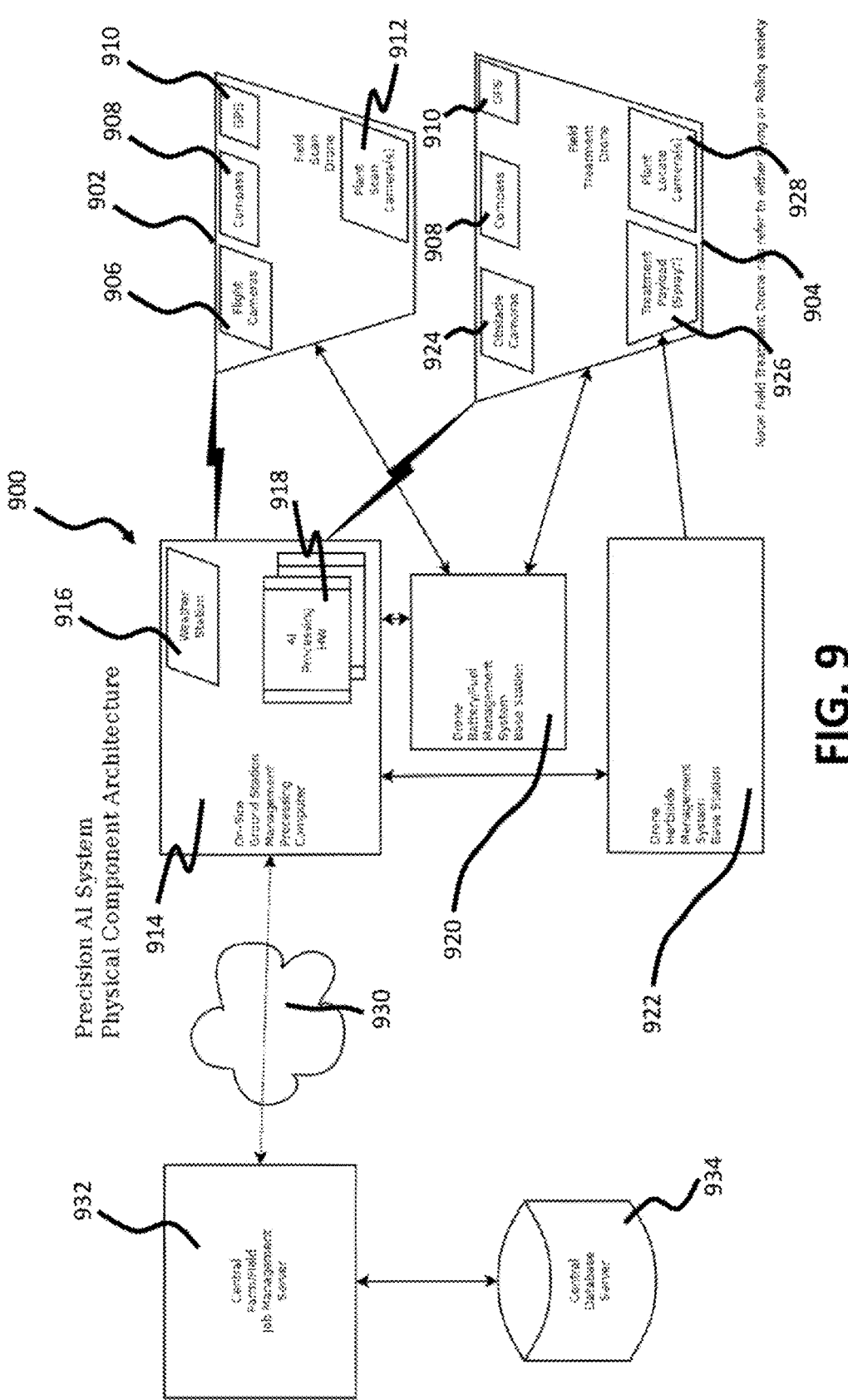
FIG. 9 is a physical component architecture diagram of the treatment system.

Turning to FIG. 9, a physical component architecture 900 of the treatment system 200 is shown. In this aspect, there may be one or more field scanning drones 902 and one or more field treatment drones 904. The field scanning drones 902 may be aerial drones, as described with reference to FIG. 5, instrumented with one or more flight cameras 906, a compass 908, and a GPS 910. In some aspects, the field scanning drone 902 may comprise one or more plant scanning cameras 912 separate from the flight cameras 906. The field scanning drone 902 may traverse the field gathering field data in order to wirelessly relay the data to an on-site ground station management processing computer 914. The field scanning drone 902 may dock with a battery/fuel management base station 920 in order to receive one or more new batteries and/or fuel.

In another aspect, the field treatment drones 904 may be a rolling treatment drone 1200 described in further detail below with reference to FIGS. 12A and 12B. Similar to the field scanning drones 902, the treatment drone 904 may comprise a compass 808 and a GPS 810. The treatment drone 904 may comprise one or more obstacle cameras 924 for imaging a path of the treatment drone 904. In some aspects, the treatment drone 904 may comprise one or more plant locating cameras 928. The treatment drone 904 may also comprise a treatment payload 926 to treating particular pests. Although the aspect described is directed to the rolling treatment drone 1200, other aspects may have a field treatment drone 904 be an aerial drone 902 as described in FIG. 5. Similar to the field scanning drone 902, the field treatment drone 904 may dock with the battery/fuel management base station 920. In addition to the battery/fuel management base station 920, the treatment drone 904 may also dock with a drone pesticide management system base station 922. The treatment drone 904 may also wirelessly communicate with the on-site ground station 914.

The on-site ground station management processing computer 914 may comprise a weather station 916 and one or more artificial intelligence processing hardware 918. The on-site ground station management processing computer 914 may communicate with the drones 902, 904 as well as the respective base stations 920, 922. The processing computer 914 may also communicate via a wired network over an Internet 930 with a central farm/field job management server 932. The job management server 932 may retrieve and store data to a central database server 934.

Figure 10:
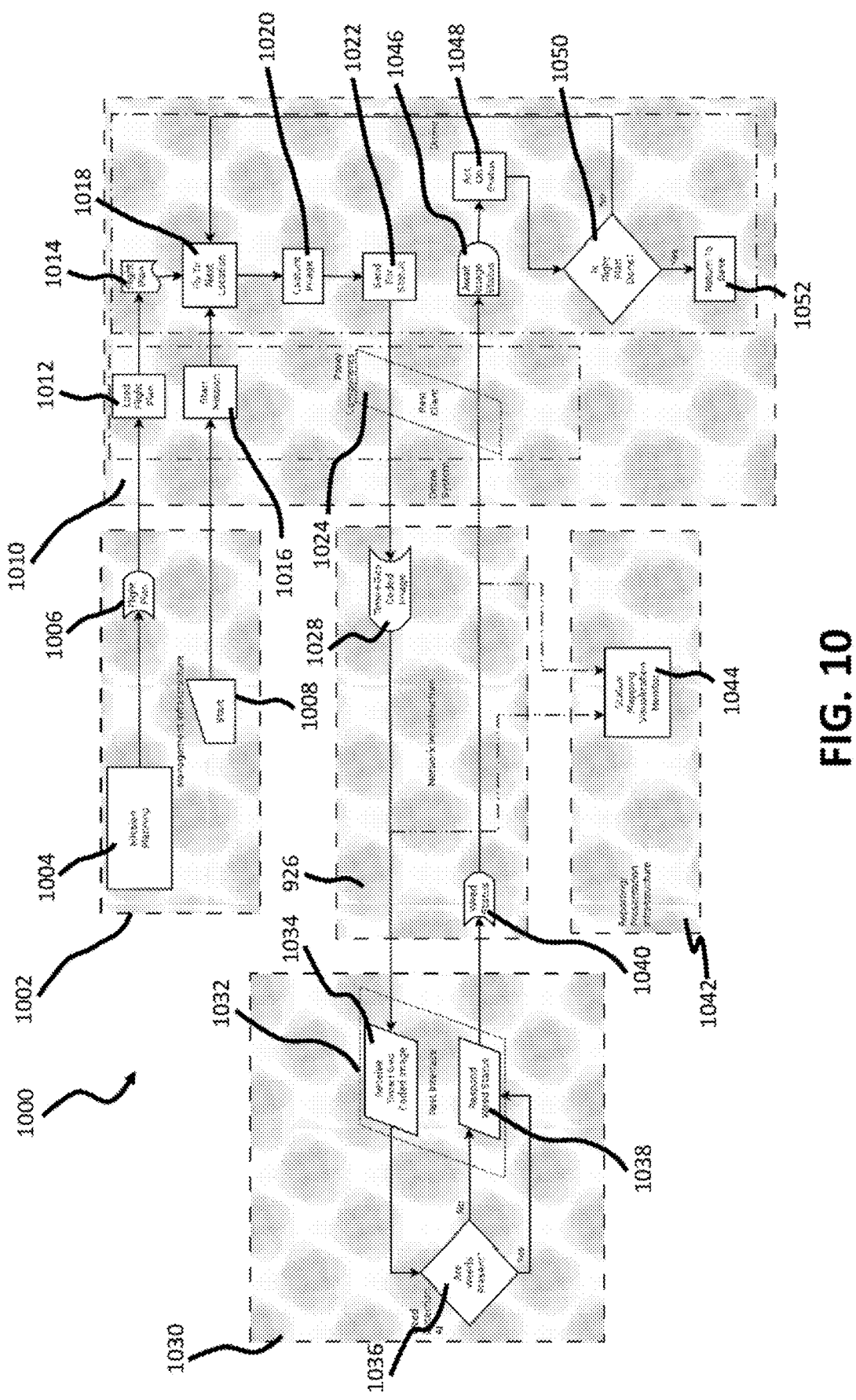
FIG. 10 is a flowchart of instructions executed by the treatment system.
Figure 10A:
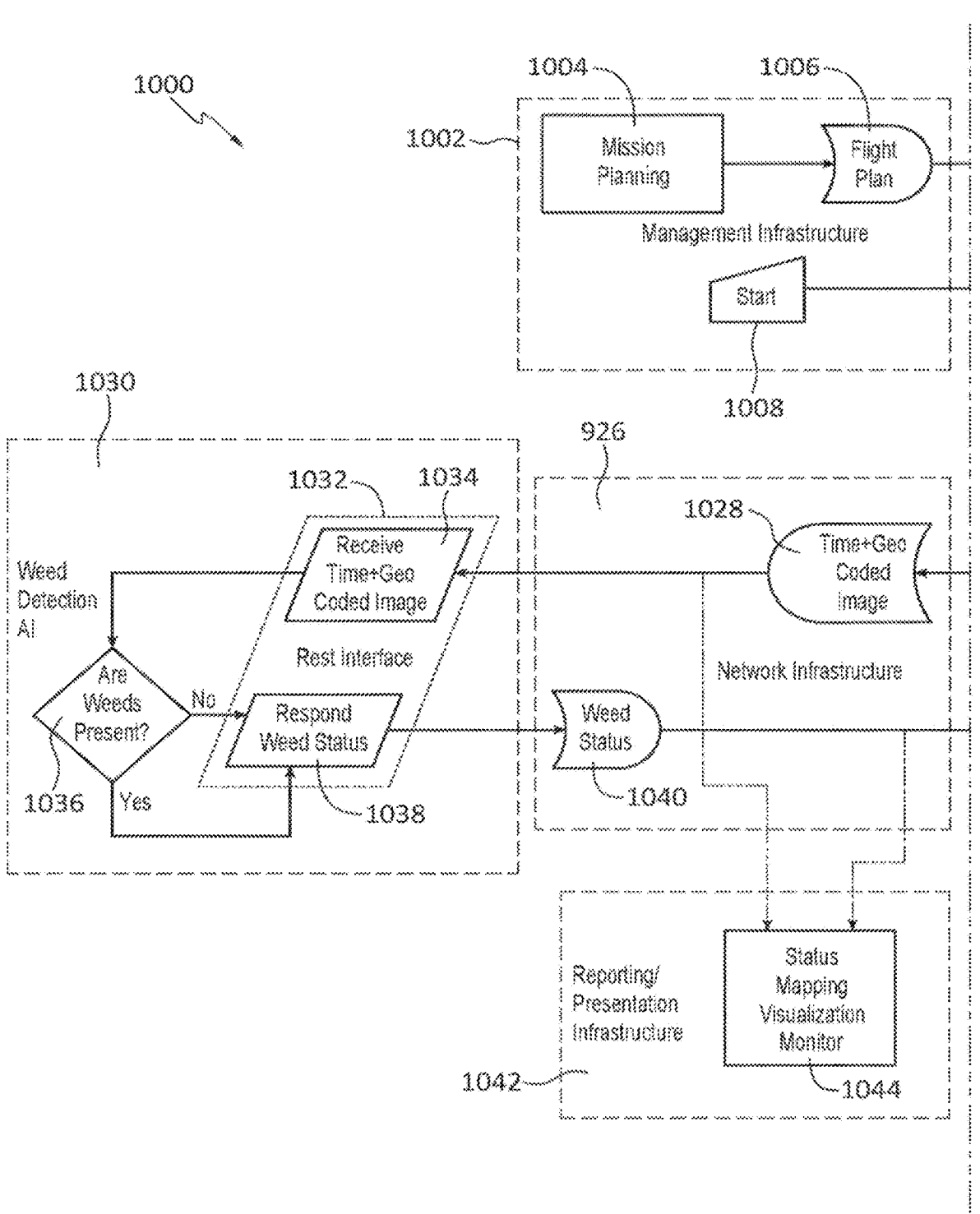
FIG. 10A is a close up view of the content on the left side of FIG. 10.
Figure 10B:
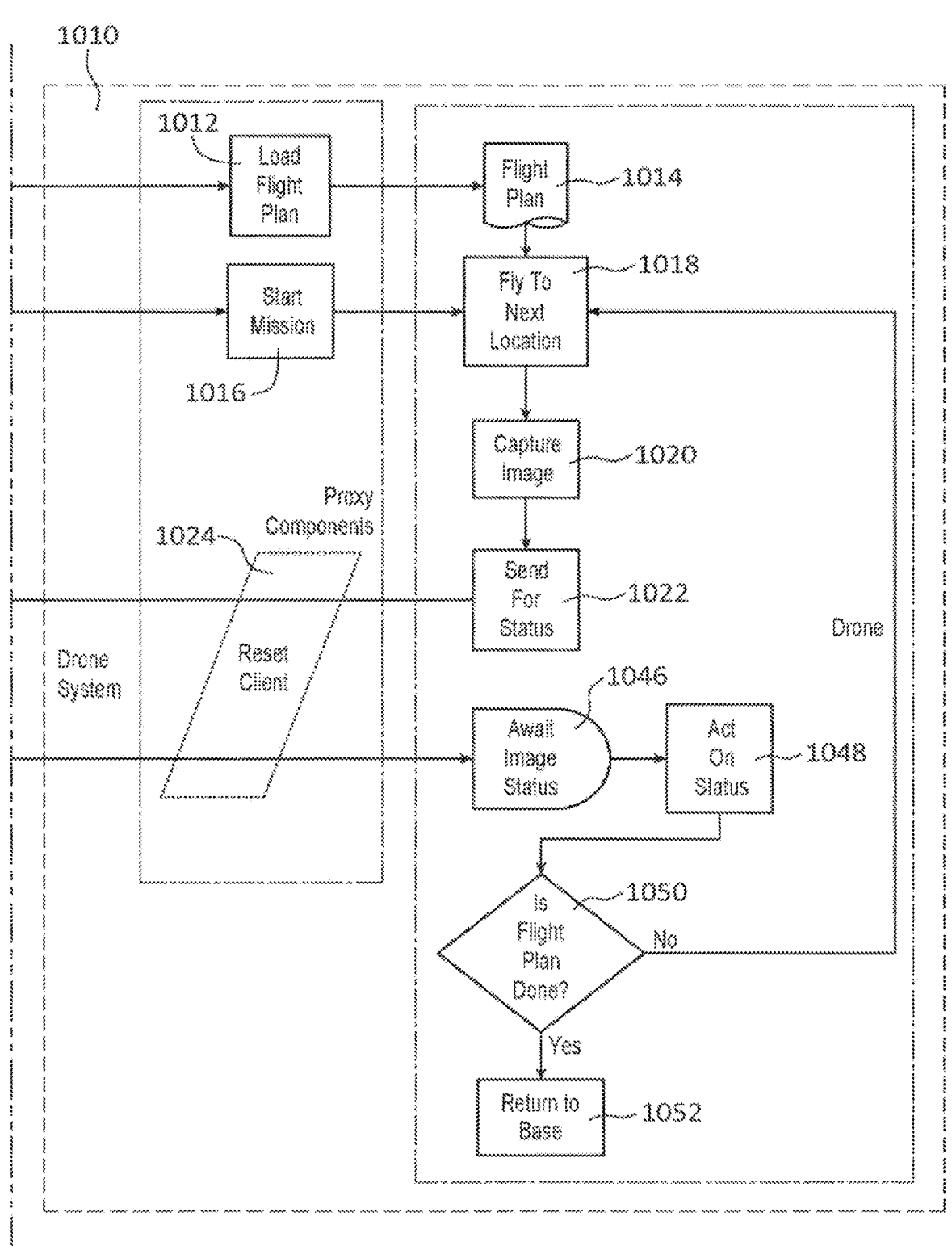
FIG. 10B is a close up view of the content on the right side of FIG. 10.

Turning to FIGS. 10, 10A and 10B, a precision AI conceptual structure 1000 is shown. A management infrastructure 1002 may comprise a mission planning module 1004 that provides mission data to a flight plan processing module 1006 that generates a flight plan for each drone 902.

The management infrastructure 1002 may receive an initiation input 1008. A drone system 1010 may load the flight plan using a load flight plan module 1012 from the flight plan processing module 1006. The flight plan may be divided into one or more flight plan sections at step 1014. Each drone 902 may be given instructions to fly to a next location 1018 if it has received a start mission signal 1016. As the drone 902 moves to the next location, the drone 902 may capture one or more images 1020 and may periodically transmit the one or more images to a buffer until the drone 902 determines that the drone 902 is in a rest state 1024 (e.g. landed at the base station 920).

When the drone 902 has landed at the base station 920, one or more of the images may be retrieved by the base station 920 via network infrastructure 1026. The images may have time and/or geocoded data associated with the image data processed 1028. The images and time and/or geocoded data may then be passed to a pest detection artificial intelligence module 1030. The received time and geocoded images may be stored in a RESTweb interface to a database at step 1034. A decision 1036 on whether a pest is present may be determined by an AI algorithm, such as a semantic segmentation, plant phenotype detection, and/or spectral analysis. If the pest is detected, the pest detection AI module 1030 may respond 1038 with a pest status 1040 over the network infrastructure 1026 to the drone 902. A reporting/presentation infrastructure 1042 may monitor the network infrastructure 1026 in order to determine locations of pests on a map using a mapping visualization monitor 1044.

When the drone 902 receives a pest status message 1040 from the pest detection AI module 1030, the drone 902 exits a waiting status 1046 and may act 1048 on the pest status message 1040. The action 1048 may involve spraying or heating, etc. in order to treat the pests at the location. The drone 902 then determines if the flight plan has been completed at decision 1050. If the flight plan is complete, the drone 1002 navigates and returns to the base station 920, 922 at step 1052. Otherwise, the drone 902 process returns to fly to the next location at step 1018.

Figure 11A:
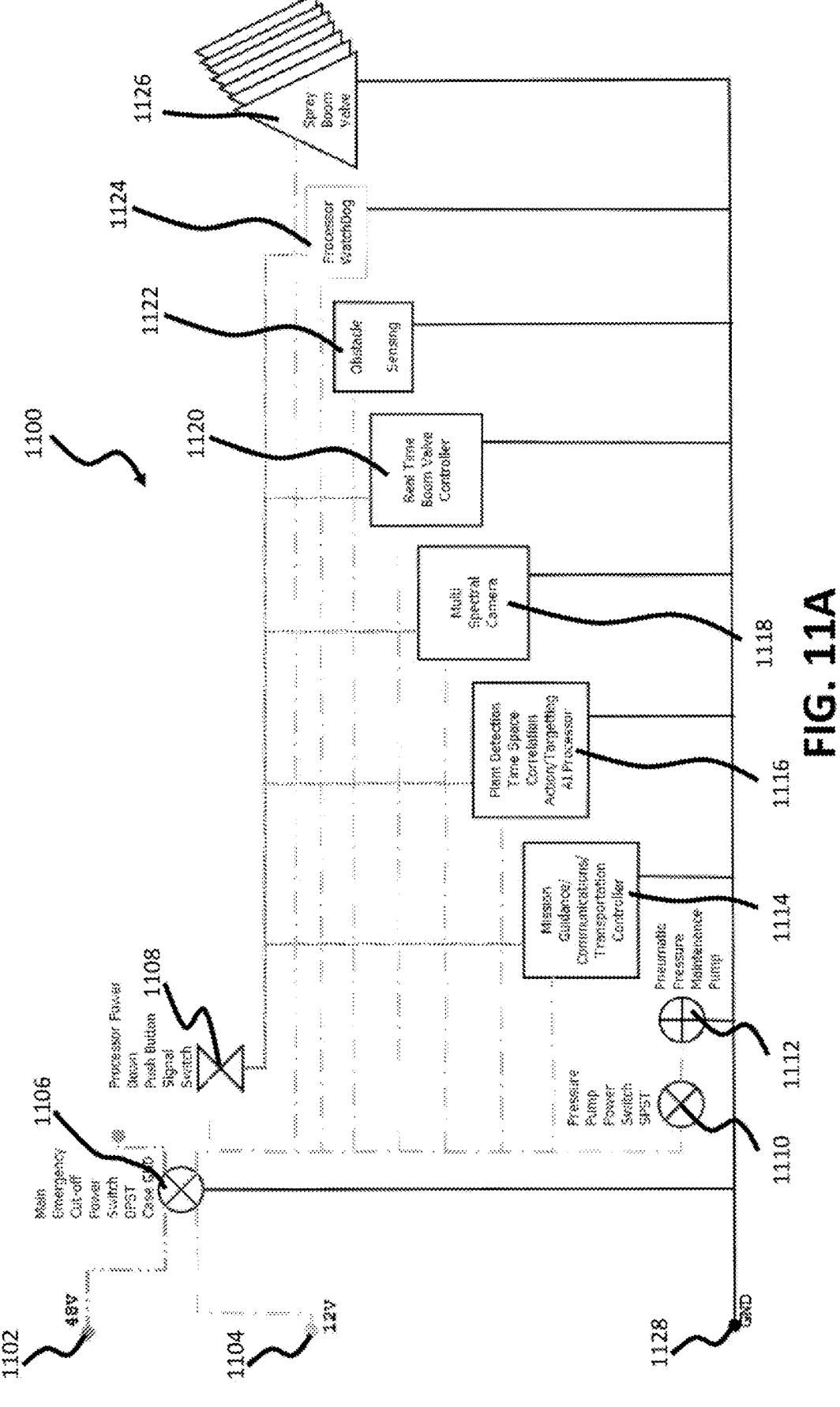
FIG. 11A is a diagram of an onboard 12-Volt electrical power distribution system for the drone.

FIG. 11A shows an onboard 12-Volt electrical power distribution system 1100 for the drone 902. The drone 902 may have a 48-Volt supply 1102, a 12-Volt supply 1104, and a ground 1128. In this aspect, both of the supplies 1102, 1104 pass through a main emergency cut-off power switch 1106 that cuts off both supplies 1102, 1104 from other electrical components of the drone 902 when an emergency event is detected. The 12-Volt supply 1104 may supply power to a pressure pump power switch 1110 that may enable or disable power being supplied to a pneumatic pressure maintenance pump 1112 that may provide pressure for the sprayer 202.

A processor power down push button 1108 may also be able to cut off the 12-Volt supply 1104 from the lower power electronic components. The lower power electronic components may comprise: a mission guidance communications and/or transportation controller 1114, a plant detection time space correlation action/targeting AI processor 1116, a multi-spectral camera 1118, a real-time boom valve controller 1120, one or more obstacle detection sensors 1122, and a processor watchdog 1124. A spray boom valve 1126 may be controlled by the real-time boom valve controller 1120 and may also receive power from the 12-Volt supply. The processor watchdog 1124 may monitor the electronic components for a lockup condition and when detected may reboot the drone 902.

Figure 11B:
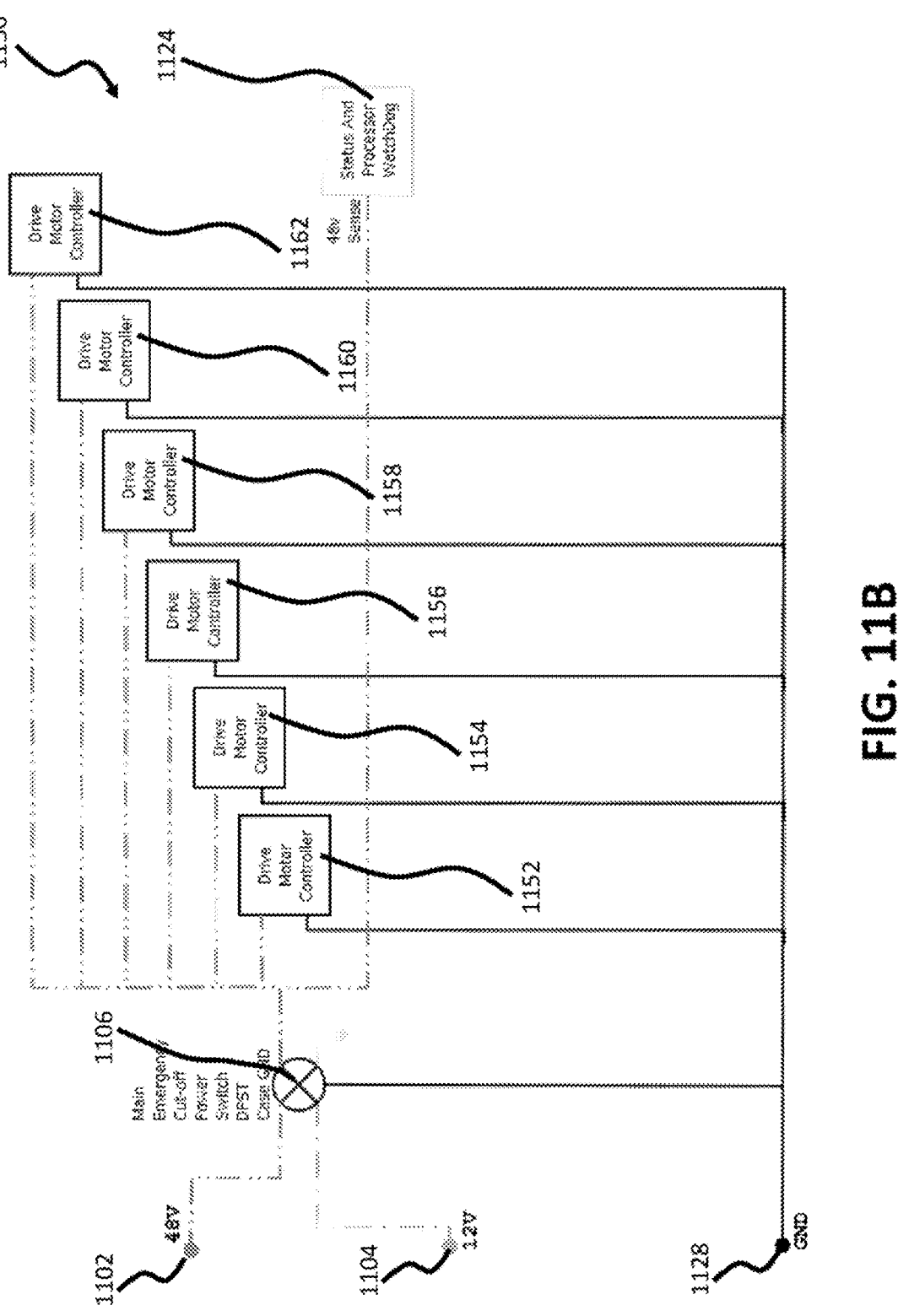
FIG. 11B is a diagram of an onboard 48-Volt electrical power distribution system for the drone.

In another aspect shown in FIG. 11B, an onboard 48-Volt electrical power distribution system 1150 is presented. In this particular aspect, the power distribution system 1150 may be for the field treatment drone 904. Similar to the 12-Volt distribution system 1100, the drone 904 may have the 48-Volt supply 1102, the 12-Volt supply 1104, and the ground 1128. In this aspect, both of the supplies 1102, 1104 pass through a main emergency cut-off power switch 1106 that cuts off both supplies 1102, 1104 from other electrical components of the drone 904. The electrical components of the drone 904 may comprise six drive motor controllers 1152 through 1162 that may rotate each of the six wheels 1206. Each of these drive controllers 1152-1162 may be monitored by the watchdog 1124.

Turning to FIGS. 12A and 12B, the rolling treatment drone 1200 may be shown. In this aspect, the drone 1200 may comprise a plurality of wheels 1206 on both sides of a transportation cradle or housing 1208. A camera housing 1202 may be mounted on a camera boom 1203 above the transportation cradle or housing 1208. The camera boom 1203 may be coupled to a communication tower 1204. The communication tower 1204 may be configured to communicate with the base station 204. Located at a rear of the drone 1200 may be a one or more free rolling wheels 1220 that have a height generally above the ground. In this aspect, there are four free rolling wheels 1220. Between each of the free rolling wheels 1220 may be a spray boom 1222 acting as an axle for each of the wheels 1220. The spray boom 1222 may be supported by a pair of wing hinges 1216 and may have a nozzle impact guard 1226 in order to protect the nozzles 520 from damage. Mounted on the spray boom 1222 may be a valve block 1224 and a spray nozzle 520 between each of the free rolling wheels 1220. Each valve block 1224 may control an amount of pesticide spray to each spray nozzle 520. A pump 1210 may be mounted above the transportation cradle 1208 and may be connected to a hose 1214 to the valve blocks 1224. The pump 1210 may supply pressure of the liquid pesticide to the valve blocks 1224.

Figure 13:
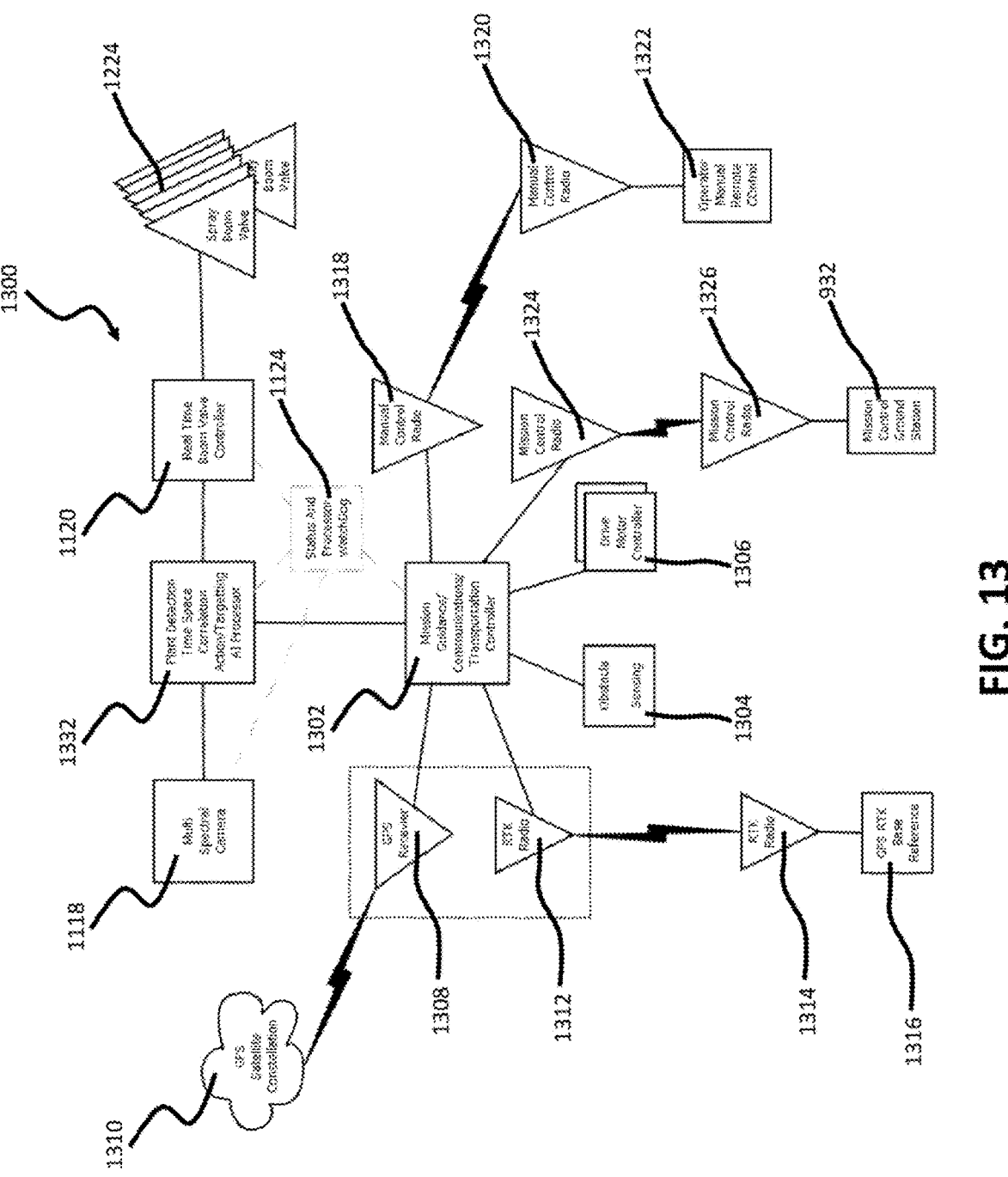
FIG. 13 is a block diagram of an electronic system for the drone.

Turning to FIG. 13, an electronic system 1300 for the rolling drone 1200 is presented. The electronic system 1300 comprises a controller 1302 for mission guidance, communications, and/or transportation. As previously mentioned, the watchdog 1124 monitors the system 1300 for lockup and/or other anomalies. The controller 1302 may receive obstacle data from an obstacle sensing system 1304 and provide output to a drive motor controller 1306. The controller 1302 may communicate with a plant detection time space correlation action/targeting AI processor 1332 that may receive one or more images from the multi-spectral camera 1118. The AI processor 1332 may also send signals to a real-time boom valve controller 1120 that may initiate the pesticide spray from the spray boom valves 1224.

For navigation, the controller 1302 may receive one or more GPS coordinates from a GPS receiver 1308 in communication with a GPS satellite constellation 1310. The controller 1302 may also receive a signal from a real-time kinematic (RTK) radio 1312 from a GPS RTK base reference 1316 transmitting via another RTK radio 1314. The navigation system 608 may receive this information in order to plan routing of the drone 1200 and/or calculate the relative GPS RTK coordinates of weeds/pests within the image data captured by the drone 202, 1200.

The controller 1302 may also receive manual control instructions from a manual control radio 1318. An operator manual remote control 1322 may transmit the manual control instructions via a manual control radio 1320 to be wirelessly received by the manual control radio 1318 in the drone 1200. The controller 1302 may also wirelessly communicate with a mission control ground station 932 over a pair of mission control radios 1324, 1326 operating on the same frequency. In this aspect, the mission control ground station 932 may control the missions and the base station 204 may perform recharging and/or swapping drone batteries or spray.

Figure 14:
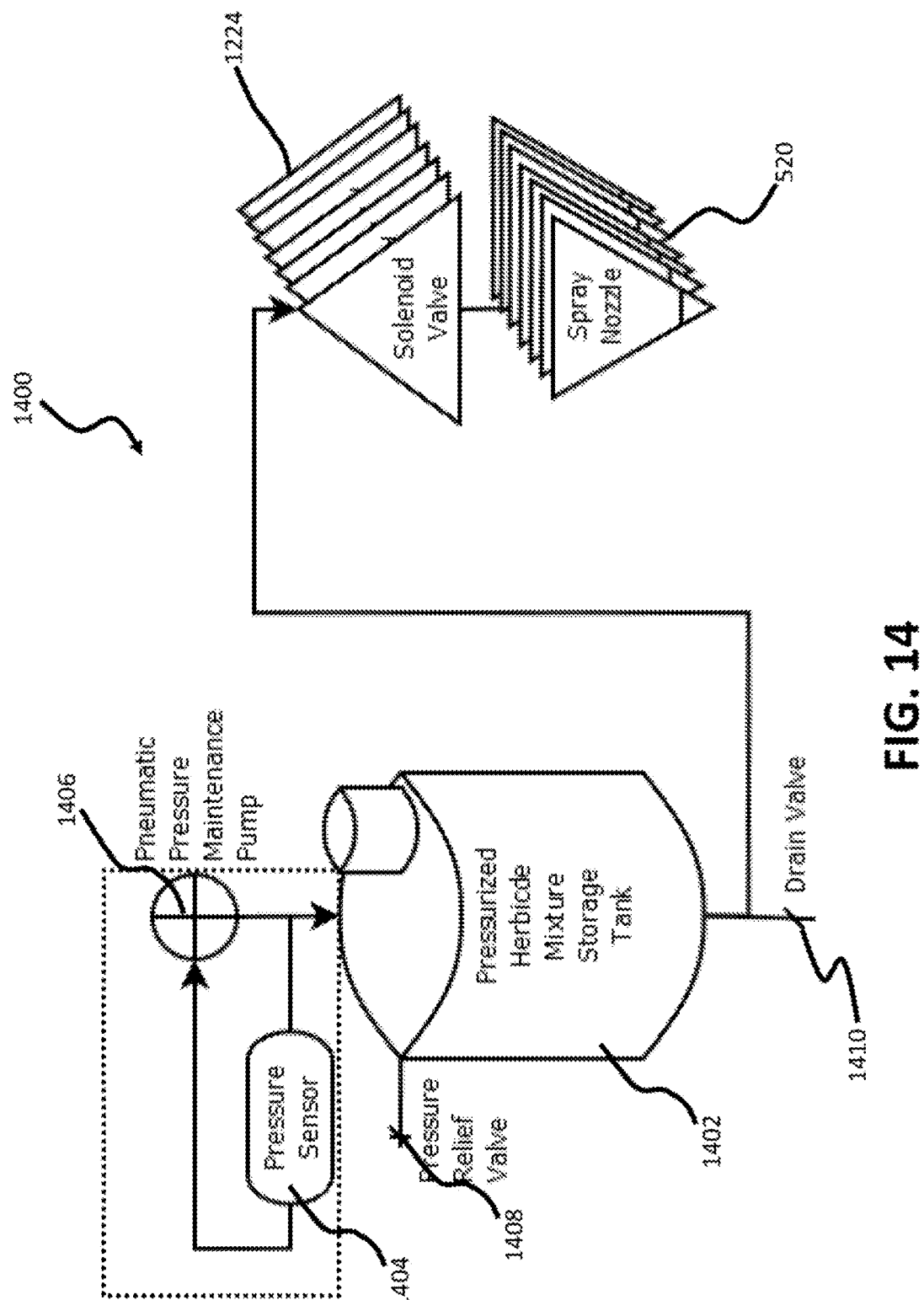
FIG. 14 is a block diagram of a pesticide system for the drone.

As shown in FIG. 14, the field treatment system drone 1200 may have a pressurized pesticide mixture storage tank 1402 on board. A pressure sensor 1404 may measure a pressure within the tank 1402 and may regulate the pressure with a pneumatic pressure maintenance pump 1406. For safety, a pressure relief valve 1408 may prevent excessive pressures within the tank 1402 or may permit a maintenance technician to release the pressure for maintenance. The tank 1402 may also have a drain valve 1410 located generally below the tank 1402 for draining the pesticide from the pesticide system 1400. The tank 1402 may provide pesticide to the one or more solenoid valves 1224. The solenoid valves 1224 may release the pesticide as a spray through one or more spray nozzles 520.

Figure 15:
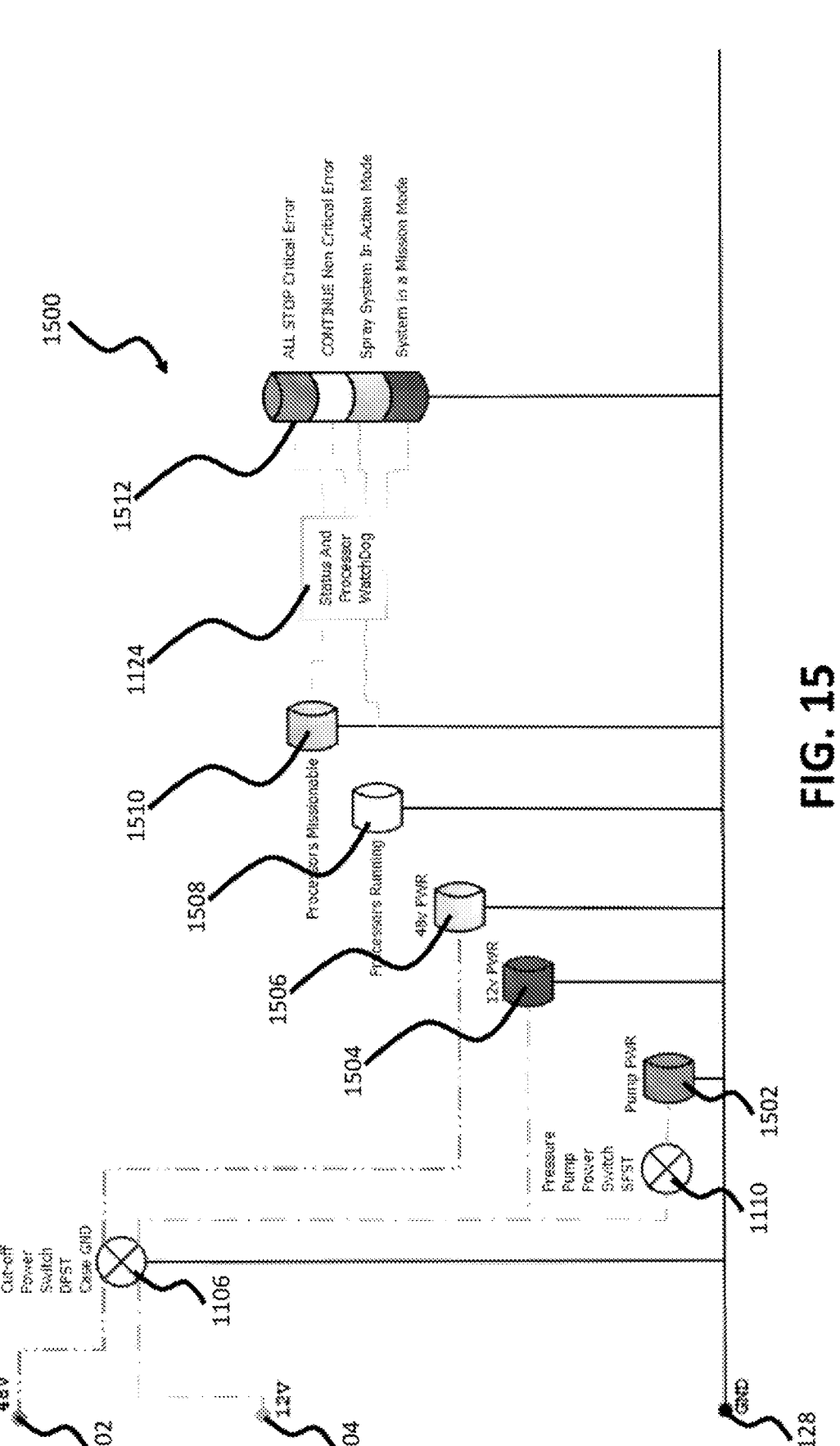
FIG. 15 is a block diagram of a light indicator system for the drone.

FIG. 15 demonstrates a light indicator system 1500 for the rolling drone 1200. As previously mentioned, the 48-Volt power supply 1102 and the 12-Volt power supply 1104 provide power through the emergency cutoff power switch 1106. When the power switch 1106 is closed, a 12-V indicator light 1504 and a 48-V indicator light 1506 may be illuminated. When the pump power switch 1110 is closed, a pump power indicator light 1502 may be illuminated. Once the controller 1302 becomes operational, the controller 1302 may turn on a controller running indicator light 1508. When the controller 1302 is prepared for a mission, the controller 1302 may turn on a controller missionable indicator light 1510. The running indicator light 1508 and the missionable indicator light 1510 may be controlled by the watchdog 1124. The watchdog may also control a band of indicator lights 1512 corresponding to an all stop/critical error state, a continued operation state, a spray system in action mode, and/or a system in mission mode. Each of these lights may be light emitting diodes (LEDs) or other type of illuminator. In other aspects, these indicator lights may be replaced with a display screen, such as an LCD, etc.

Figure 16A:
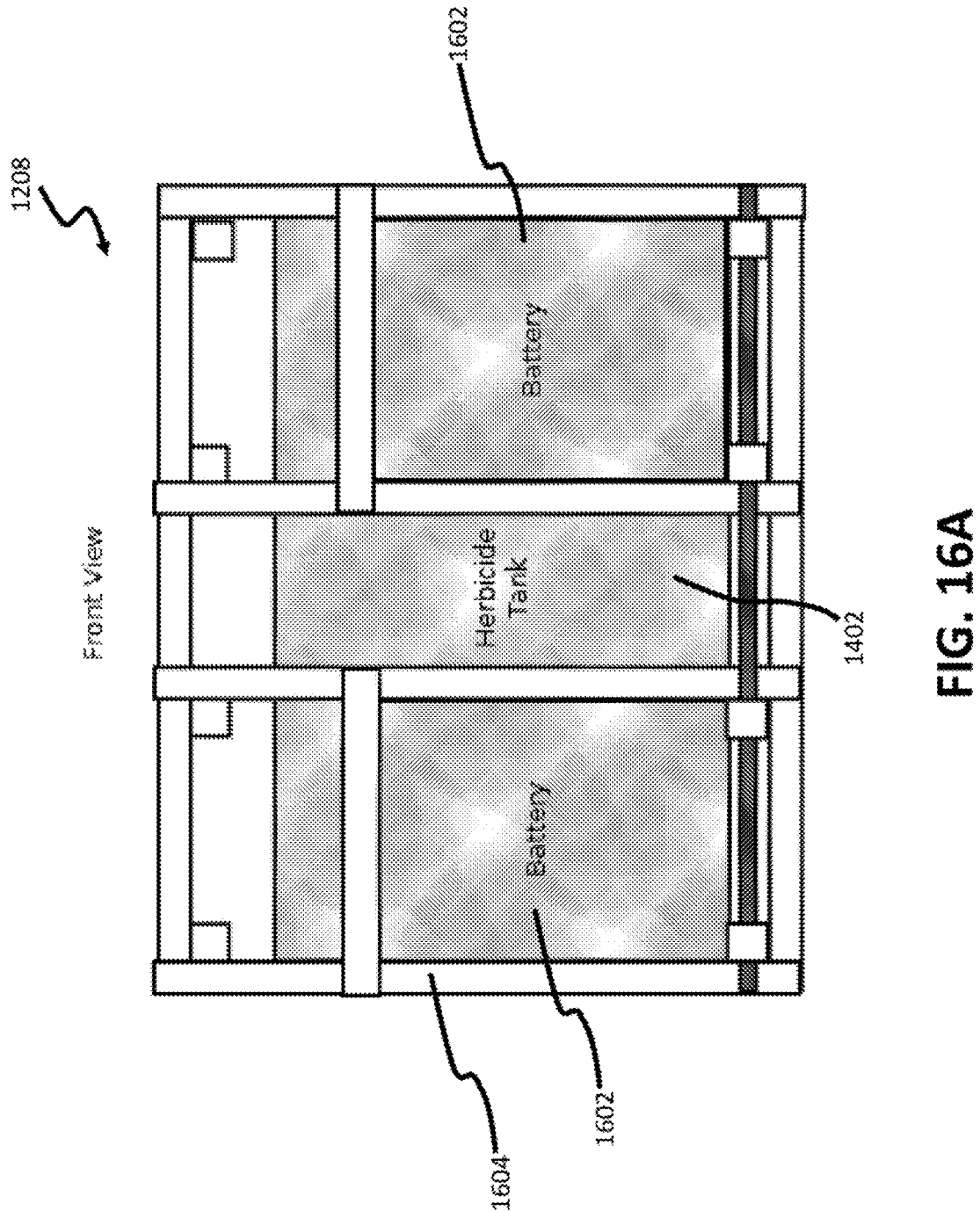
FIG. 16A is a front view of a transportation cradle for the drone.
Figure 16B:
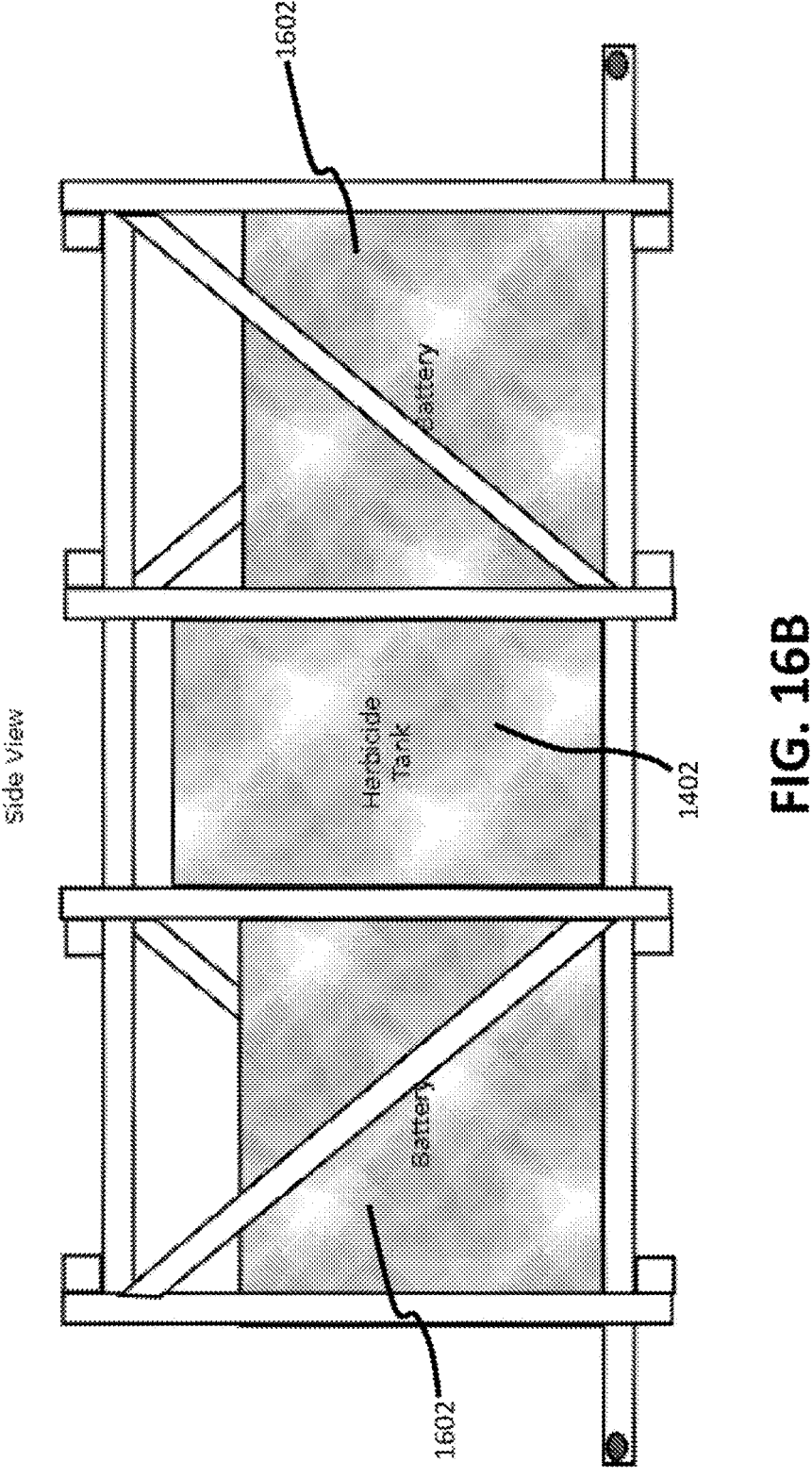
FIG. 16B is a side view of the transportation cradle for the rolling drone.
Figure 16C:
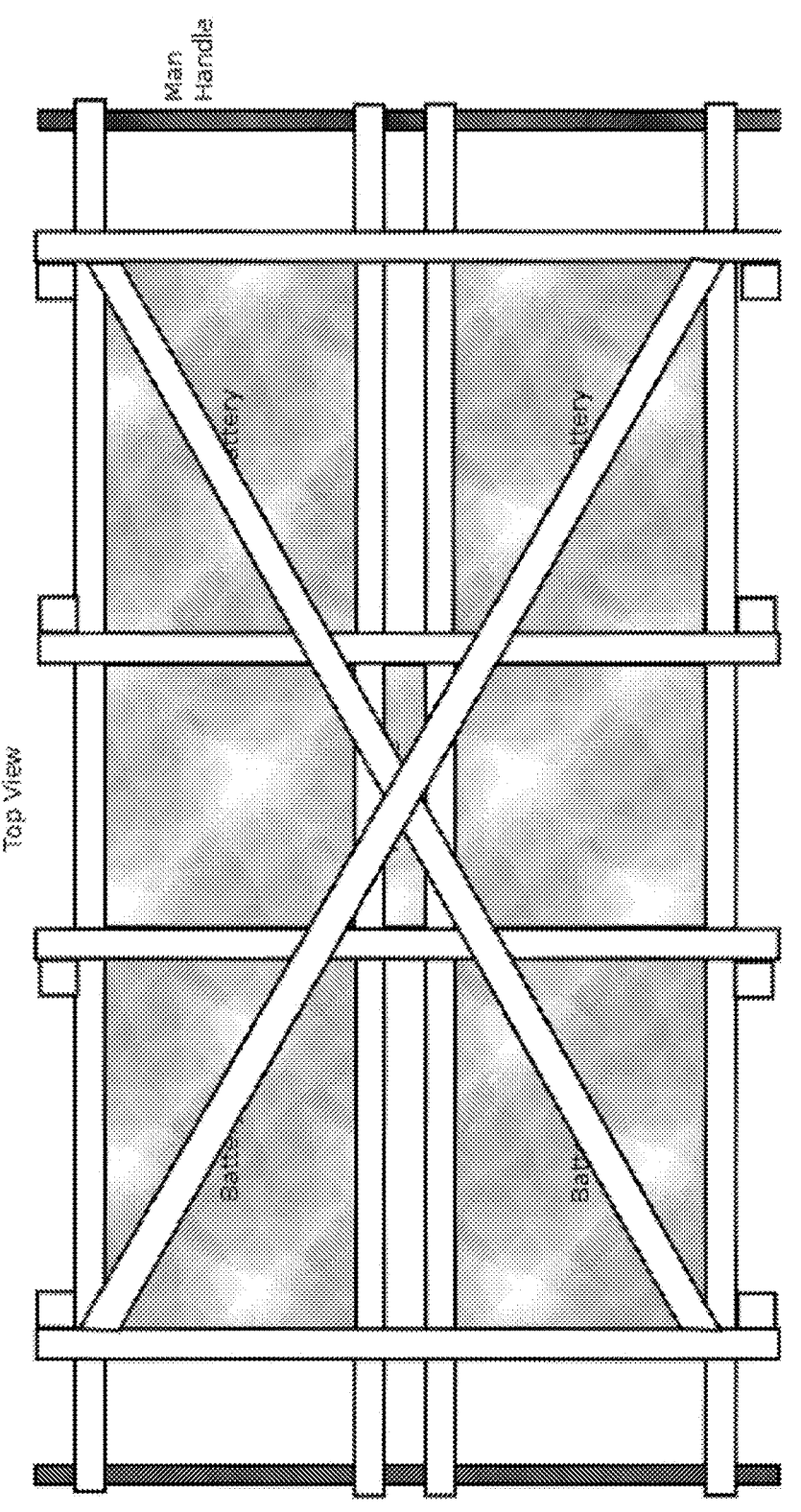
FIG. 16C is a top view of the transportation cradle for the rolling drone.

Turning to FIGS. 16A to 16C, the transportation cradle or housing 1208 is shown in more detail. The transportation cradle or housing 1208 comprises a frame 1604 surrounding one or more batteries 1602. The pesticide tank 1402 may be centrally located between a pair of batteries 1602.

Figure 17A:
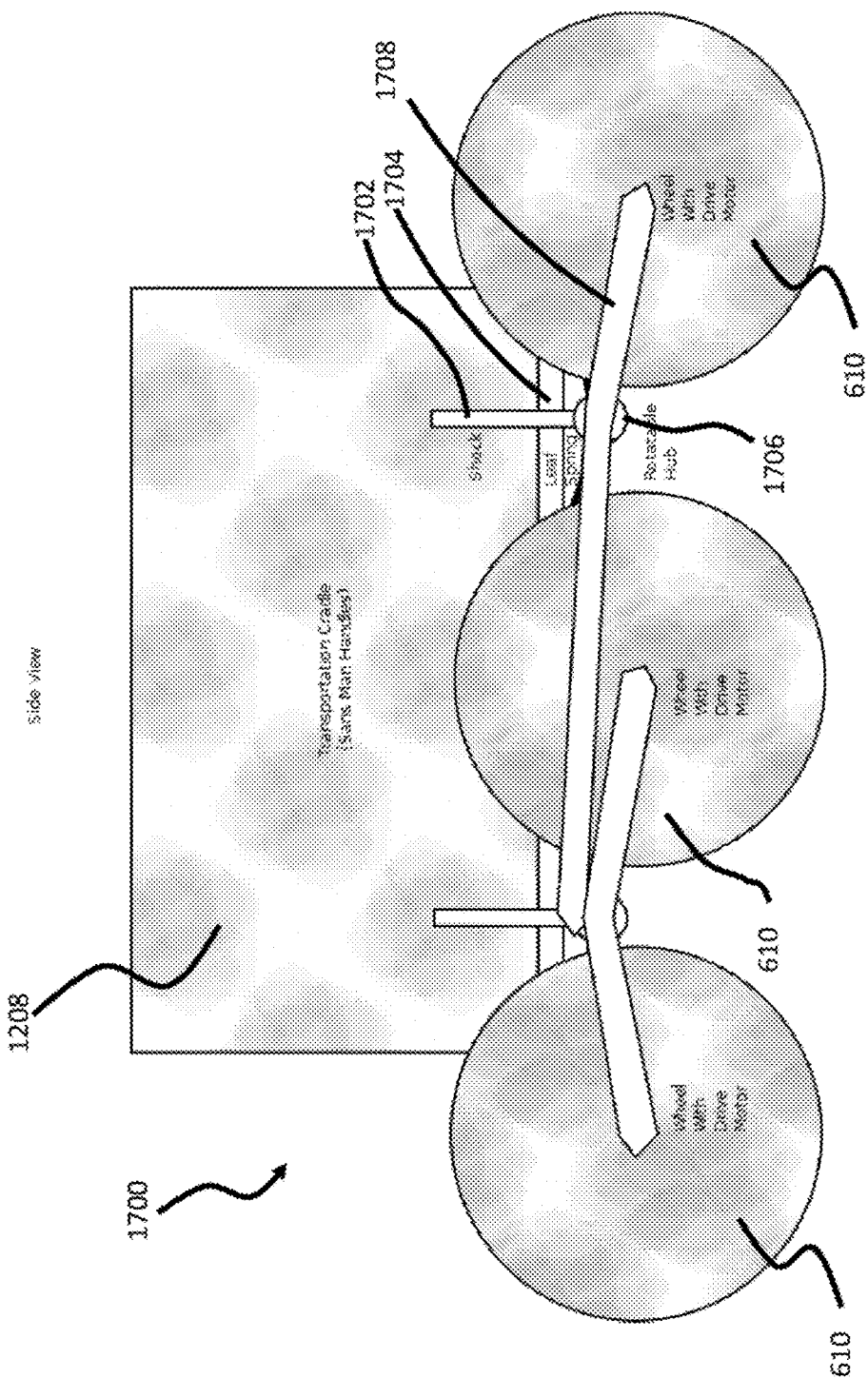
FIG. 17A is a side view of a drive and suspension system for the rolling drone.
Figure 17B:
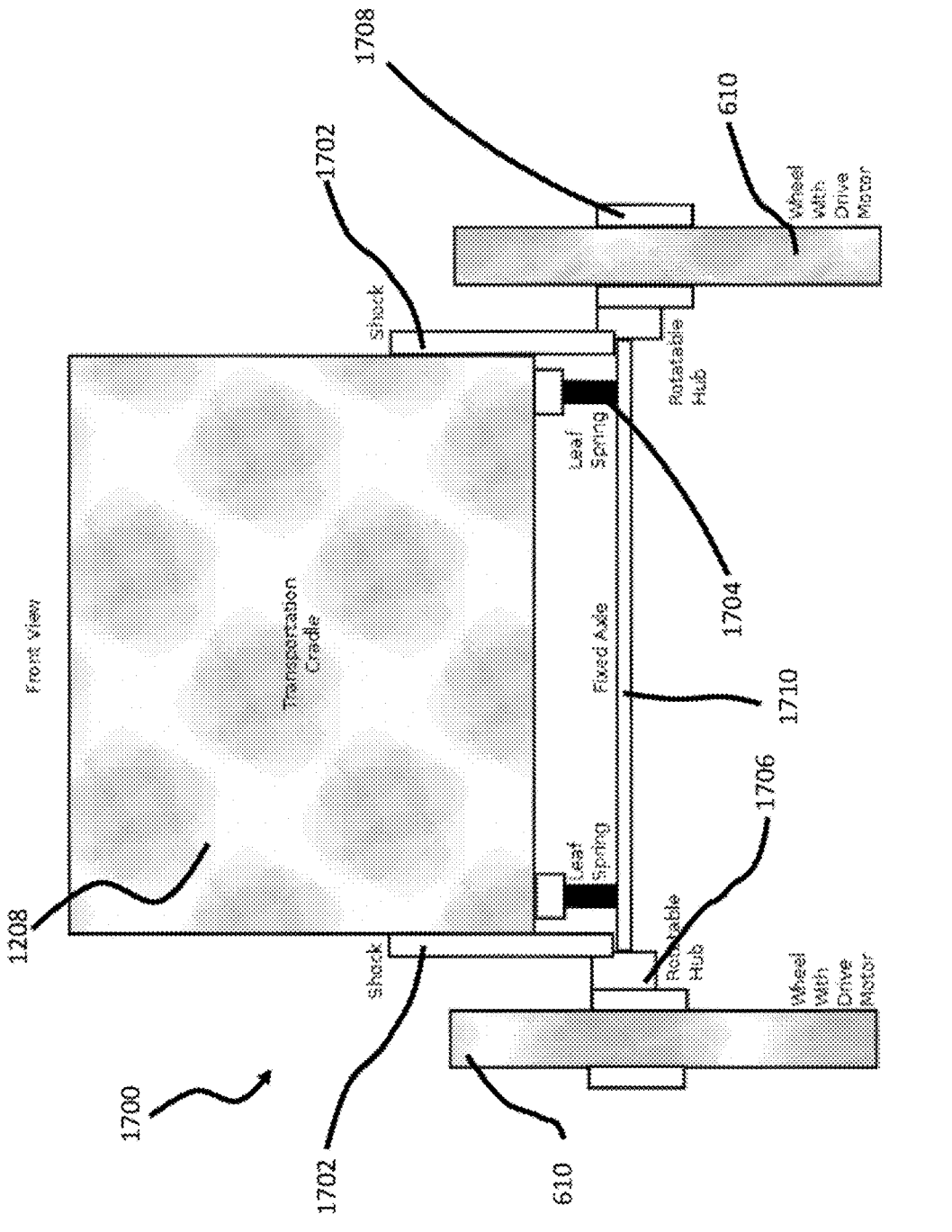
FIG. 17B is a front view of the drive and suspension system for the rolling drone.

A drive and suspension system 1700 for the rolling drone 1200 is shown in FIGS. 17A and 17B. In this aspect, the transportation cradle or housing 1208 may be supported by six wheels 1206 having a drive motor for each wheel 1206. The wheels 1206 on each side may be coupled together with one or more connecting members 1708. The connecting members 1708 may be coupled to one or more axles 1710 coupled to rotatable hubs 1706. In this aspect, the suspension system 1700 comprises a pair of axles 1710. The axles 1706 may be coupled to the transportation cradle or housing 1208 using one or more shocks 1702 and one or more leaf springs 1704.

Figure 18:
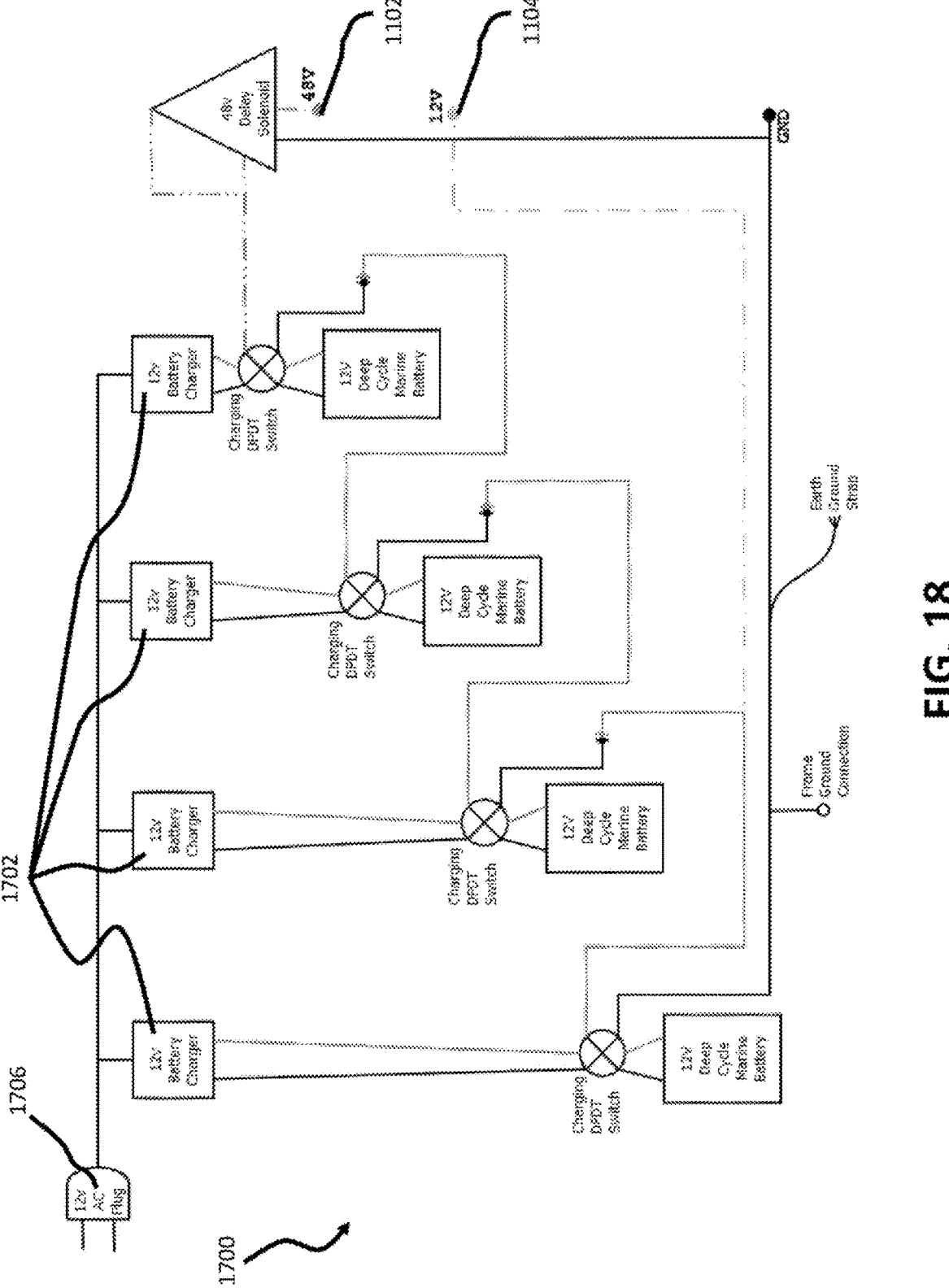
FIG. 18 is a schematic diagram of an onboard electrical power supply system for the rolling drone.

Turning to FIG. 18, an onboard electrical power supply system 1800 for the field treatment system 904 is shown. The power supply system 1800 comprises at least one 12-V battery charger 1802 supplied power from a 120-VAC plug 1706. The chargers 1802 may provide electrical power to one or more 12-Volt deep-cycle marine batteries 1804. The 12-V supply 1004 may be provided from one of the batteries 1804. The 48-V supply 1002 may be provided from 4 of the batteries 1804 placed in series.

Figure 19:
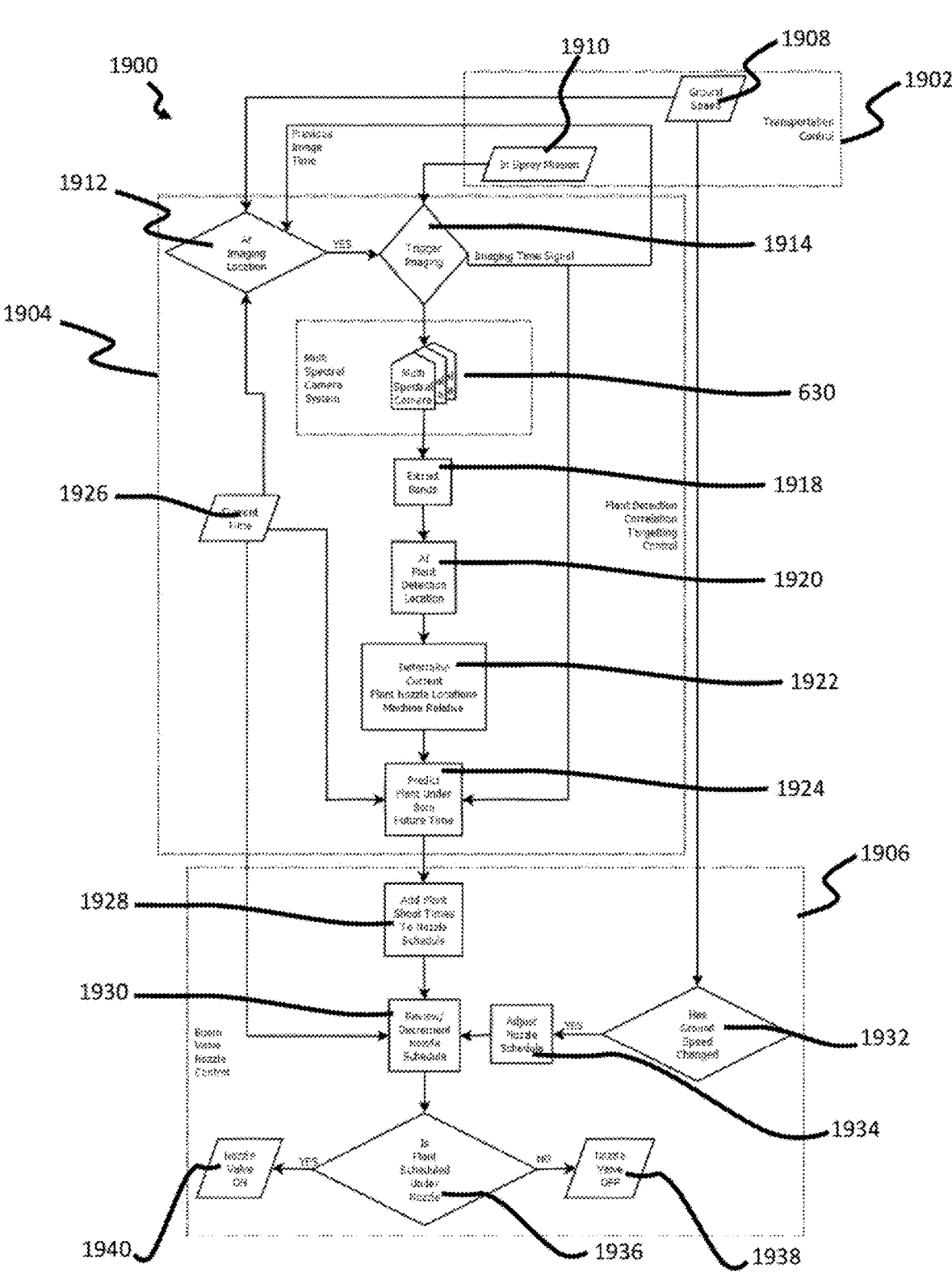
FIG. 19 is a flowchart for a sprayer image nozzle control system.
Figure 19A:
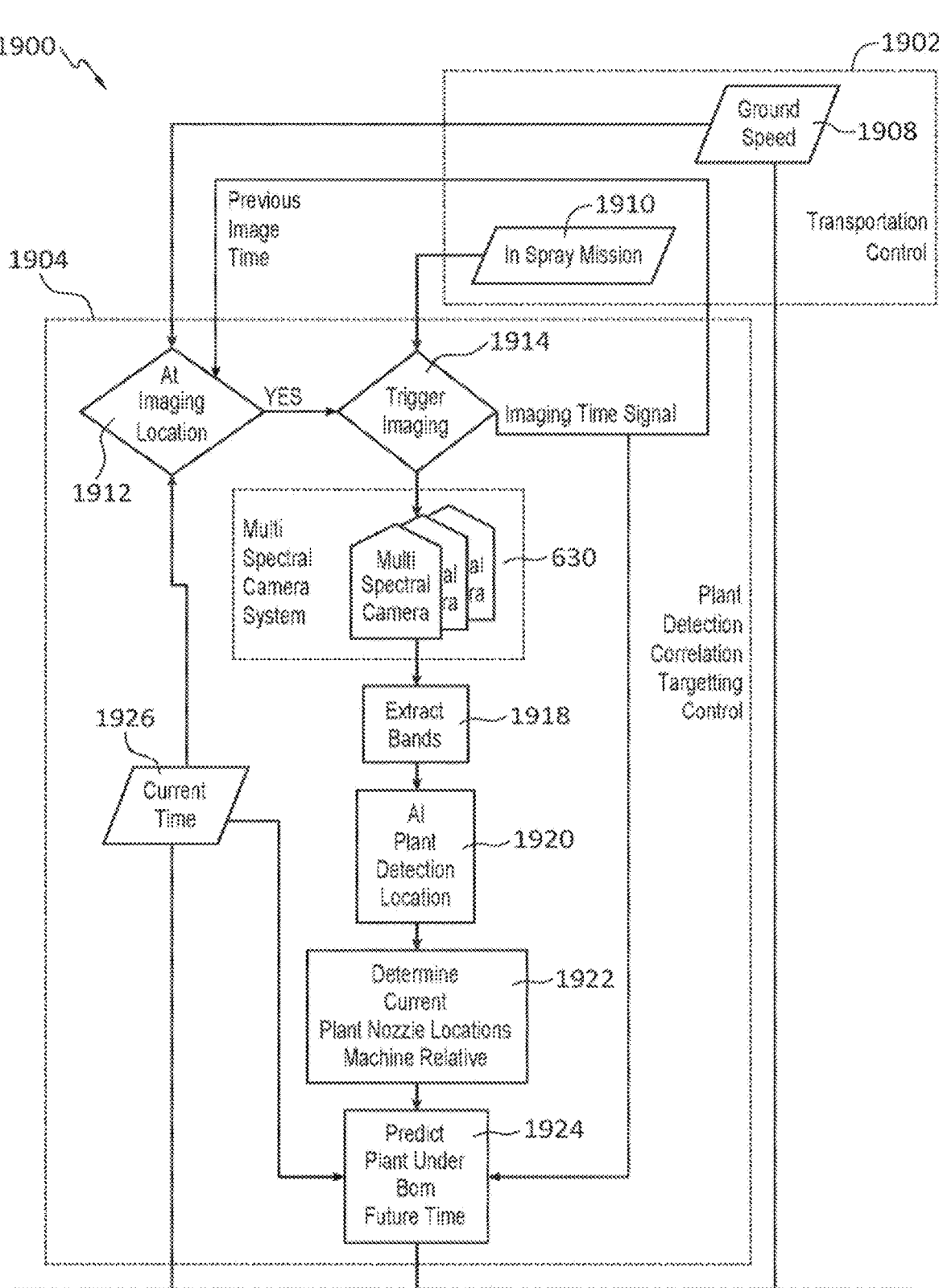
FIG. 19A is a close up view of the content on the top of FIG. 19.
Figure 19B:
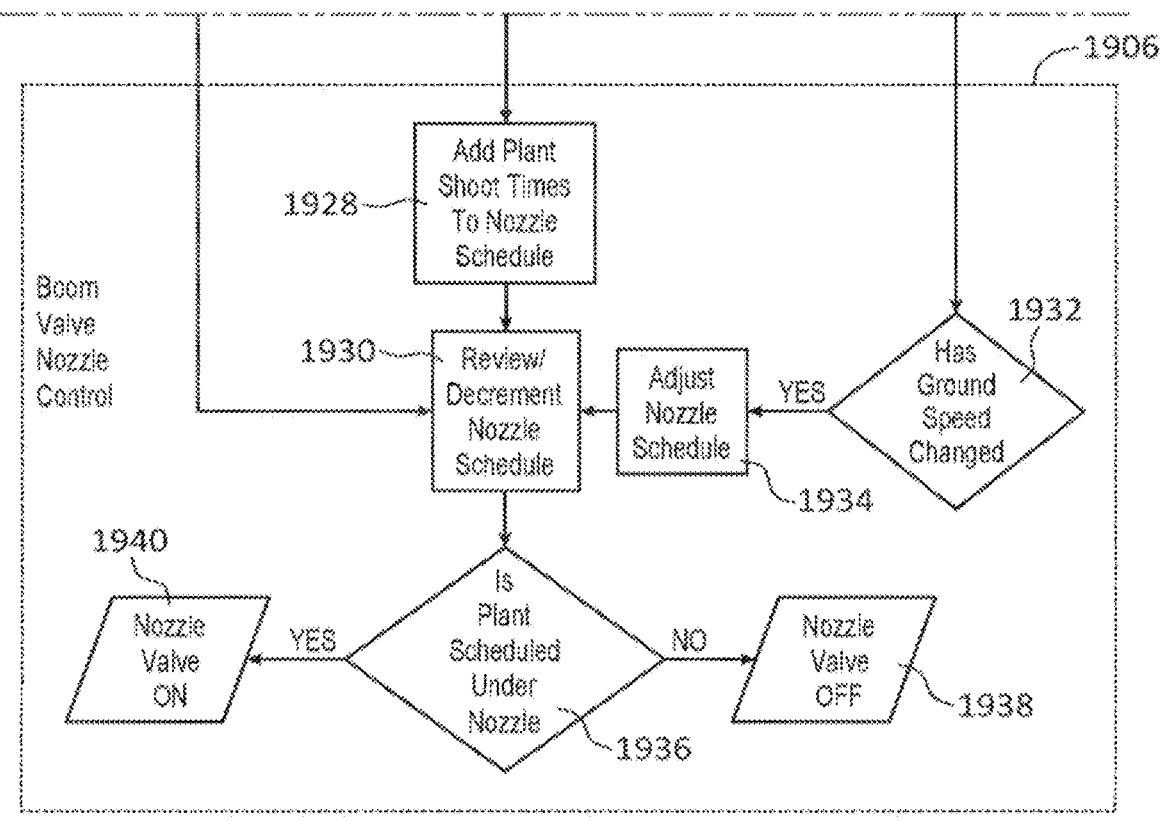
FIG. 19B is a close up view of the content on the bottom of FIG. 19.

FIGS. 19, 19A and 19B present a process 1900 generally executing on the electronic system 1300 for the rolling drone

1200. The process 1900 may generally comprise a transportation control 1902, a plant detection correlation targeting control 1904, and/or a boom valve nozzle control 1906. The transportation control 1902 may receive or calculate a ground speed 1908 of the rolling drone 1200 and may execute a spray mission 1910.

If a spray missions 1910 has been executed, the targeting control 1904 may determine if the rolling drone 1200 is at an imaging location 1912. If the rolling drone 1200 is at the imaging location 1912 and if the spray mission 1910 has been executed, then an imaging process 1914 is triggered. The imaging process 1914 triggers a multispectral camera system 630, comprising one or more multispectral cameras, to capture image data.

When the image data has been captured, an extraction process 1918 may extract one or more frequency bands from the image data. A plant or pest detection location AI process 1920 may process the one or more frequency bands to determine a location of the plants. In another aspect, one or more geometric shapes of the pests may be used to determine a pest type. A combination of the frequency bands and the geometric shape identification may be used to further improve the determination of the pest type.

A current position of the nozzles 520 may be determined by process 1922 relative to the location of the rolling drone 1200. A predictive process 1924 may then predict, based on a current time 1926, a predicted time when the plant or pest will be under the nozzles 520.

The nozzle control 1906 may then add the predicted time to a nozzle schedule 1928. A nozzle scheduler process 1930 may receive the nozzle schedule 1928, the current time 1926, and any changes in the ground speed 1932. If the ground speed 1932 has changed, then the nozzle schedule 1928 may be adjusted at step 1934. If the current time 1926 has reached the predicted time on the nozzle schedule 1928 at step 1936, then the nozzle valve may be turned on at step 1940. If the current time 1926 has not reached the predicted time on the nozzle schedule 1928 at step 1936, then the nozzle valve may be turned off at step 1938.

Figure 20:
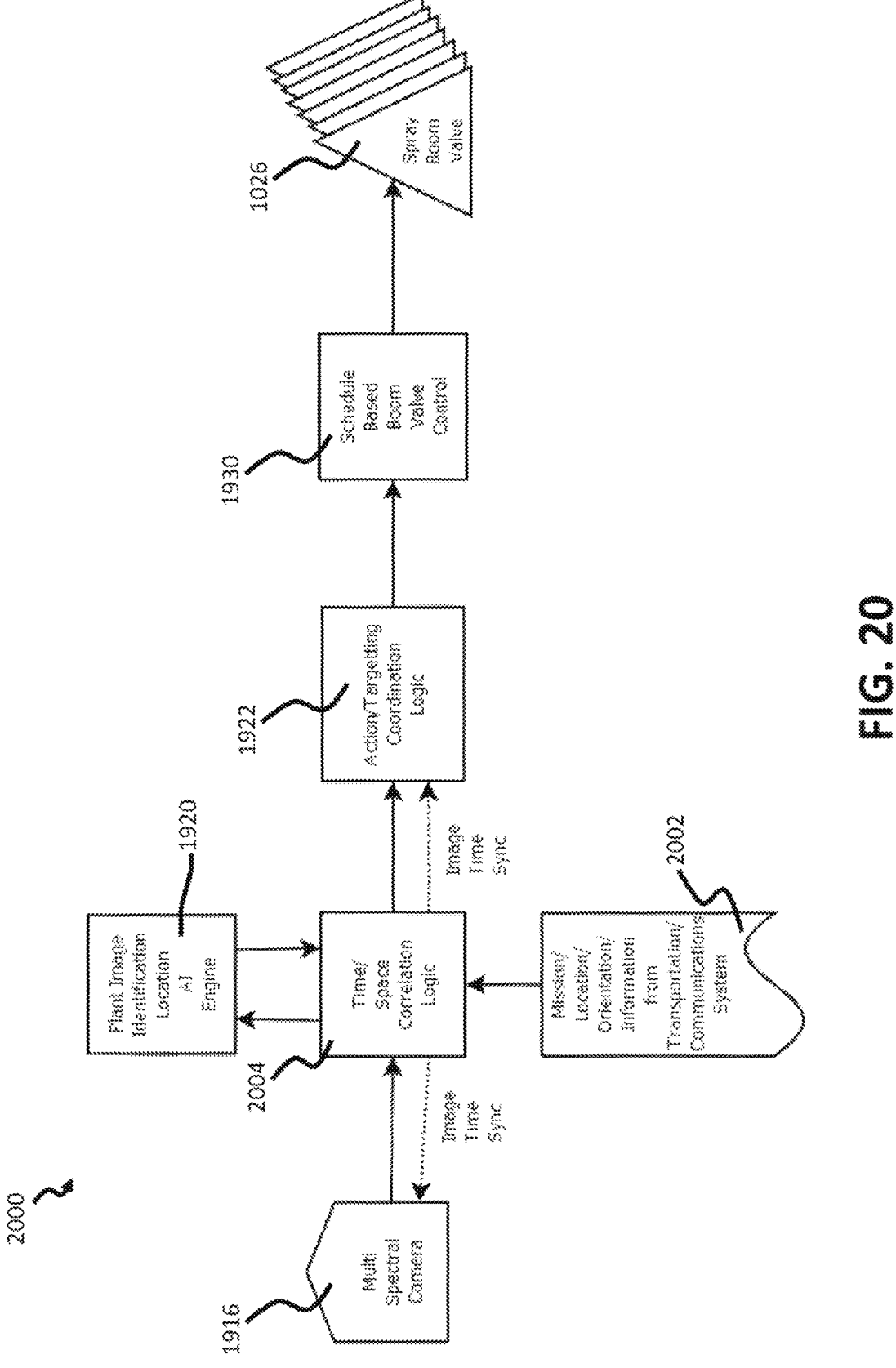
FIG. 20 is a process flow diagram for a sprayer system of the rolling drone.

FIG. 20 present a time coordination process flow 2000 for the sprayer system of the rolling drone 1200. A mission, location, orientation, information from transportation, and/or communication system 2002 may provide data to a time/space correlation process 2004. The time/space correlation process 2004 may work with the plant or pest identification location AI engine 1920 and may transmit an image time synchronization signal to the multispectral camera 630 and an action/targeting coordination process 1922. The action/targeting coordination process 1922 may then instruct the schedule based boom valve control 1930 to either turn on the spray boom valve 1126 or turn off the spray boom valve 1126.

Figure 21:
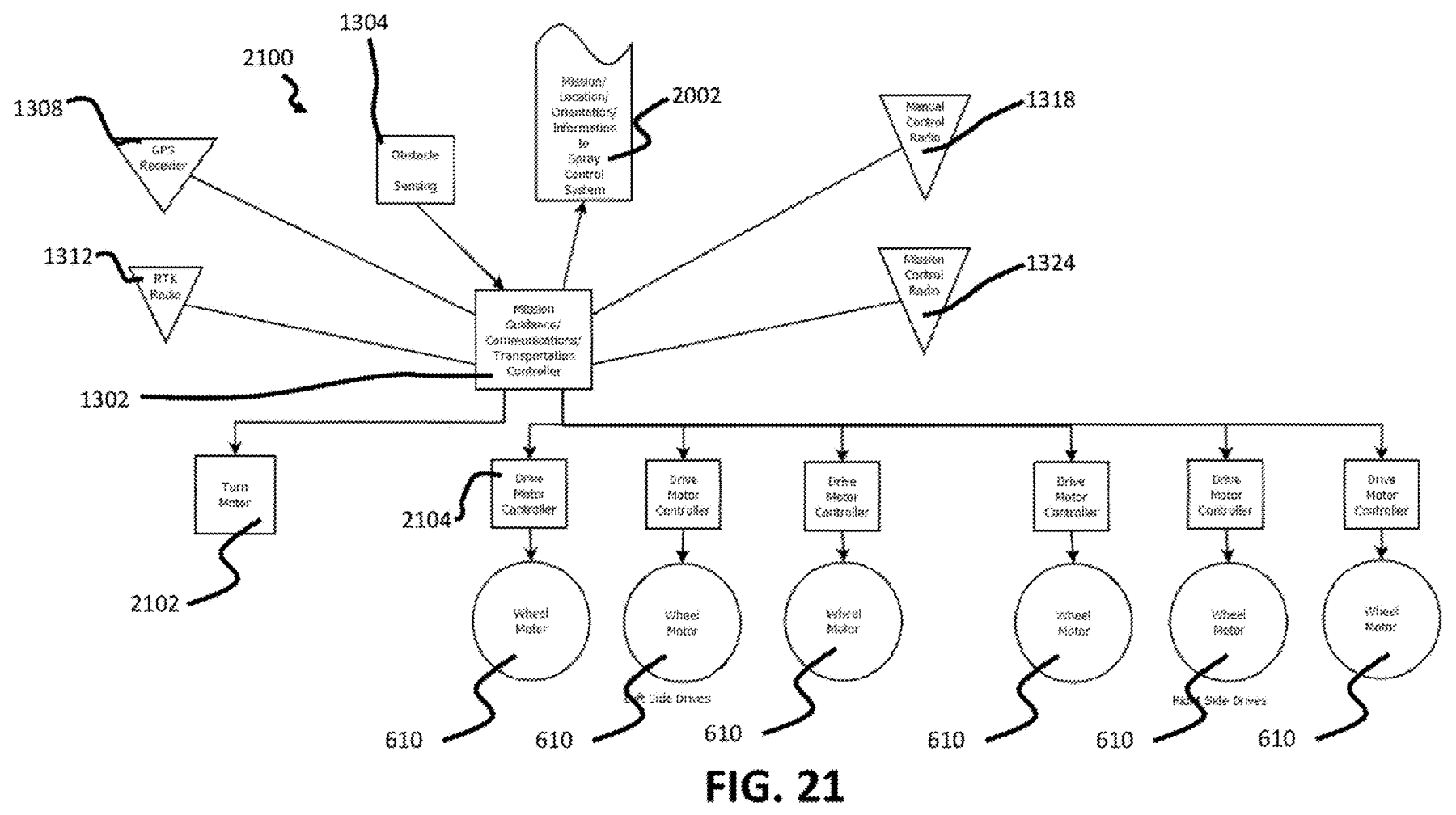

FIG. 21 shows a steering system 2100 for the rolling drone 1200. Many of the components for performing a steering action have been previously described with reference to FIG. 13 and will not be repeated here. Each of the wheels 1206 and wheel motors 610 may be independently controlled by a drive motor controller 2104 that may rotate the wheels 1206 in a forward or a reverse direction. When the controller 1302 encounters a need to turn the rolling drone 1200, such as to avoid an obstacle, the controller 1302 activates a turn motor 2102 in order to adjust an orientation of the wheels 1206. In another aspect, the controller 1302 may instruct the wheels 1206 on the left side of the rolling drone 1200 to be driven in an opposite direction than the wheels 1206 on the right side of the rolling drone 1200 in order to effect an in-place rotation of the rolling drone 1200.

Figure 22A:
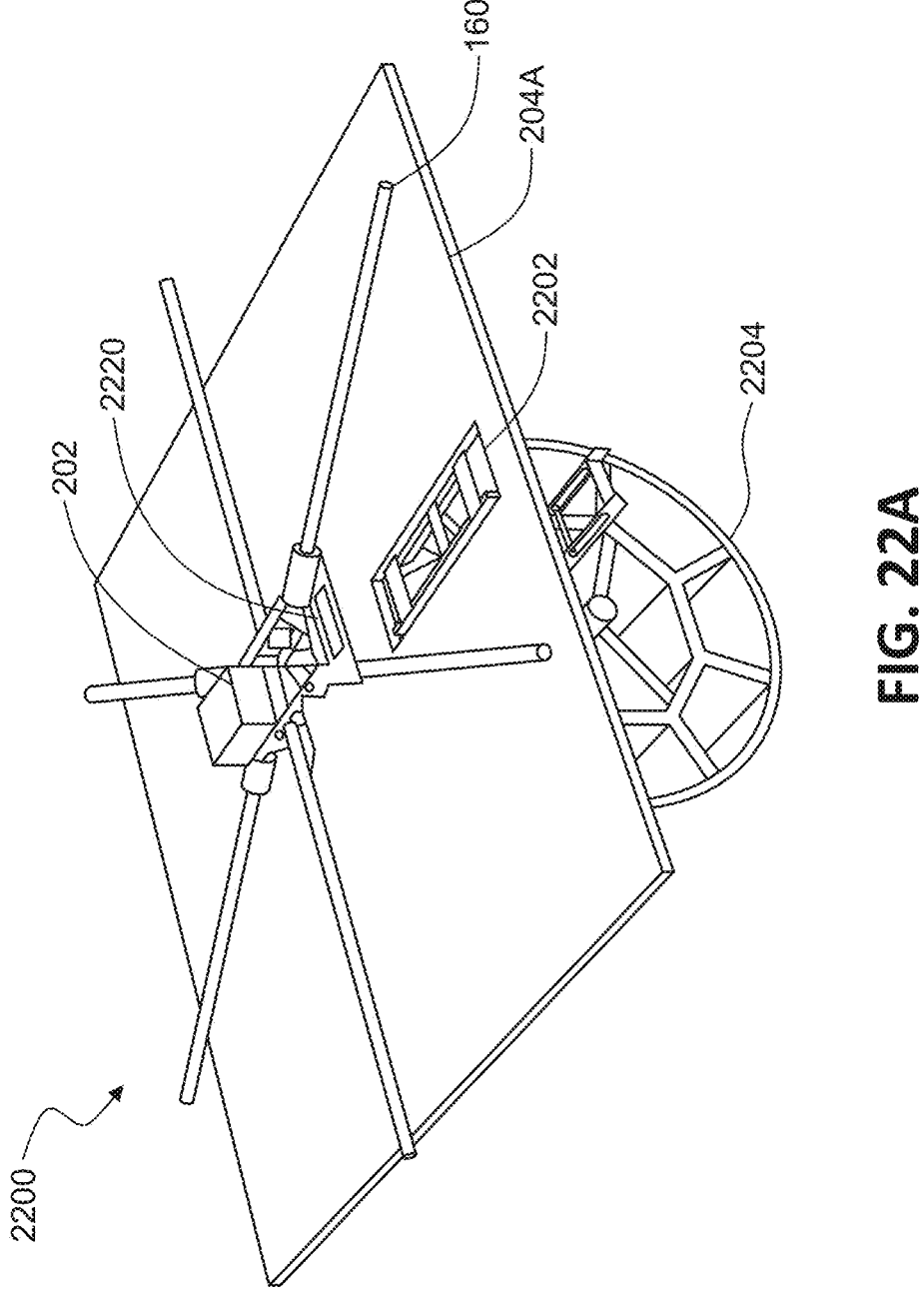
FIG. 22A is a perspective front view photograph of an example of an aerial drone and a base station.
Figure 22B:
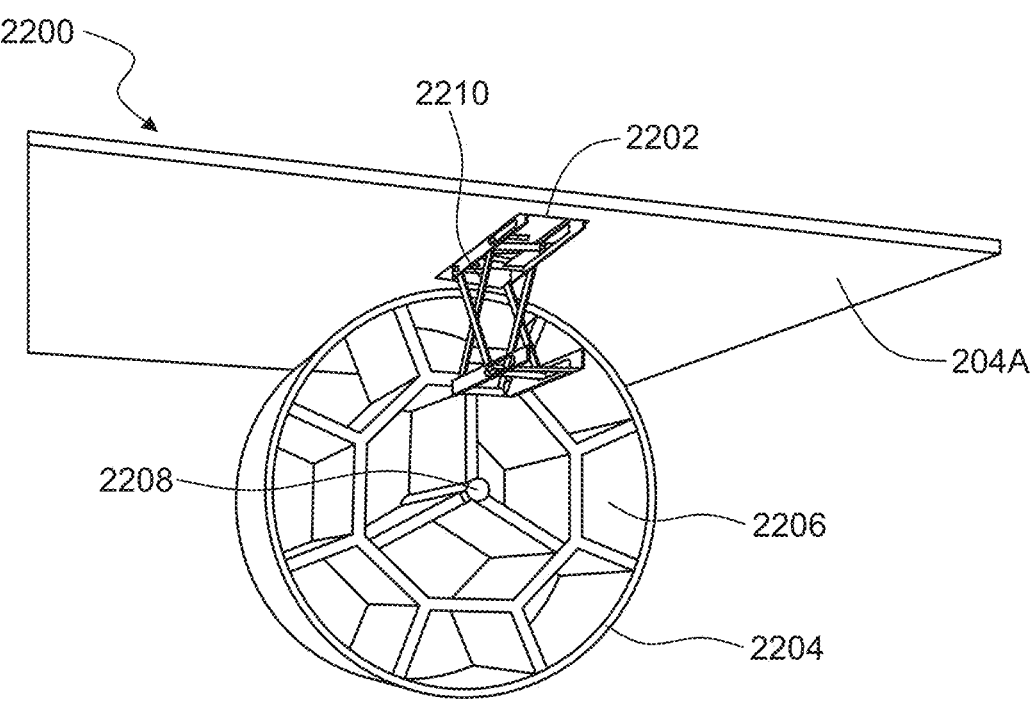
FIG. 22B is a front view photograph of a battery refill system of the base station.
Figure 22C:
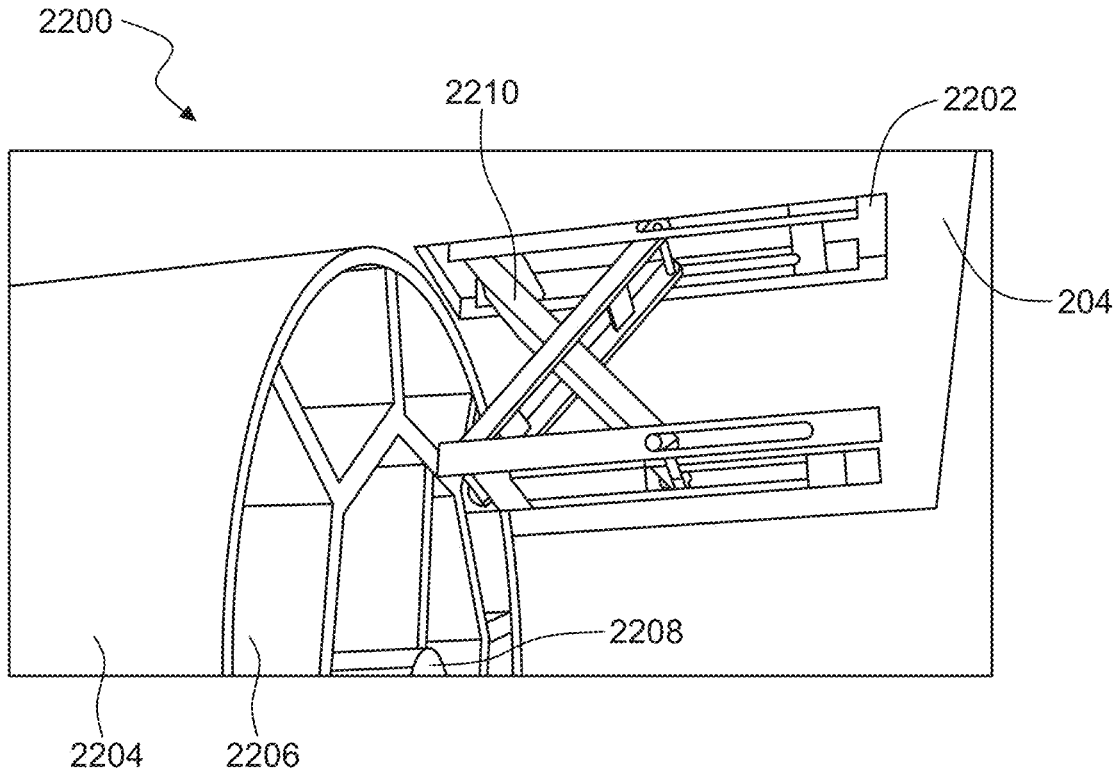
FIG. 22C is a perspective side view photograph of the battery refill system of the base station.

Another aspect shown in FIGS. 22A to 22C, an example aerial drone 202 has landed on a platform 204A of the base station 204. In FIGS. 22A to 22C, the propellers 620 and the ends of the frame 1604 of the aerial drone 202 have been removed for clarity. A battery receiver 2220 may be aligned with a hole 2202 through the platform 204A of the base station 204. The platform 204A may have a number of V-shaped or QR code guides (not shown) may be captured by the camera of the drone 202 in order for the drone to orient itself with respect to the platform 204A.

Shown particularly in FIGS. 22B and 22C, beneath the platform 204A may be a generally cylindrical battery storage 2204. Other aspects may have a differently shaped battery storage 2204, such as a swivel arm or a lower-profile conveyor. The cylindrical battery storage 2204 may rotate about a central hub 2208 using an electric motor. Each of the storage compartments 2206 may receive the batteries (not shown) and may have an induction charger (not shown) or a contact charger (not shown) for charging the batteries. The base station controller 308 may determine which of the battery compartments 2206 has a battery that is the most charged. This battery compartment 2206 may be aligned with a scissor lift 2210 that retrieves the battery from the battery compartment 2206 and raises the battery to be deposited in the battery receiver 2220 of the drone 202. Alternatively, the battery storage may be replaced by an in-place charger which may charge through an umbilical line and/or through contact with conductive plates or contacts contained in the landing gear or elsewhere on the drone 202, which may drive current through the plates to recharge the batteries.

Figure 22D:
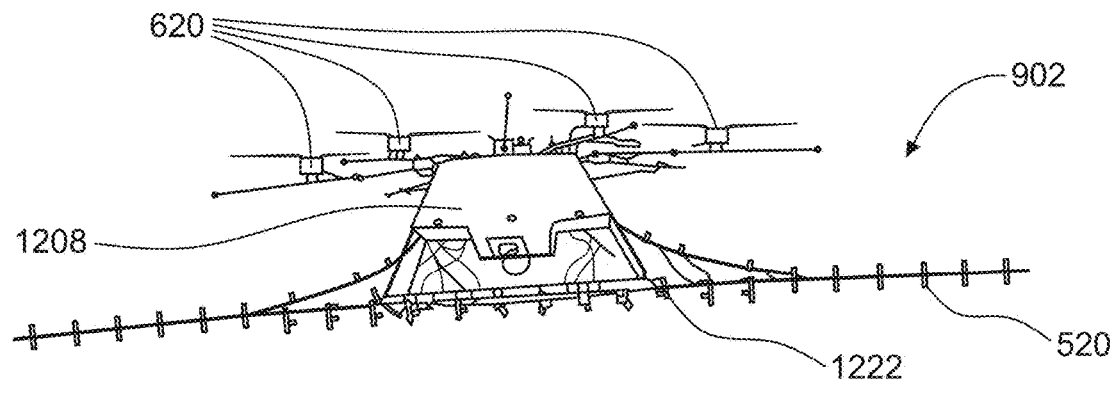
FIG. 22D is a front view photograph of an aerial drone.

Turning to FIG. 22D, another configuration for an aerial drone 902 is demonstrated. In this aspect, the aerial drone 902 comprises six or more propellers 620 above a housing 1208, and a horizontal spray boom 1222 located below the housing 1208. The horizontal spray boom 1222 may comprise between 12 and 24 spray nozzles 520, each controlled individually with their respective valves. In this aspect, the number of spray nozzles 520 is 24.

Figure 22E:
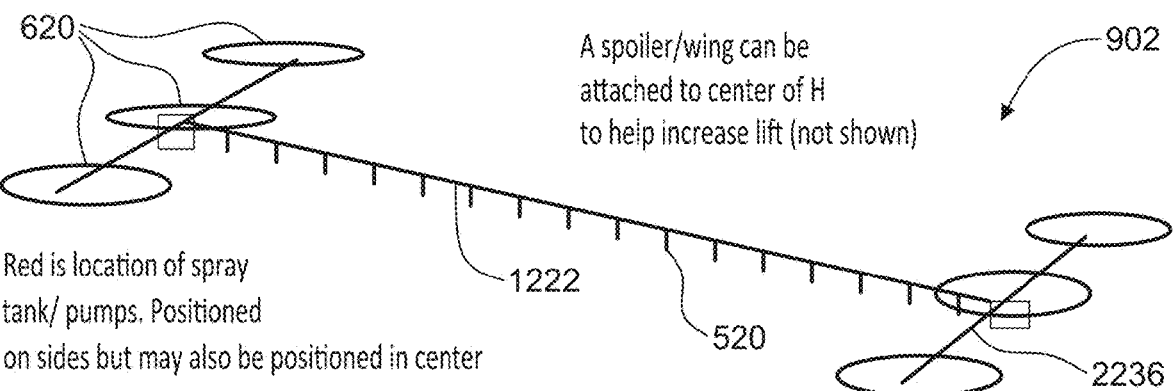
FIG. 22E is a perspective view of another configuration for an aerial drone.

Turning to FIG. 22E, yet another configuration for an aerial drone 902 is demonstrated. In this aspect, a centrally located horizontal spray boom 1222 may be coupled at each end to an propeller arm 2236 resembling an extended H-configuration when viewed from the top view. Each of the propeller arms may comprise one or more propellers 620. One or more wings and/or spoilers (not shown) may be included to ensure lift over the center section when travelling in a forward direction. In this aspect, each propeller arm 2236 is coupled to three propellers 620 for a total of six propellers 620. In this confirmation, the effect of downwash from the propeller blades on the spray nozzles 520 may be reduced or eliminated. In this aspect, the spray boom 1222 may have up to 32 spray nozzles 520.

Figure 23:
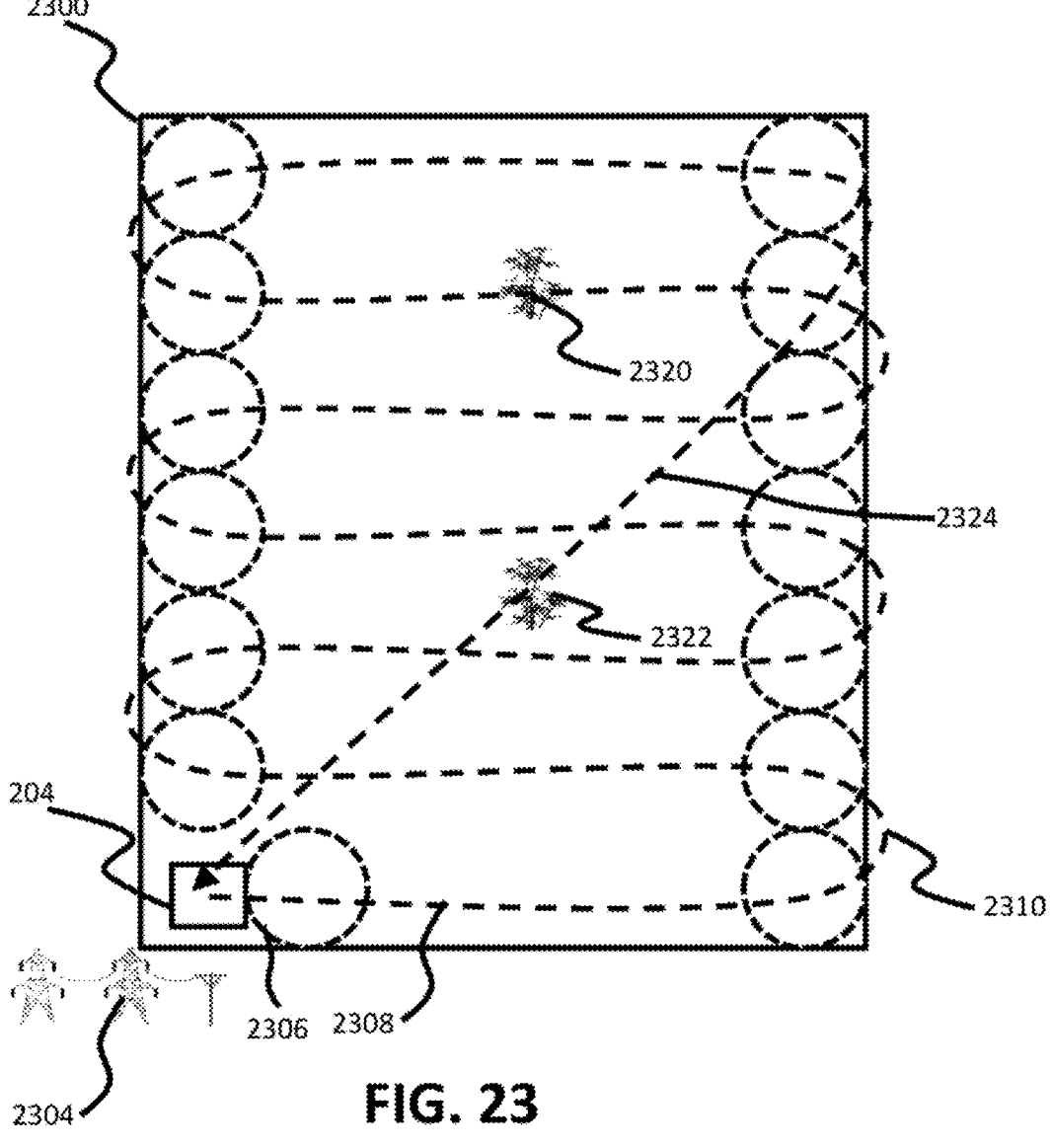
FIG. 23 is a top view of an operating environment (e.g. field) for the aerial drone.

Turning to FIG. 23, an example field 2300 is shown with the base station 204 located proximate to an edge or corner of the field 2300. The base station 204 may comprise a charger 624 supplied with electrical power 2304 and/or a fuel storage and/or spray storage. When the aerial drone 902 lands at the base station 204, the base station 204 may automatically begin charging the battery 508 using the charger 624. In another aspect, the base station 204 may automatically swap the dead battery 508 with a fresh battery as previously described. The base station 204 may also have a receiver for receiver data from the aerial drone 902.

The navigation system 608 of the aerial drone 902 may determine a flight path 2308 based, in part, on field data provided. For example, artificial intelligence framework 1920 may determine a crop geometry (e.g. row direction, spacing, width, etc.) and/or use computer vision to identify obstacles and/or may be supplemented by Geographic Information Systems (GIS) boundaries available from one or more public or private databases. The AI framework 1920 may interpret and process one or more of: (a) manual human input by drawing interior and exterior boundaries on a map of the area, and converting to GPS coordinates, (b) artificial intelligence detecting exterior and interior boundaries (e.g. based on crop orientation and geometry, spectral signatures of plant/dirt/non-organics, etc.), and/or (c) existing survey maps (either government or privately owned). The navigation system 608 may determine an optimal field of view 2306 based on one or more lens and camera parameters in combination with an altitude of the aerial drone 902. For example, the field of view 2306 increases when the aerial drone 902 increases altitude but the image quality may degrade at higher altitudes. The navigation system 608 may determine the altitude where the image quality is sufficient in order to detect weeds 2320, 2322 present in the field 2300. The image quality sufficient to detect weeds 2320, 2322 may be determined, at least in part, by an estimated size of weed based on growing conditions, a resolution of the camera(s) 630, and/or weather conditions (e.g. a windy day may require slightly lower altitudes for an improved resolution). In other aspects, an optimal altitude may be determined at least in part by a canopy size, and/or one or more lighting conditions, such as determined by weather (e.g. cloudy vs sunny, foggy, rainy, etc.). In this aspect, the field of view may generally be a 12-ft by 12-ft area.

Once the field of view 2306 has been determined, the navigation system 608 may determine a number of passes necessary to pass at least once over the entire field 2300. In this example, the path 2308 passes back and forth over the field 2300 seven times. If the field of view 2306 were reduced (by reducing altitude), the number of passes would increase. If the field of view 2306 were increased (by increasing altitude), the number of passes would decrease. The navigation system 608 may dynamically construct the path 2308 to survey the entire field 2300 using one or more boundary detection techniques. For example, if most of the field 2300 is in a specific color space (e.g. "green" for plants and "black" for dirt), the AI framework 1030 may determine a geometrically significant feature in another color space (e.g. "gray" for gravel road, or "blue" for pond, or "red" for tractor). The geometrically significant feature may form a boundary.

While the aerial drone 902 is passing over the field 2300, the processor 602 may be processing image data from the cameras 806 using an artificial intelligence (AI) framework 1030 such as described herein in order to detect weeds 2320, 2322 and/or areas of undesirable growth and flag a weed area as a treatment area. When the processor 902 determines a weed 2320 is located on the planned path 2308, the navigation system 608 may be instructed to land or lower or hover the aerial drone 902 within spraying (or treatment distance) once the aerial drone 902 reaches that point on the planned path 2308. In another example, when the processor 902 determines a weed 2322 is not located on the planned path 2308, the navigation system 608 may be instructed to deviate from the planned path 2308 by a certain threshold, which may be based on a proportion to row spacing and/or crop canopy size. In another aspect, the navigation system 608 may plan to land the aerial drone 902 at weeds 2322 not on the planned path 2308 during the return path 2324 to the base station 204.

In another aspect, the processor 902 may determine the location of every weed 2320, 2322 and plan a treatment path using the plant detection artificial intelligence framework 1920 as previously described. In some aspects, the processor 902 may provide one or more GPS-RTK coordinates for each weed and/or pest, which may be used by subsequent treatment system(s) to create one or more missions, plan paths, and/or trigger spray nozzles based on sensor positioning data. The AI framework 1920 may be the same or different than the AI frameworks 1030, 1332 as previously described. The plant detection artificial intelligence framework 1920 may determine the treatment path, at least in part, by an amount of pesticide required for the number and type of weeds 2320, 2322 found and/or the amount of herbicide or fungicide present in the reservoir.

The determination of the treatment path may be determined at least in part based on the battery level and spray available for a particular drone 202, 1200 to ensure that the drone 202, 1200 has enough power to return to the base station 204. When the mission exceeds either the battery capacity or spray capacity (or both), the drone 202, 1200 may execute as much of the mission as possible while ensuring the drone 202, 1200 has enough battery capacity to return to the base station 204. Once the drone 202, 1200 reaches the battery capacity necessary to return to the base station 204, the drone 202, 1200 stops treatment, records a return position, and returns to the base station 204. The drone 202, 1200 then swaps the batteries 618 and/or spray canister 302. The drone 202, 1200 returns to the return position and resumes the mission. The drone 202, 1200 may continue to repeat this process until the mission is complete. In some aspects, the treatment path may be transmitted to one or more other drones 202, 1200 in order to perform treatment on the field 2300.

In one aspect, a high-altitude survey may be performed using the camera 630 to achieve a sub-millimeter resolution, which may be fed to an online or offline AI framework 1030 to determine the pest-type and location and plan a general flight plan and/or pest location(s) for one or more drones 202. The mission planning 1004 may break the field 2300 into drone-sized squares (e.g. approximately equal to a wingspan of the drone 202 being used), and plan a flight using a Dijkstra pattern to optimally treat only the drone-sized squares containing pests. The treatment drone 1200 follows the mission. However, because of environmental factors such as wind and limiting factors such as GPS position at that small a detail, an AI framework 1920 may be present in the treatment drone 1200 where the AI framework 1920 may further refine the position for the pest treatment within the 4-inch×4-inch treatment area. In another aspect, the AI framework 1920 may be used to create one or more missions and/or one or more treatment plans and configured to output a data format for a high clearance sprayers and/or other non-drone machinery.

Figure 24:
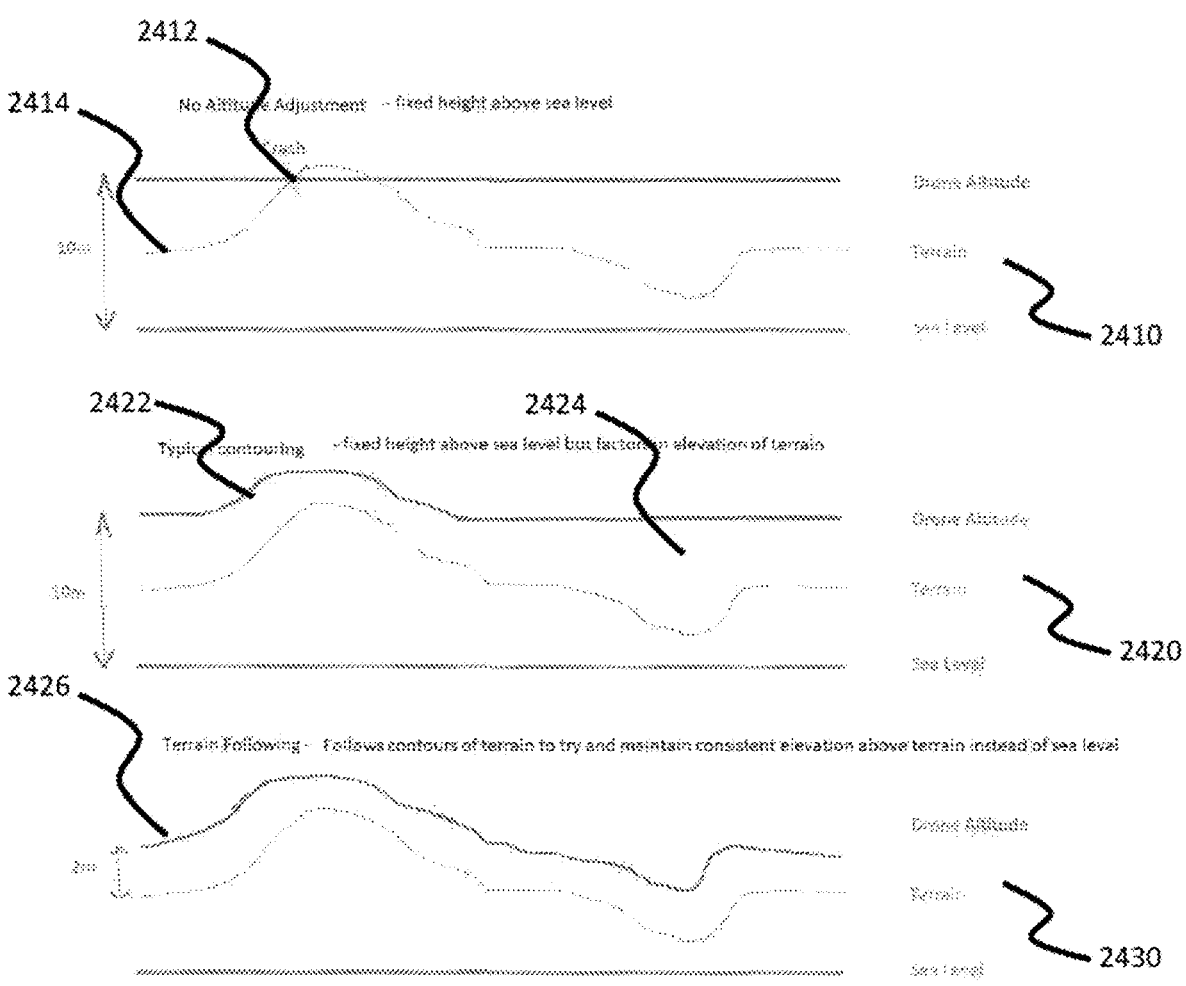
FIG. 24 is an example side view of the aerial drone following an altitude of the terrain.
Figure 25:
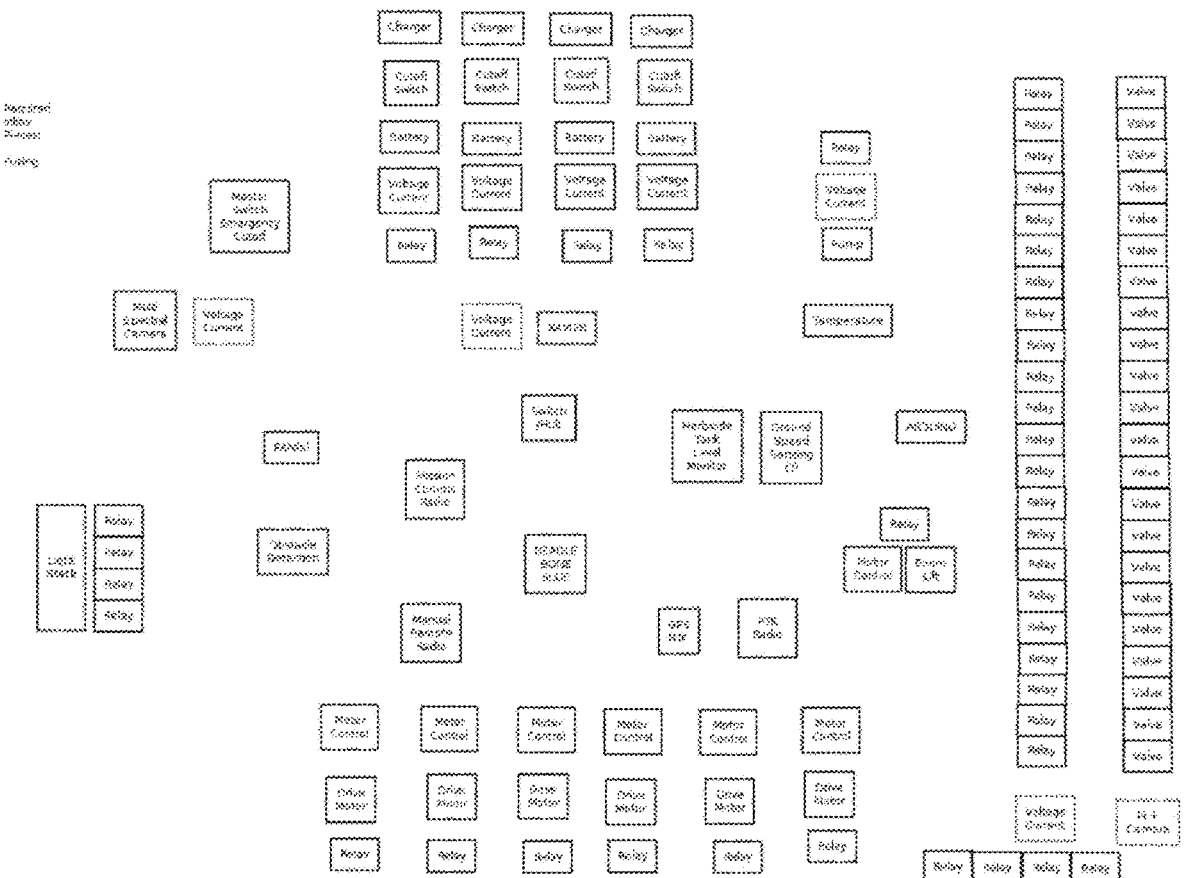
FIG. 25 is a diagram of a fuse system for the rolling treatment path for the aerial drone.
Figure 25A:
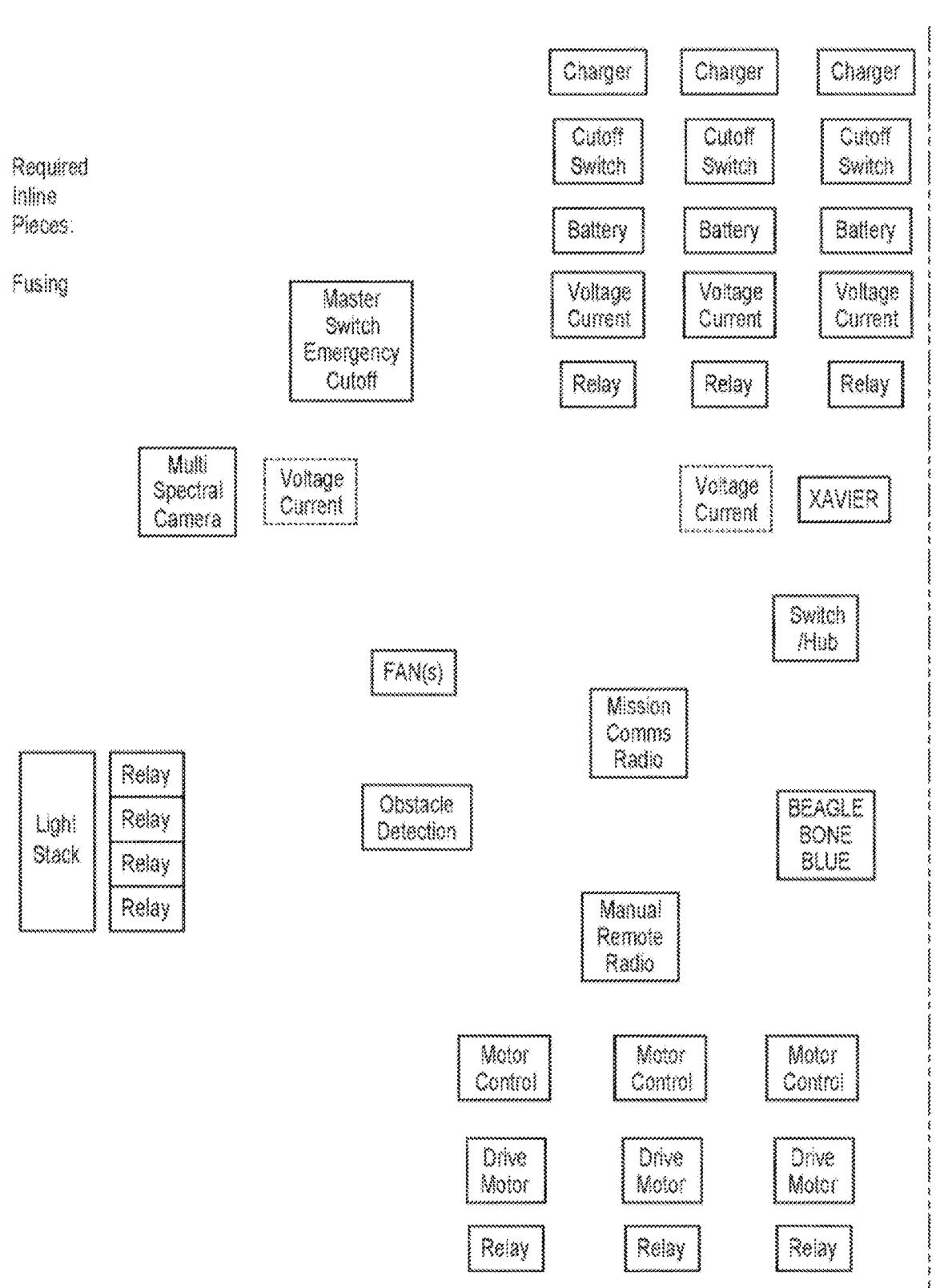
FIG. 25A is a close up view of the content on the left side of FIG. 25.
Figure 25B:
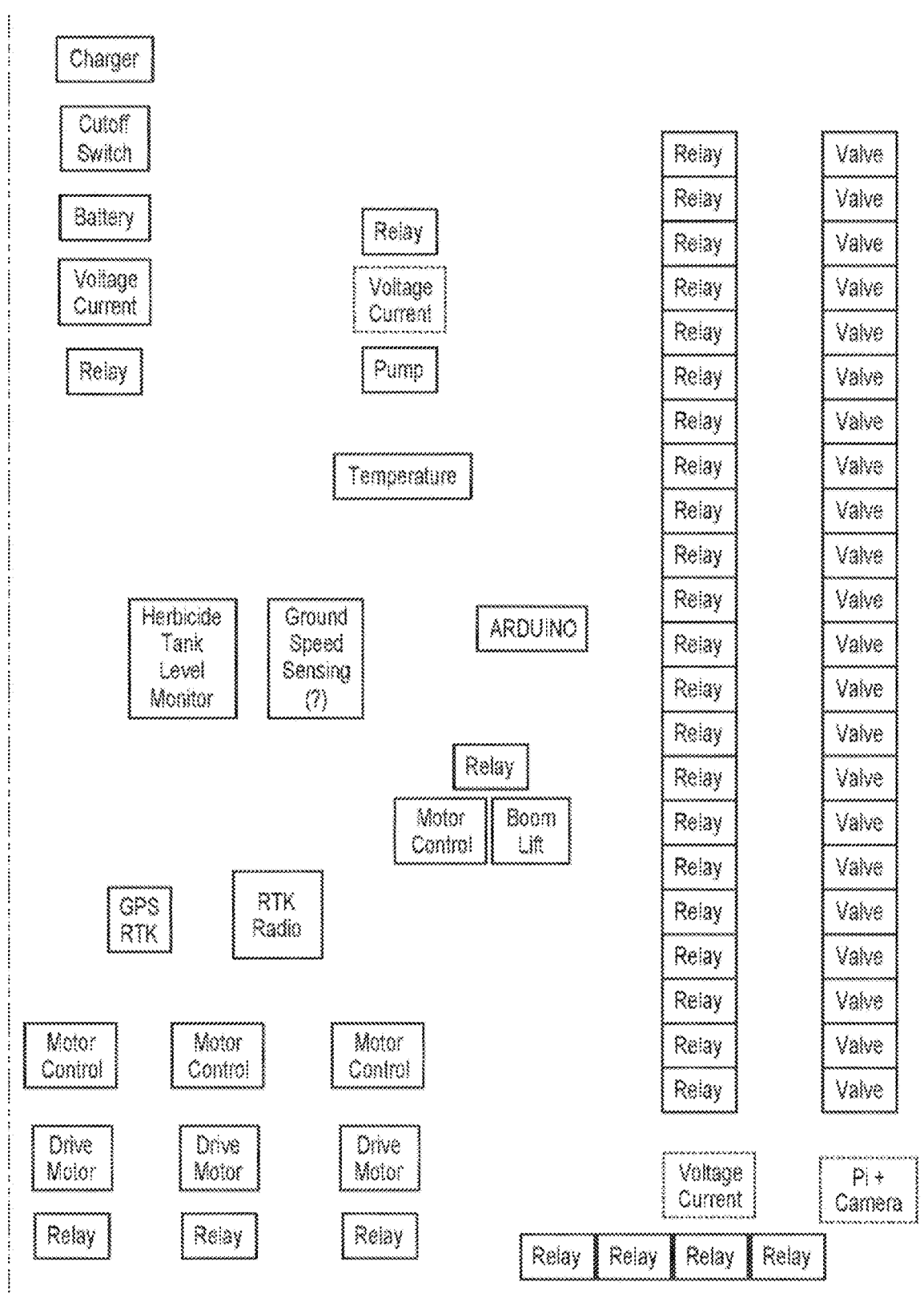
FIG. 25B is a close up view of the content on the right side of FIG. 25.
Figure 26A:
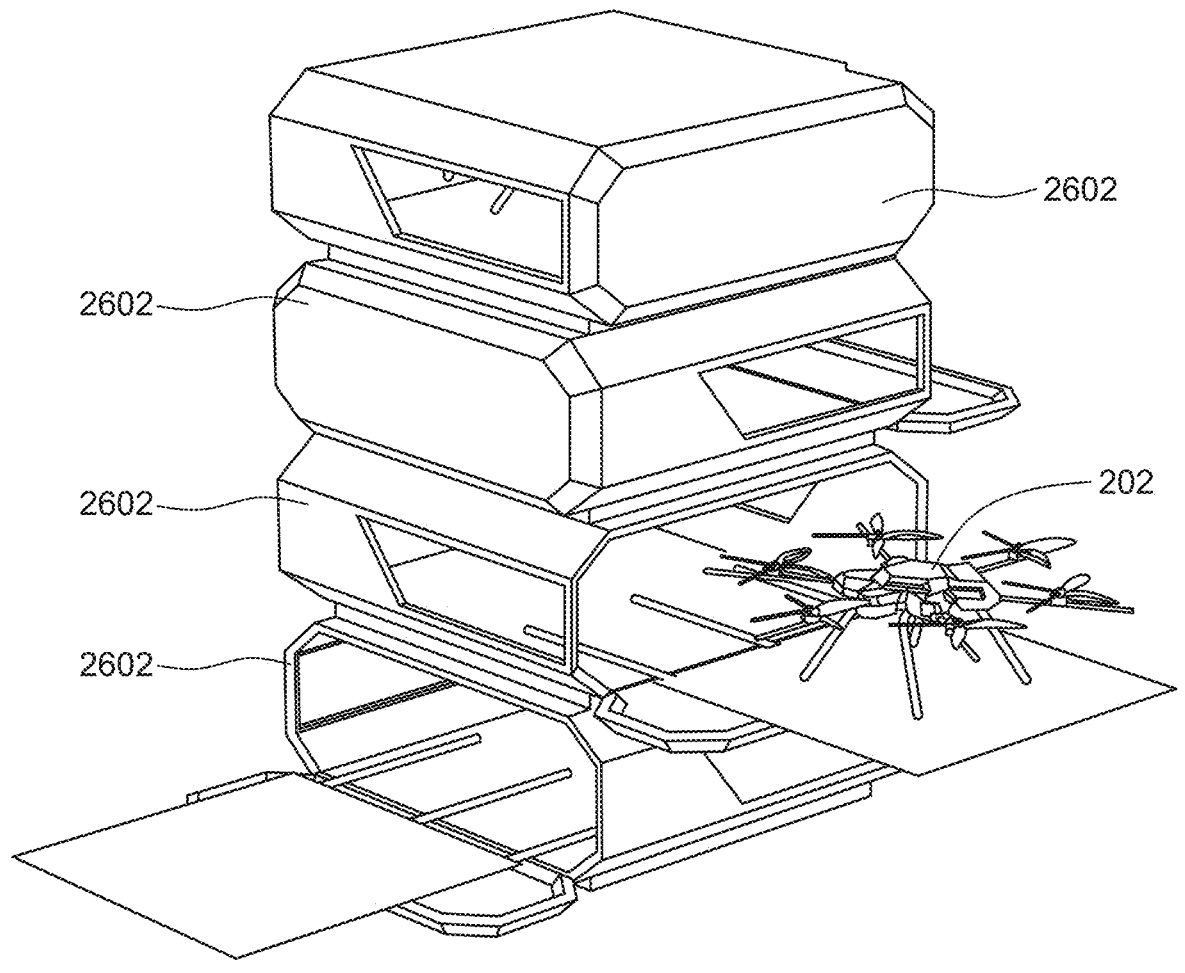
FIG. 26A is a perspective view of a storage housing having a plurality of compartments for aerial drones.
Figure 26B:
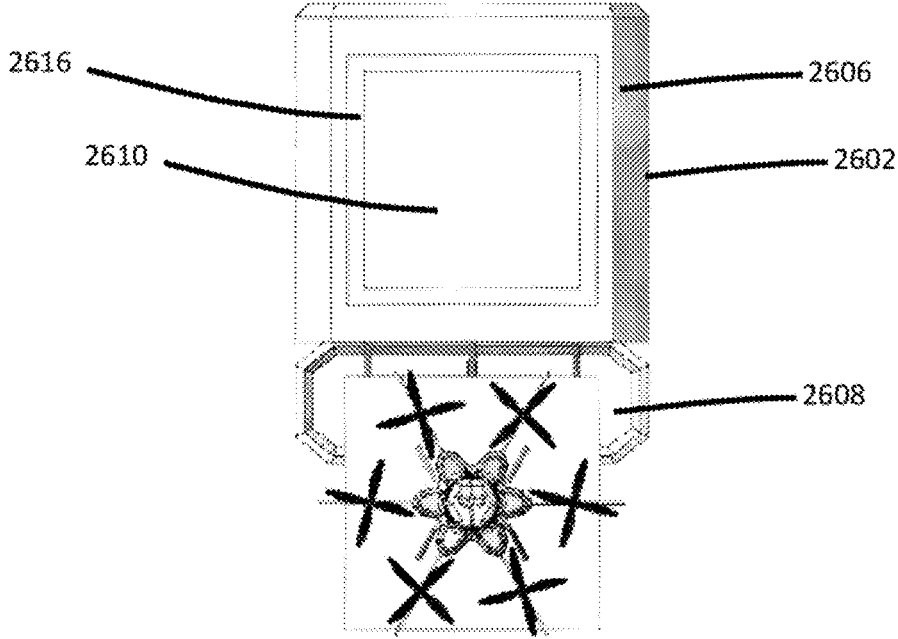
FIG. 26B is a top view of a compartment for storing an aerial drone.
Figure 26C:
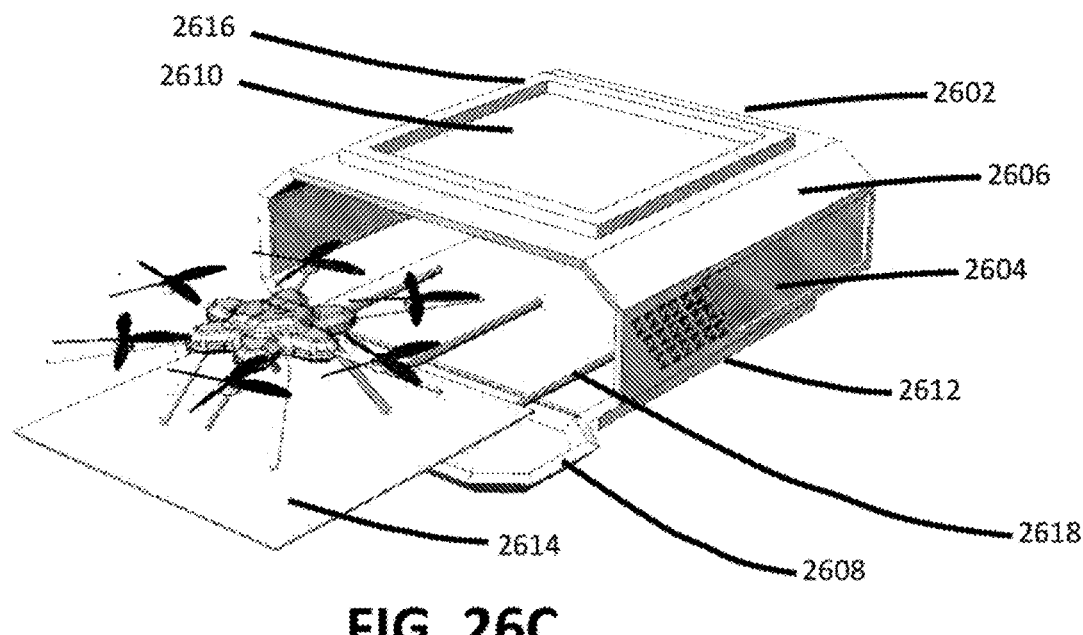
FIG. 26C is a perspective front view of the compartment for storing an aerial drone.
Figure 26D:
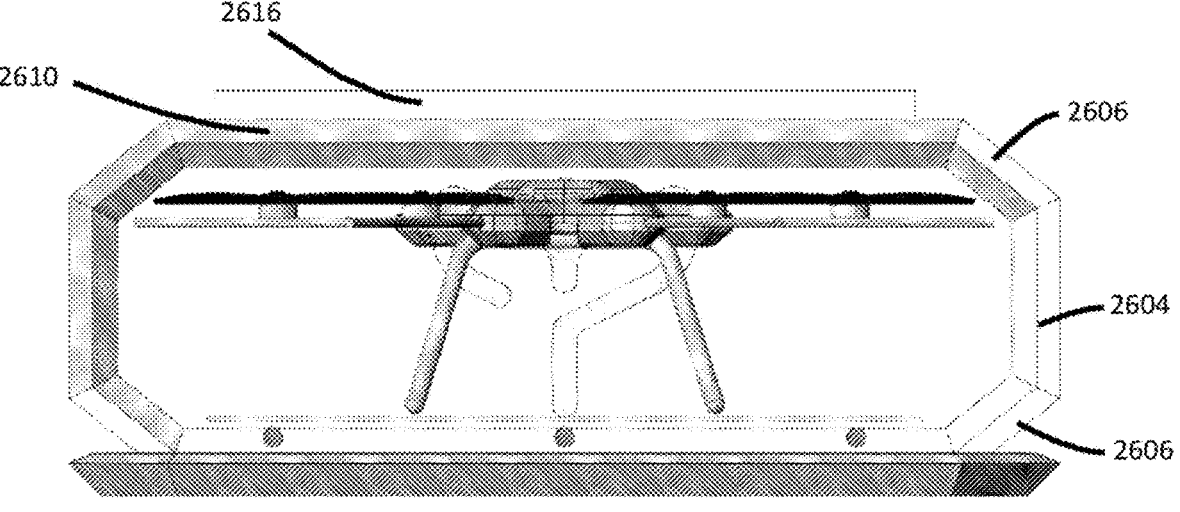
FIG. 26D is a front view of the compartment for storing an aerial drone.
Figure 26E:
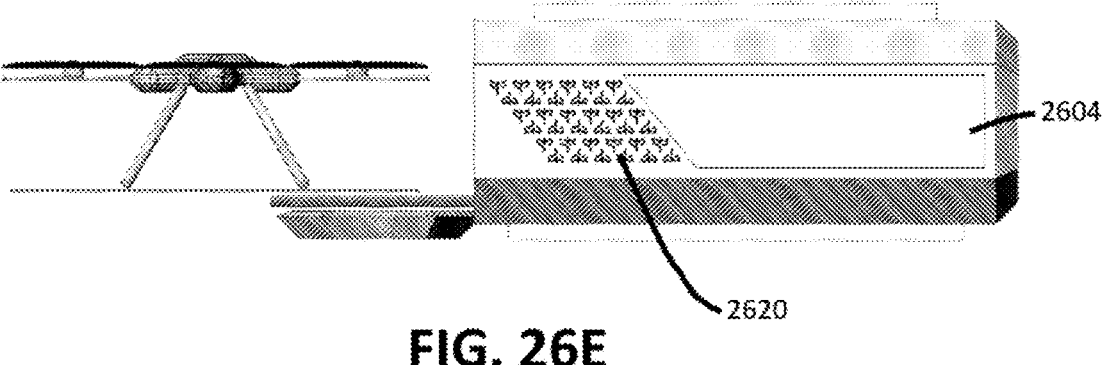
FIG. 26E is a side view of the compartment for storing and aerial drone.

Collisions may be avoided by using radar, lidar, and/or binocular imaging and computer vision as previously described. In another aspect, a height of the terrain may be determined also using radar, lidar, and/or binocular imaging and computer vision. Turning to FIG. 24, a no altitude adjustment configuration 2410 demonstrates the aerial drone 202 having a fixed flight height (e.g. 10-*m*) above sea level. In this configuration 2410, the drone 202 may crash 2412 into terrain 2414 having a flight height. In a terrain avoiding configuration 2420, the aerial drone 202 may increase the flight height when the terrain 2422 is higher than the current flight height but not reduce the flight height following the increase (such as the valley 2424). In this aspect, the aerial drone 202 assumes that surrounding terrain may have a similar maximum terrain height. A terrain following configuration 2430 may have the drone 202 follow one or more contours of the terrain to maintain a consistent elevation above the terrain rather than above sea level. The terrain following configuration 2430 may keep a consistent distance from the ground and may adjust a camera angle proportionate to the inclination/declination, such that many images appear consistent so as to minimize variance between individual images. This may be implemented with binocular cameras 806, a single camera 806 and spatial analysis techniques and/or lidar to determine a change in topography. In some aspects, similar techniques may be used to determine crop height and adjust the flight height so that the drone 202 may stay above a maximum crop height.

In some instances, the aerial drone 902 may fly outside of a boundary of the field 2300 while turning 2310. If the drone 902 deviates significantly from the field 2300, the drone 902 may compute a trajectory necessary to return the drone 902 to the mission path. If the drone 902 is unable to return to the mission path, then the drone 902 may return to the base station 204.

According to some aspects, the pest detection AI framework 1030 may be able to determine a maturity of the weed 2320, 2322. The pest detection AI framework 1030 may then prioritize weeds 2320, 2322 that are approaching seed maturity in order to eliminate 99% of weeds within the field 2300 prior to seed maturity. The AI framework 1030 may track identified weeds 2320, 2322 in order to track a growth progress of the weed 2320, 2322 in order to determine an optimal treatment time to reduce herbicide use. The tracking of identified weeds 2320, 2322 may be based at least on phenotype. For example, some small weeds may optimally be destroyed early in order to minimize seeding, while other weeds may be permitted to grow to a size where the weed may absorb more of the herbicide.

Turning to FIGS. 26A to 26E, the base station 204 may comprise a plurality of compartments 2602. The compartments 2602 comprise a generally square shape when viewed from above having three closed sides 2604 and one side configured to open. The sides 2604 may be coupled to a top 2610 and a bottom 2612 of the compartment 2602 via one or more angular support members 2606. The three closed sides 2604 may comprise one or more ventilation holes 2620 to facilitate air flow through the compartment 2602. In some aspects, these storage trays may comprise a battery swap system, a battery recharge system, and/or the refilling system. In some aspects, the onboard data may be transferred via a cable, Wi-Fi, and/or Bluetooth while the drone 202 is within the compartments 2602.

The side configured to open may have a hinged door 2608 that may open when the drone 202 becomes activated within the compartment 2602 and/or approaches the compartment 2602 if the drone 202 is currently on a mission. The hinged door 2608 may be spring loaded to remain shut until a sliding tray 2614 pushes the door 2608 open. The sliding tray 2614 receives the landing drone 202. Each sliding tray 2614 may comprise one or more tracks 2618 or belts 2618 for horizontally sliding the tray 2614 with respect to the compartment 2602. Each compartment 2602 has a height slightly larger than the height of the drone 202 stored therein. The top 2610 may comprise a frame 2616 to facilitate attachment to the bottom 2612 of the compartment 2602 above. In the aspect presented in FIG. 26A, the base station 204 comprises four compartments 2602 with each of the compartments 2602 having an opening pointing in a different direction.

In other aspects, only the bottom 2612 of the compartment 2602 may be present and the bottom 2612 of the compartment 2602 above may serve as the top 2610 of the compartment below 2602. In such a configuration, a top 2610 may be affixed to the uppermost compartment 2602. In other aspects, the uppermost compartment 2602 may be left open and one or more weather monitoring and/or communication modules may be placed therein.

Although the aspects described herein demonstrate the detection of pests and ignore non-pests (e.g. such as crop, bushes, physical objects like a cans, rocks, etc. lying on the field surface), other aspects may detect the crop and treat all non-crop areas as undesirable. In this aspect, some or all non-crop areas may be treated. In the first aspect, the detection of pests may be useful for treatment after seeding where only the pests are treated. In the other aspect, the non-crop areas may be treated in a burn-down phase with a fast-moving vehicle that sprays anything between crop rows indiscriminately, which may be more energy and/or time efficient with a less computational power requirement.

In some aspects, the treatment system 200 may be configured to travel along a road or railroad in order to treat growth along the road or railroad.

In another aspect, pests and crop plants may be determined by way of a chemical signature in addition to spectral signature and/or geometer. For example, the chemical signature may be a flowering plant emitting a particular pollen, which may be detected optically based on environment, such as a yellowing of the nearby dirt, and/or using a separate chemical sensor. In another example, an acoustic signature may comprise using a resonant frequency of the plant and/or the pest to stimulate a detectable phenomenon, such as using sound waves of a specific frequency to repel or attract insects/pests to where the pest may be observed by the camera(s) 630 as described herein.

According to the aspects herein, the aerial drone 100 may perform spraying of the weeds 2320, 2322. In other aspects, the aerial drone 902 may instruct a ground-based drone 904 to navigate to the weed positions for eradication.

Although the aspects described herein demonstrate the refilling system 300 for the canisters 302, other aspects may have canisters 302 that may be self-contained canisters that are merely swapped at the base station 204.

Although the aspects herein describe features particular to the aerial drone 202, other aspects may equally apply to the rolling drone 1200 and vice-versa consistent with the understanding of one of skill in the art on reviewing the description herein.

Although the aspects described herein demonstrate the drones 202, 1200 returning to a stationary base station 204, other aspects may have the drones 202, 1200 returning to a mobile base station 204. In some aspects, the mobile base station 204 may be the rolling drone 1200 and the aerial drones 202 may return to the rolling drone 1200.

Although the aspects described herein demonstrate the aerial drone 202 having a camera 806 and a spraying system, other aspects may have smaller aerial drones 202 with only a camera 806 in order to reduce the amount of propeller wash.

As described in further detail herein, various aspects of the treatment systems 200 may include capabilities for automatic target detection, selection, prioritization, deselection, re-selection, active stabilization, automatic spray vector solutions, target tagging, and/or continuous or intermittent target tracking.

Although the steps of detecting multiple objects, identifying and verifying and prioritizing multiple targets, calculating multiple spray vectors, determining the success of multiple sprays and using the spray success determinations as an input to subsequent spray vector calculations may be shown as single systems or subsystems. One skilled in the art will understand that these systems, subsystems or portions thereof, can be combined, used in a different sequence than shown here, simplified and in some cases omitted to achieve a less complex and less resource intensive design.

Various components, subcomponents and parts can be used to achieve, implement and practice the processes, computations, techniques, steps, means and purposes described herein. The embodiments and inventions contained herein may be practiced in various forms and approaches as selected by one skilled in the art. For example, these processes, computations, techniques, steps, means and purposes described herein may be achieved and implemented in hardware, software, firmware or a combination thereof. The drone systems described herein may be contained in a single drone or may be distributed within and across multiple drones and base stations in communication with one another and in any combination. The computing components and processes described herein can be distributed across a fixed or mobile network or both at the same time or different times. For example, some processing may be performed in one location using a first processor while other processing may be performed by another processor remote from the first processor. Other components of computer system may be similarly distributed. As such, computer system may be interpreted as a distributed computing system that performs processing in multiple locations. In some instances, computer system may be interpreted as a single computing device. A drone system described herein may switch back and forth from execution as a self-contained data and computational drone system or part of a distributed computational and data drone system.

One skilled in the art may choose hardware implementations for the processing units using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

One skilled in the art may choose implementations including hardware, software, scripting languages, firmware, middleware, microcode, hardware description languages, and/or any combination thereof. Software, firmware, middleware, scripting language, and/or microcode implementations may have the program code or code segments to perform the necessary tasks stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

One skilled in the art may choose implementations including firmware and/or software utilizing modules (e.g., procedures, functions, algorithms, etc.) that perform the processes described herein. Any machine-readable medium tangibly embodying instructions may be used in implementing the processes and methodologies and techniques described herein. For example, software codes may be stored in a memory. Memory may be implemented within a processor or external to a processor. "Memory" as used herein refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

The computer systems described herein may use without limitation one or more general-purpose processors and/or one or more special-purpose processors (such as digital signal processing chips, graphics acceleration processors, video decoders, and/or the like). The computer systems described herein may use and or configure storage devices to implement any appropriate data stores, including without limitation, various file systems, database structures, database control or manipulation or optimization methodologies.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A field treatment system comprising:
at least one autonomous drone receiving at least one pesticide; the at least one autonomous drone comprises a data collection system, a navigation system, a propulsion system, a targeting system, a treatment system, and a power source;
the data collection system providing data and comprises:
at least one positioning sensor, and at least one camera;
the at least one positioning sensor is selected from at least one of: an altimeter, an ultrasonic sensor, a radar, a lidar, an accelerometer, a global positioning sensor, and the at least one camera;
a base station dispensing the at least one pesticide; and
at least one holding tank supplying the base station with the at least one pesticide, wherein the navigation system is operative to determine a travel path for the at least one autonomous drone, the travel path having the at least one autonomous drone passing over all of a field,
wherein the propulsion systems is operative to propel the at least one autonomous drone along the travel path, while the at least one camera takes images of the field along the travel path and the images are processed to identify a weed in the field,
and wherein, when the targeting system identifies the weed as a target along the travel path, a spray vector is calculated and the at least one autonomous drone is positioned in accordance with the spray vector to spray the weed with the at least one pesticide via the at least one spray nozzle.

2. The field treatment system according to claim 1, wherein the navigation system receives the data from the data collection system, determines the travel path, determines when an obstacle is in the travel path and adjusts the travel path, and provides at least one propulsion instruction to the propulsion system in order to move the at least one autonomous drone.

3. The field treatment system according to claim 1, wherein the targeting system receives the data from the data collection system, analyzes the data to identify the weed, provides at least one target instruction to the navigation system, determines when the treatment system of the at least one autonomous drone is within a range of the weed and provides at least one treatment instruction to the treatment system.

4. The field treatment system according to claim 3, wherein the treatment system provides the at least one pesticide to the weed.

5. The field treatment system according to claim 3, wherein the treatment system further activates an eradication device directed to the weed; the eradication device is selected from at least one of: a weed trimmer, a heater, a digger, a microwave, a high energy laser, and an electric discharge.

6. The field treatment system according to claim 1, wherein at least one of: the data collection system, the navigation system, and the targeting system are stored within a tangible computer-readable medium and is executed by a processor within the at least one autonomous drone.

7. The field treatment system according to claim 1, wherein the at least one autonomous drone is selected from at least one of: an aerial drone, a rolling drone, and a combination of the aerial drone and the rolling drone.

8. The field treatment system according to claim 1, wherein the data collection system further comprises at least one agricultural sensor, and wherein the at least one agricultural sensor is configured to measure at least one of: a soil acidity, a soil moisture, a soil temperature, a conductivity, a wind direction, a wind speed, and radiation.

9. The field treatment system according to claim 8, wherein the targeting system constructs a plant profile.

10. The field treatment system according to claim 1, wherein the base station comprises a refilling system for refilling at least one canister; and the refilling system comprises a hose under pressure and a controller to activate a valve to dispense the at least one pesticide into the at least one canister.

11. The field treatment system according to claim 10, further comprising a weigh scale weighing the at least one canister to determine a full canister condition and the controller deactivates the valve.

12. The field treatment system according to claim 10, further comprising a spill container that captures the at least one pesticide from either a leak or the at least one canister being overfilled; and a level sensor within the spill container close the valve or deactivate the pump.

13. The field treatment system according to claim 10, further comprising a conveyor system transporting at least one empty canister from a drone docking area to the refilling system and transporting at least one full canister from the refilling system to the drone docking area.

14. The field treatment system according to claim 1, further comprising a communication system enabling communication between the base station and the at least one autonomous drone, and communication between at least a pair of the at least one autonomous drone; at least one mission rule being transmitted between the base station and the at least one autonomous drone; and the targeting system is configured to prioritize the at least one mission rule.

15. A system for monitoring a field comprising:

at least one autonomous drone having a data collection system, a navigation system, a propulsion system, a targeting system, at least one spray nozzle, and a power source;

wherein the at least one autonomous drone passes over the field, along a travel path that passes over all of the field, collecting data; the data collection system collects the data from: at least one positioning sensor, and at least one camera; and the at least one positioning sensor is selected from at least one of: an altimeter, an ultrasonic sensor, a radar, a lidar, an accelerometer, a global positioning sensor, and the at least one camera, wherein the at least one camera takes images of the field along the travel path as the at least one autonomous drone passes along the travel path, and the images are processed to identify a weed in the field;

wherein, when the targeting system identifies the weed as a target along the travel path, a spray vector is calculated and the at least one autonomous drone is positioned in accordance with the spray vector to spray the weed with the at least one pesticide via the at least one spray nozzle.

16. The system according to claim 15, wherein the navigation system receives the data from the data collection system, determines the travel path, determines when an obstacle is in the travel path and adjusts the travel path, and provides at least one propulsion instruction to the propulsion system in order to move the at least one autonomous drone.

17. The system according to claim 15, wherein a targeting system receives the data from the data collection system, analyzes the data to identify the weed as a target, and records a location of the weed in a target list.

18. The system according to claim 17, wherein at least one of: the data collection system, the navigation system, and the targeting system are stored within a tangible computer-readable medium and is executed by a processor within the at least one autonomous drone.

19. The system according to claim 17, wherein the data collection system further comprises at least one agricultural sensor, and wherein the at least one agricultural sensor is configured to measure at least one of: a soil acidity, a soil moisture, a soil temperature, a conductivity, a wind direction, a wind speed, and radiation.

20. The system according to claim 19, wherein the targeting system constructs a plant profile.

21. The system according to claim 17, further comprising a communication system enabling communication of the data between the at least one autonomous drone and a base station; and the base station transmits the at least one target to at least one rolling drone for treatment.

22. The system according to claim 17, further comprising a high clearance sprayer including the at least one spray nozzle, and wherein the high clearance sprayer is configured to receive the target list and to treat the weed from the target list by delivering the at least one pesticide via the least one spray nozzle.

23. The system according to claim 15, wherein the at least one autonomous drone is selected from at least one of: an aerial drone, a rolling drone, and a combination of the aerial drone and the rolling drone.

24. A method for field treatment comprises:

collecting data with a data collection system comprising:
at least one positioning sensor, and at least one camera; the at least one positioning sensor is selected from at least one of: an altimeter, an ultrasonic sensor, a radar, a lidar, an accelerometer, a global positioning sensor, and the at least one camera;

processing the data by a navigation system to produce a travel path for at least one autonomous drone wherein the travel path passes over all of a field, wherein the at least one autonomous drone includes at least one spray nozzle;

propelling the at least one autonomous drone by a propulsion system according to the travel path, while the at least one camera takes images of the field along the travel path and the images are processed to identify a weed in the field; and when the targeting system identifies the weed as a target along the travel path, a spray vector is calculated and the at least one autonomous drone is positioned in accordance with the spray vector to spray the weed with the at least one pesticide.

25. The method according to claim 24, further comprises determining when an obstacle is in the travel path of the at least one autonomous drone and adjusting the travel path, and providing at least one propulsion instruction to the propulsion system in order to move the at least one autonomous drone to an adjusted travel path.

26. The method according to claim 24, wherein the at least one autonomous drone is selected from at least one of: an aerial drone, a rolling drone, and a combination of the aerial drone and the rolling drone.

27. The method according to claim 24, wherein the data collection system further comprises at least one agricultural sensor and the at least one agricultural sensor takes at least one agricultural measurement from the at least one agricultural sensor from the field along the travel path, and wherein the at least one agricultural measurement is selected from at least one of: a soil acidity, a soil moisture, a soil temperature, a conductivity, a wind direction, a wind speed, and radiation.

28. The method according to claim 24, further comprises analyzing the data by a targeting system to identify the weed; and providing at least one target instruction to the navigation system.

29. The method according to claim 28, wherein the targeting system constructs a plant profile.

30. The method according to claim 28, further comprises communicating between the at least one autonomous drone and a base station using a communication system; the base station transmits the at least one target to at least one rolling drone for treatment.

31. The method according to claim 30, further comprises transmitting at least one mission rule from the base station to the at least one autonomous drone; and prioritizing the at least one mission rule at the at least one autonomous drone.

32. The method according to claim 28, further comprises dispensing at least one pesticide from at least one holding tank into at least one canister of the at least one autonomous drone.

33. The method according to claim 32, further comprises treating the weed with at least one treatment.

34. The method according to claim 33, further comprises activating an eradication device directed to the weed; the eradication device is selected from at least one of: a weed trimmer, a heater, a digger, a microwave, a high energy laser, and an electric discharge.

35. The method according to claim 32, further comprises activating a valve to dispense the at least one pesticide into the at least one canister from a hose fluidly coupled to the at least one holding tank.

36. The method according to claim 35, further comprises weighing the at least one canister; determining a full canister condition; and deactivating the valve.

37. The method according to claim 32, further comprises transporting at least one empty canister from a drone docking area to a refilling system; and transporting at least one full canister from the refilling system to the drone docking area.

38. The method according to claim 28, further comprises determining when the at least one spray nozzle is within a range of weed and providing at least one spray instruction to the at least one spray nozzle.

\* \* \* \* \*